United States Patent [19]
Ichishi et al.

[11] Patent Number: 6,012,297
[45] Date of Patent: Jan. 11, 2000

[54] VEHICLE AIR CONDITIONING APPARATUS

[75] Inventors: Yoshinori Ichishi, Kariya; Katsuhiko Samukawa, Obu; Takayoshi Kawai, Hoi-gun; Yuichi Kajino, Nagoya; Yuji Ito, Okazaki, all of Japan

[73] Assignee: Denso Corporation, Kariya, Japan

[21] Appl. No.: 09/130,049

[22] Filed: Aug. 6, 1998

[30] Foreign Application Priority Data

| Aug. 8, 1997 | [JP] | Japan | 9-214571 |
| Feb. 25, 1998 | [JP] | Japan | 10-044104 |
| Apr. 27, 1998 | [JP] | Japan | 10-116861 |
| Jun. 26, 1998 | [JP] | Japan | 10-180300 |

[51] Int. Cl.[7] ..................... F25D 17/00
[52] U.S. Cl. ............... 62/179; 62/186; 62/408; 236/49.3; 165/203
[58] Field of Search ............ 62/186, 408, 178, 62/179, 244; 236/49.3, 51, 91 C; 165/202, 203, 204

[56] References Cited

U.S. PATENT DOCUMENTS

| 4,671,458 | 6/1987 | Fukuda et al. | 236/49 |
| 4,738,116 | 4/1988 | Himeno et al. | 62/186 |
| 4,875,624 | 10/1989 | Hara et al. | 236/49.5 |
| 4,919,328 | 4/1990 | Hara et al. | 236/49.3 |
| 4,949,624 | 8/1990 | Hara et al. | 98/2.01 |
| 4,978,061 | 12/1990 | Ogihara et al. | 236/49.3 |
| 5,186,387 | 2/1993 | Doi et al. | 236/49.3 |
| 5,331,825 | 7/1994 | Kim | 62/180 |
| 5,860,593 | 1/1999 | Heinle et al. | 236/91 C |

FOREIGN PATENT DOCUMENTS

| 57-15008 | 1/1982 | Japan . |
| Y2-4-2086 | 1/1992 | Japan . |
| B2-7-102775 | 11/1995 | Japan . |

Primary Examiner—Henry Bennett
Assistant Examiner—Marc Norman
Attorney, Agent, or Firm—Harness, Dickey & Pierce, PLC

[57] ABSTRACT

A vehicle air conditioning apparatus in which the larger the air conditioning cooling load in a vehicle compartment, for example, the larger the solar radiation amount, the lower the set temperature or the larger the temperature deviation between set temperature and inner air temperature, the narrower the swing ranges of swing louvers of respective center and side FACE blow outlets are set. Regardless of the swing range of the swing louvers, swing cycles of the swing louvers are set constant, and the narrower the swing ranges of the swing louvers, the slower the swing speeds of the swing louvers are set. Therefore, annoying feeling is reduced, and comfortable feeling for passengers is significantly improved.

27 Claims, 36 Drawing Sheets

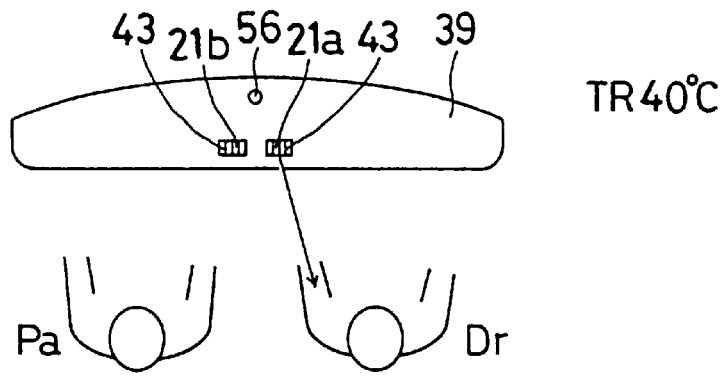
FIG. 22A    TR 40°C
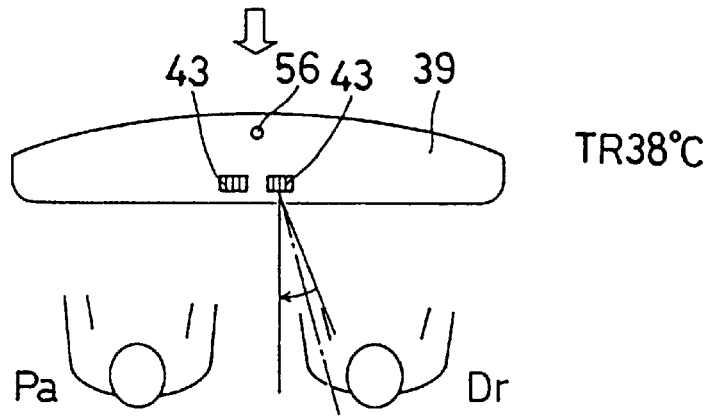
FIG. 22B    TR 38°C
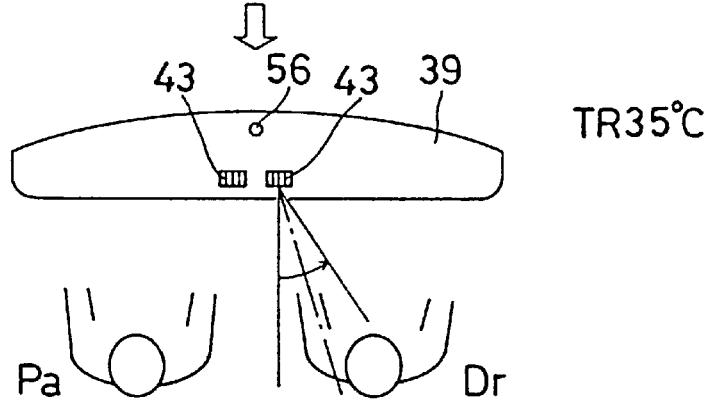
FIG. 22C    TR 35°C
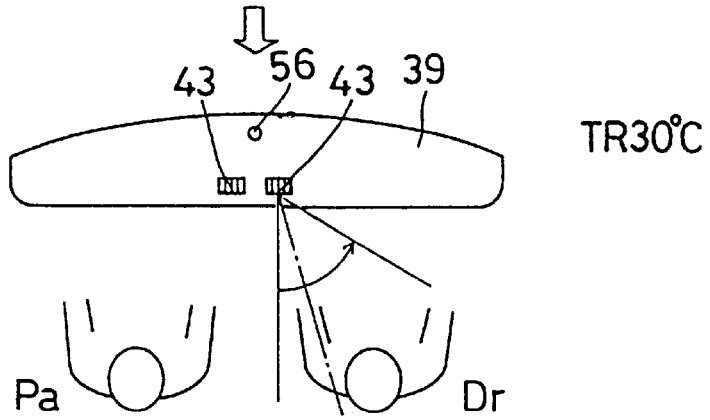
FIG. 22D    TR 30°C

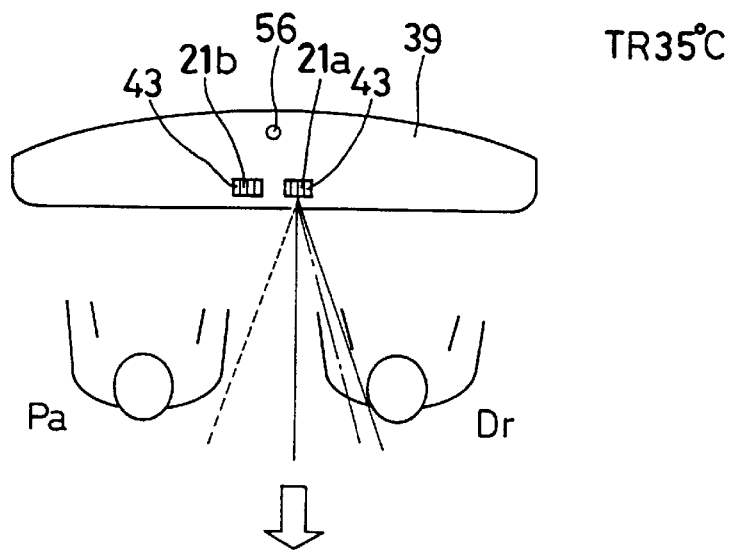
FIG. 23A
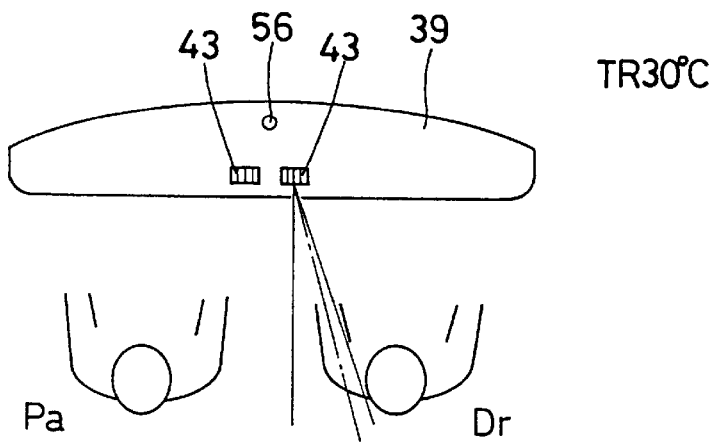
FIG. 23B
FIG. 25
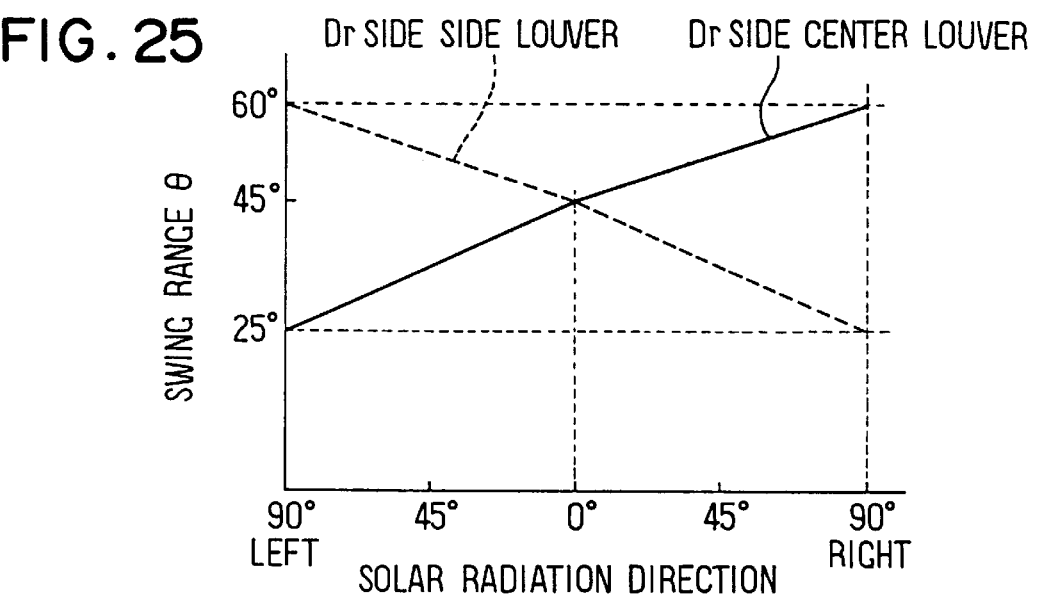

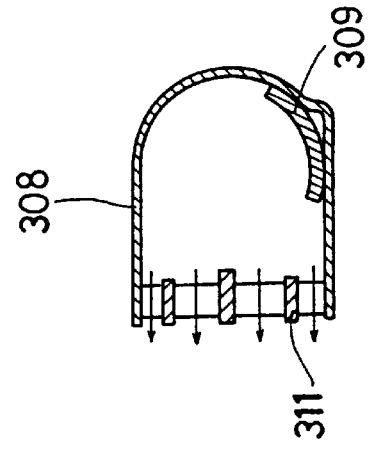
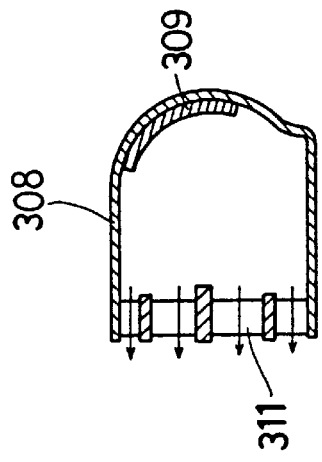
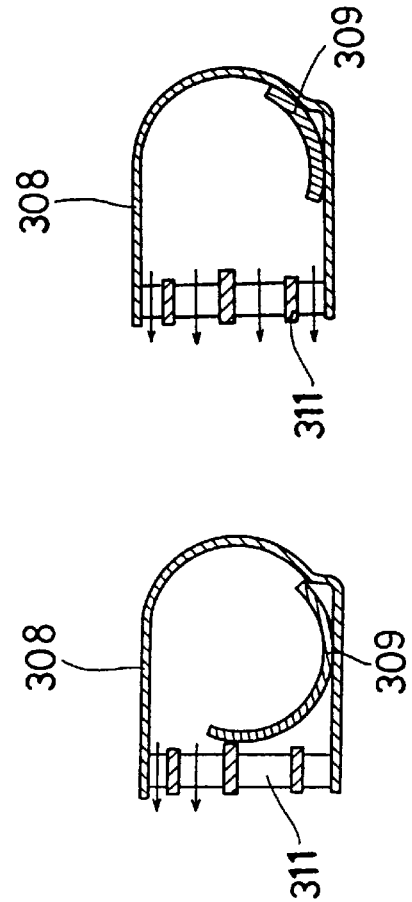
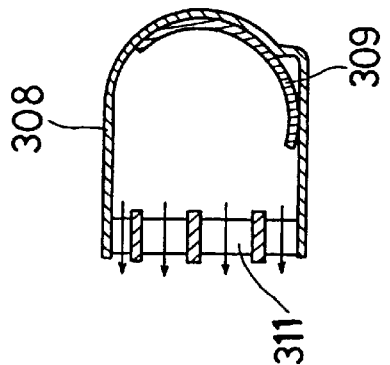
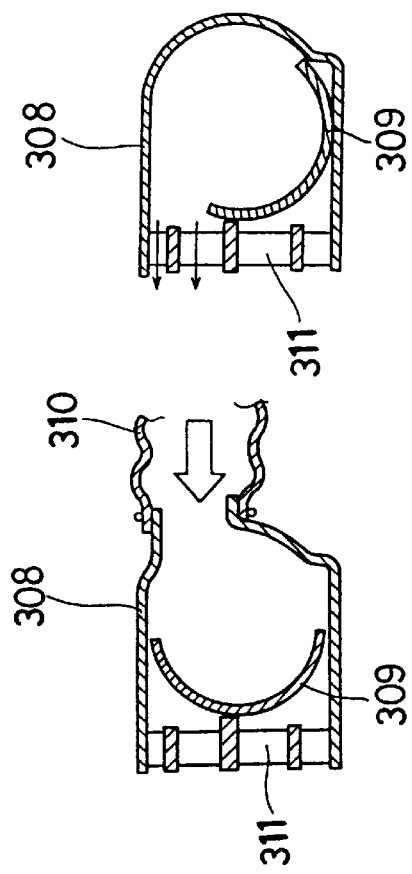
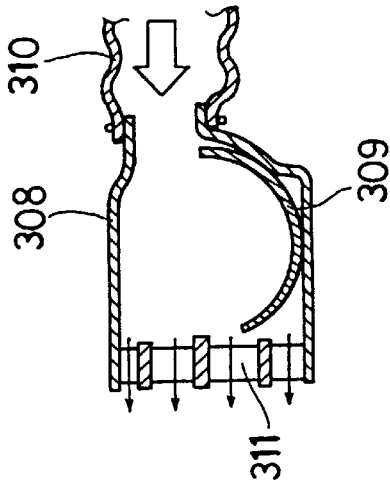

VEHICLE AIR CONDITIONING APPARATUS

CROSS REFERENCE TO RELATED APPLICATIONS

This application is based upon and claims priority from Japanese patent application Nos. Hei 9-214571, filed Aug. 8, 1997, and Hei 10-44104, filed Feb. 25, 1998, and Hei 10-116861, filed Apr. 27, 1998, and Hei 10-180300, filed Jun. 26, 1998, the entire contents of which are incorporated herein by reference.

BACKGROUND OF THE INVENTION

1. Field of the Invention

The present invention relates to a vehicle air conditioning apparatus capable of setting a swing range of a blow condition changing device such as a swing louver or the like for changing a blow condition of a blow range, a blow position, a blow direction, a blow angle, a blow region, the blown air amount or the like of air conditioned blown air, to an optimum swing range in accordance with an cooling load such as a solar radiation amount, a solar radiation direction or the like.

2. Description of Related Art

One type of known vehicle air conditioning apparatus has a blow condition changing device having a deflecting plate for changing a blow direction of air conditioned blown air blown from a center face blow outlet as well as a side face blow outlet.

Further, as a conventional technology, there has been disclosed a blow condition changing device (first related art: for example, Japanese Examined Patent Publication No. JP-B2-7-102775) in which when air conditioning cooling load is temporarily increased by influence of a solar radiation amount or the like, a swing range of a deflecting plate is narrowed to concentrate a cooled wind in a certain area, and a swing cycle of the deflecting plate is proportionally shortened such that the cooled wind is blown as if it is fanned vehemently by a fan.

Further, as another conventional technology, there has been disclosed a blow condition changing device (second related art: for example, Japanese Examined Utility Model Publication No. JP-Y2-4-2086) in which solar radiation direction signals from two solar radiation sensors provided on left and right sides in a vehicle compartment and louver position signals from position detecting switches for detecting left and right directions of center louvers are inputted, and a swing speed of the center louver on the side of presence of solar radiation is retarded than a swing speed of the center louver on a side of absence of solar radiation in accordance with a solar radiation direction.

However, according to the blow condition changing device of the first related art, when the swing range of the deflecting plate is narrowed, the swing cycle of the deflecting plate is shortened and accordingly, blow directions of the cooled wind blown from the center face blow outlet and the side face blow outlet are frequently changed. It may cause a problem that such operation is annoying and unpleasant for a passenger in a vehicle. Furthermore, according to the blow condition changing device of the first prior art, regardless of the swing range of the deflecting plate, the swing speed of the deflecting plate is maintained constant. Therefore, the narrower the swing range of the deflecting plate, the more vehemently the movement of the deflecting plate is changed, and accordingly, it may cause a problem that the operation is annoying depending on a reflecting light angle, and unpleasant feeling is brought about to the passenger in the vehicle. Particularly, the operation is not preferable to a high class vehicle which highly probably installs with a wind direction changing device. Furthermore, when air conditioning cooling load is high, the deflecting plate is vehemently reciprocated at a predetermined location and the durability of a device for driving the deflecting plate is lessened.

Further, when the swing range of the deflecting plated is widened in accordance with lowering of air conditioning cooling load, in order to provide an agreeable air distribution amount, swinging to as far as a contiguous air conditioning zone becomes necessary, for example, independent control performance between an air conditioning zone for the driver seat side and an air conditioning zone for the passenger seat side is lessened. Further, when the swing range of the deflecting plate is widened, for example, uniformly in left and right direction centering on a direction to front seat passengers, a lot of time is required to obtain sufficient blown air amount for the rear seat passengers, and unpleasant feeling is brought about to the rear seat passengers at an initial stage of the air conditioning.

Meanwhile, according to the blow condition changing device of the second prior art, the swing speed of the center louver is controlled in accordance with the direction of the solar radiation which is incident on the inside of the vehicle compartment. However, when the solar radiation is incident on the passenger of the vehicle from a side of the vehicle, the passenger of the vehicle feels hot and a comfortable feeling is lessened if the air conditioned blown air is blown from the center louver to the passenger of the vehicle.

SUMMARY OF THE INVENTION

The present invention is made in light of the foregoing problems, and it is an object of the present invention to provide a vehicle air conditioning apparatus capable of reducing an annoying feeling and preventing passengers from uncomfortableness caused by the frequent change in the blow direction of the air conditioned blown air blown from a blow outlet.

It is another object of the present invention to provide a vehicle air conditioning apparatus capable of preventing the durability degradation of an actuator of blow condition changing device.

Furthermore, it is another object of the present invention to provide a vehicle air conditioning apparatus capable of maintaining an optimum blown air amount which is calculated in accordance with the cooling load.

It is another object of the present invention to provide a vehicle air conditioning apparatus capable of promoting a comfortable feeling of passengers of a vehicle in a rear seat air conditioning zone even at an initial stage of the air conditioning.

Furthermore, it is another object of the present invention to provide a vehicle air conditioning apparatus capable of promoting a comfortable feeling of passengers by canceling a cooling load difference between left and right side cooling loads on the passenger bodies.

According to an aspect of the present invention, a swing range of a blow condition changing device is set in accordance with a cooling load, and the narrower the swing range, the slower a swing speed of the blow condition changing member to stop or swing very slowly at an end of swing or at a midway of the swing range. Therefore, even when the swing range of the blow condition changing device is changed, the swing cycle of the blow condition changing device remains constant, and accordingly, the narrower the swing range of the blow condition changing member becomes, the slower the swing speed is changed continuously or in steps. Thus, an annoying feeling is reduced and an uncomfortable feeling of the passenger is prevented.

When the cooling load is large and the swing range of the blow condition changing member is narrowed, blow range, blow position, blow direction, blow angle or blow region of air conditioned blown air blown from a blow outlet is not frequently changed. Therefore, an annoying and an uncomfortable feelings are reduced.

When the cooling load is small and the swing range of the blow condition changing member is widened, blow range, blow position, blow direction, blow angle or blow region of air conditioned blown air blown from a blow outlet is continuously changed and the air conditioned blown air blown from the blow outlet is blown over a wide range. Thus, a time period where the air conditioned blown air is blown to passengers of a vehicle is shortened, and the annoying and the uncomfortable feelings are reduced.

Further, as a cooling load detected by the cooling load detecting member, either one or more of an blow wind amount from an upper blow outlet, a blow wind amount of a blower, applied voltage on a blower motor, temperature in a vehicle compartment, temperature deviation between set temperature and temperature in a vehicle compartment, a solar radiation amount, solar radiation direction, vehicle speed, humidity in a vehicle compartment, temperature outside of a vehicle compartment, air temperature immediately after passing through an evaporator, blow temperature, seat temperature, steering wheel temperature and skin temperature can be selected.

Furthermore, when a cooling load of a first air conditioning zone differs from a cooling load of a second air conditioning zone, amounts of changing swing ranges of blow condition changing member are made different from each other at the first air conditioning zone and the second air conditioning zone by which the air conditioning state in the first air conditioning zone and the air conditioning state in the second air conditioning zone can be set to optimum states, respectively. Accordingly, even in the case where air conditioning feeling (for example, refrigerating feeling) of a passenger of the vehicle in the first air conditioning zone differs from air conditioning feeling (for example, refrigerating feeling) of other passenger of the vehicle in the second air conditioning zone, comfortable feeling of both of the passengers can be ensured.

According to another aspect of the present invention, by narrowly setting a swing range of blow condition changing member of an air conditioning zone in the first air conditioning zone or the second air conditioning zone where solar radiation is incident, or by narrowly setting the swing range when the solar radiation direction gets closer from the front of the vehicle toward the side of the vehicle, or by narrowly setting the swing range when the solar radiation is incident on a passenger, air conditioned blown air is intensively supplied on the body of the passenger. Therefore, comfortable feeling of the passenger is significantly improved.

Furthermore, by widely setting a swing range of blow condition changing member on a side proximate to a steering wheel, the hand or the arm holding the steering wheel of a passenger of a vehicle can be prevented from becoming cold or hot and accordingly, disagreeable feeling is not brought about to the passenger of the vehicle.

According to another aspect of the present invention, the smaller a number of the operating blow condition changing member, the narrower the swing ranges of the blow condition changing member are set by which a deficiency in the cooled wind or a deficiency in warm wind can be compensated for when, for example, solar radiation is present or solar radiation is not present or the like.

According to another aspect of the present invention, blow condition changing member on the right seat side and blow condition changing member on the left seat side are swung such that firstly, blow ranges, blow positions, blow directions, blow angles, blow regions and so on of air conditioned blown air are in directions proximate to each other. Further, a swing range of the right seat side blow condition changing member and a swing range of the left seat side blow condition changing member are respectively set in accordance with cooling load. Further, by setting swing cycles of the right seat side blow condition changing member and the left seat side blow condition changing member to the same period regardless of changes in the swing ranges, even when blow direction or blow position of air conditioned blown air blown from the right seat side blow outlet, becomes mostly proximate to a passenger of the vehicle on the left seat side, blow direction or blow position of air conditioned blown air blown from the left seat side blow outlet becomes mostly proximate to a passenger of the vehicle on the left seat side. Therefore, an air curtain is formed between the passenger of the vehicle on the right seat side and the passenger of the vehicle on the left seat side, and accordingly, independent temperature control performance of the right seat side air conditioning zone and the left seat side air conditioning zone can be maintained.

A timing where blow range, blow position, blow direction, blow angle or blow region of the right seat side blow condition changing member becomes mostly proximate to the left seat side air conditioning zone, is substantially equalized to that of the left seat side blow condition changing member by which even when timings of starting to operate the right seat side blow condition changing member and the left seat side blow condition changing member are shifted from each other, when blow direction or blow position of air conditioned blown air blown from the right seat side blow outlet is mostly proximate to a passenger of a vehicle on the left seat side, blow direction or blow position of air conditioned blown air blown from the left seat side blow outlet becomes mostly proximate to a passenger of the vehicle on the right seat side and accordingly, an air curtain is formed between the passenger of the vehicle on the right seat side and the passenger of the vehicle on the left seat side and accordingly, independent temperature control performances of the right seat side air conditioning zone and the left seat side air conditioning zone can be maintained.

According to another aspect of the present invention, when swing range of blow condition changing member which is calculated in accordance with cooling load, cannot be maintained because of a restriction region set by restriction region setting member, swing motion of the blow condition changing member is temporarily stopped until elapse of a predetermined time period, or swing speed of the blow condition changing member is delayed. Thus, degradation in durability of the blow condition changing member can be prevented.

Further, according to the present invention, by substantially equalizing the length of the time period to a time period necessary for blow direction or blow position of air conditioned blown air to enter the restriction region and to leave the restriction region, direction of blowing air conditioned blown air blown from blow outlet is not frequently changed, and accordingly, annoying feeling is reduced, and no influence is effected in a contiguous air conditioning zone. Further, a position, where the swing motion of the blow condition changing member is temporarily stopped or the swing speed of the blow condition changing member is delayed, does not effect influence on a contiguous air conditioning zone which is at a vicinity of a restriction location of the restriction region.

According to another aspect of the present invention, when the swing range, which is set in accordance with cooling load, cannot be maintained because of a restriction region set by restriction region setting member, the swing range of the blow condition changing member is widened in a direction reverse to the restriction region by which an optimum blown air amount calculated in accordance with the cooling load can be maintained. Further, by widening the swing range of the blow condition changing member which is set by the swing range setting member into a direction of increasing a blown air amount to a rear seat air conditioning zone, comfortable feeling of a passenger in the rear seat air conditioning zone is achieved even at an early stage of the air conditioning.

Further, when a cooling load of the first air conditioning zone differs from a cooling load of the second air conditioning zone, the swing range of the blow condition changing member for the first air conditioning zone and the swing range of the blow condition changing member for the second air conditioning zone are controlled respectively and independently from each other. Therefore, the difference between the cooling loads of the first and the second air conditioning zones is cancelled, and comfortable feeling of passengers in the vehicle is improved.

Further, when the cooling load differs between left and right of the body of a passenger in the vehicle, by setting the swing range of the blow condition changing member on the center and the swing range of the blow condition changing member on the side independently from each other, the difference between the cooling loads of the left and the right of the body of the passenger is canceled, and comfortable feeling of the passenger is improved.

Further, by setting narrowly the swing range of the blow condition changing member when the solar radiation direction becomes proximate to the side face of the vehicle from the front face of the vehicle, or by setting narrowly the swing range of the blow condition changing member of the air conditioning zone of either of the first air conditioning zone and the second air conditioning zone where the solar radiation is incident, or by narrowly setting the swing range of the blow condition changing member on the side of the passenger of the vehicle where the solar radiation is incident, air conditioned blown air is intensively supplied to the body of the passenger intended to provide air conditioned blown air (for example, the cooled wind) and accordingly, comfortable feeling of the passenger is significantly improved.

According to another aspect of the present invention, the swing range of the right seat side blow condition changing member and the swing range of the left seat side blow condition changing member are respectively set in accordance with the solar radiation amount detected by solar radiation detecting member, and the swing range of the right seat side blow condition changing member and the swing range of the left seat side blow condition changing member are independently set each other in accordance with the solar radiation direction detected by the solar radiation amount detecting member. Therefore, the independent control performance of the right seat side air conditioning zone and the left seat side air conditioning zone can be maintained (ensured).

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 22A, 22B, 22C and 22D are explanatory views showing examples of way of widening a swing range in respect of inner air temperature according to the second embodiment of the present invention;

FIGS. 23A and 23B are explanatory views showing a modified example of way of widening a swing range in respect of inner air temperature according to the second embodiment of the present invention;

FIG. 25 is a characteristic diagram showing swing ranges in respect of a solar radiation direction according to the second embodiment of the present invention;

FIGS. 39A, 39B and 39C are explanatory views for operations of the blow condition changing device according to the eighth embodiment of the present invention;

FIGS. 40A, 40B and 40C are explanatory views of operation of the blow condition changing device according to the eighth embodiment of the present invention;

DETAILED DESCRIPTION OF THE PREFERRED EMBODIMENTS

First Embodiment

Figure 1:
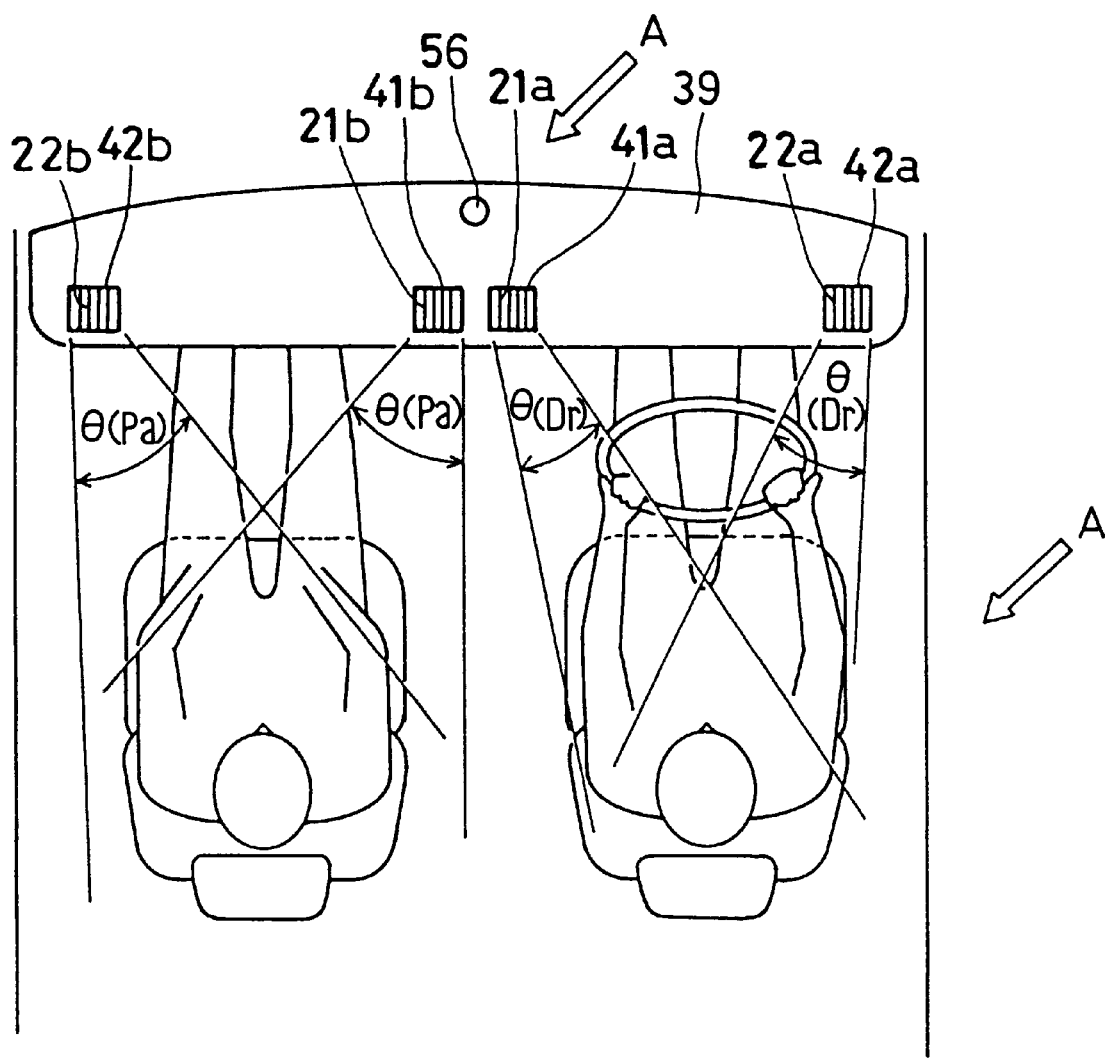
FIG. 1 is a schematic illustration showing a relationship between air conditioning cooling load such as a solar radiation amount or the like and swing ranges of swing louvers according to a first embodiment of the present invention.

FIG. 1 through FIG. 15 show a first embodiment of the present invention.

A vehicle air conditioning apparatus according to the embodiment is constituted to control respective air conditioning member (actuator) in an air conditioning unit 1 for conditioning air in a vehicle compartment of a vehicle of an automobile or the like mounted with an engine by an air conditioning control unit (hereinafter, referred to as an air conditioner ECU) 50. The air conditioning unit 1 is an air conditioning unit capable of adjusting temperature on the driver seat side as a first air conditioning zone on one side of the vehicle compartment of the vehicle and temperature on the passenger seat side as a second air conditioning zone on other side of the vehicle compartment of the vehicle independently from each other.

The air conditioning unit 1 is installed with an air conditioning duct 2 arranged at a front side of the vehicle compartment of the vehicle. The upstream side of the air conditioning duct 2 is installed with an inner and outer air switching door 3 and a blower 4. The inner and outer air switching door 3 is intake port switching member which is driven by a servo motor 5 for changing opening degrees of an inner air intake port 6 and an outer air intake port 7. The blower 4 is a blower which is driven to rotate by a blower motor 9 controlled by a blower drive circuit 8 for causing air flow flowing to the inside of the vehicle compartment in the air conditioning duct 2.

The central portion of the air conditioning duct 2 is installed with an evaporator (heat exchanger for cooling) 10 of a refrigerating cycle for cooling air passing through the inside of the air conditioning duct 2 over an entire face of the air conditioning duct 2. The downstream side of the evaporator 10 is installed with a heater core (heat exchanger for heating) 13 for heating air passing through a first air passage 11 and a second air passage 12. Further, the first air passage 11 and the second air passage 12 are partitioned by a partitioning plate 14 and the heater core 13 is installed to penetrate the partitioning plate 14. The downstream side of the heater core 13 is installed with air mix (A/M) doors 15 and 16 for the driver seat side and the passenger seat side for adjusting temperature at the driver seat side air conditioning zone and the passenger seat side air conditioning zone in the vehicle compartment independently from each other. Further, the driver seat side and the passenger seat side A/M doors 15 and 16 are driven by servo motors 17 and 18.

On the downstream side of the first air passage 11, a defroster (DEF) blow outlet 20, a driver seat side center face (FACE) blow outlet (right seat side blow outlet, first center blow outlet, upper blow outlet) 21a, a driver seat side side face (FACE) blow outlet (right seat side blow outlet, first side blow outlet, upper blow outlet) 22a and a driver seat side foot (FOOT) blow outlet 23a, are opened. Further, air conditioned blown air is blown from the DEF blow outlet 20 not only to an inner face of a front window in the driver seat side air conditioning zone but also to an inner face of the front window in the passenger seat side air conditioning zone. Further, on the downstream side of the second air passage 12, a passenger seat side center face (FACE) blow outlet (left seat side blow outlet, second center blow outlet, upper blow outlet) 21b, a passenger seat side side face (FACE) blow outlet (left seat side blow outlet, second side blow outlet, upper blow outlet) 22b and a passenger seat side foot (FOOT) blow outlet 23b, are opened. Further, the inside of the first and the second air passages 11 and 12 are installed with driver seat side and passenger seat side blow outlet switching doors 24 through 28 for setting air outlet modes on the driver seat side and the passenger seat side in the vehicle compartment independently from each other.

Further, the driver seat side and the passenger sear side blow outlet switching doors 24 through 28 are mode switching doors which are driven by servo motors 30 through 32 for respectively switching the air outlet modes on the driver seat side and the passenger seat side. In this case, there are an FACE mode, a B/L mode, an FOOT mode, an F/D mode, a DEF mode and so on as air outlet modes on the driver seat side and the passenger seat side. Further, the driver seat side and the passenger seat side center FACE blow outlets 21a and 21b as well as the driver seat side and the passenger seat side side FACE blow outlets 22a and 22b are respectively installed with blow condition changing devices at an instrument panel (storing member) 39. Further, the driver seat side side FACE blow outlet 22a and the passenger seat side side FACE blow outlet 22b may respectively installed to front side doors or inner panels of side face bodies of the vehicle.

Next, a simple explanation will be given of the blow condition changing devices in reference to FIG. 1 through FIG. 6. The blow condition changing devices are respectively installed in driver seat side and passenger seat side center grilles 41a and 41b and driver seat side and passenger seat side side grilles 42a and 42b. Further, air passages of the grilles 41a, 41b, 42a and 42b are utilized as the driver seat side and the passenger seat side center FACE blow outlets 21a and 21b as well as the driver seat side and the passenger seat side side FACE blow outlets 22a and 22b mentioned above. Further, each of the grilles 41a, 41b, 42a and 42b is installed with a louver left and right direction swinging mechanism and a louver up and down direction swinging mechanism.

Figure 5:
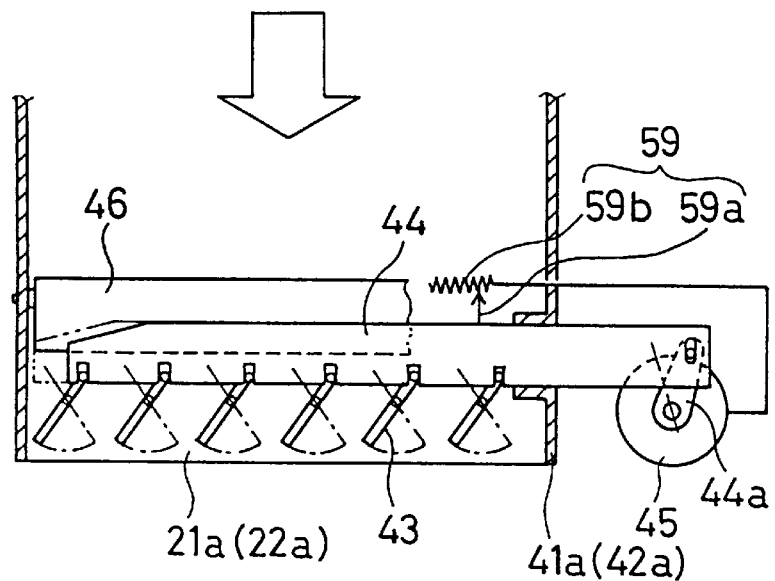
FIG. 5 is an outline view showing a constitution of a mechanism of swinging in left and right direction of the blow condition changing device according to the first embodiment of the present invention.

The louver left and right direction swinging mechanism corresponds to an actuator or a right seat side actuator or a left seat side actuator according to the present invention and as shown by FIG. 5, the mechanism is constituted by a plurality of rows of louver fins (deflecting plates: hereinafter, referred to as swing louvers) 43 which are installed in left and right direction (horizontal direction) in respect of the progressing direction of the vehicle in each of the grilles, a link lever 44 for swinging the plurality of sheets of swing louvers 43 centering on fulcra thereof in left and right direction in a predetermined swing range and a louver motor (for example, DC (Direct Current) servo motor) 45 as louver driving member for reciprocating the link lever 33 in left and right direction via an arm plate 44a.

Further, the swing louvers 43 of the passenger seat side center and side grilles 41a and 42a correspond to blow condition changing member or right seat side blow condition changing member according to the present invention and are also referred to as center louvers or side louvers. Further, the swing louvers 43 of the passenger seat side center and side grilles 41b and 42b correspond to blow condition changing member or left seat side blow condition changing member according to the present invention and are also referred to as center louvers or side louvers.

Figure 6:
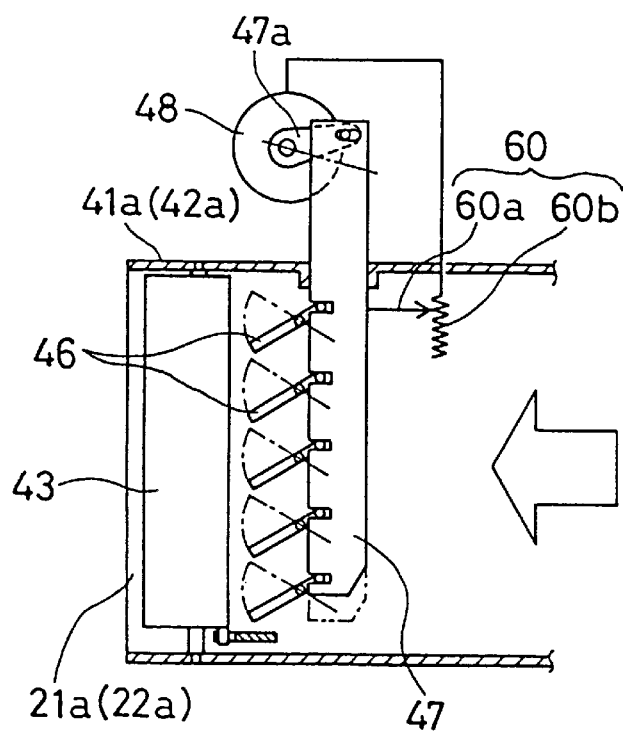
FIG. 6 is a schematic view showing a swing mechanism of a blow condition changing device in a vertical direction according to the first embodiment of the present invention.

The louver up and down direction swing mechanism corresponds to an actuator according to the present invention and as shown by FIG. 6, the mechanism is constituted by a plurality of rows of louver fins (deflecting plates: hereinafter, referred to as swing louvers) 46 which are installed in up and down direction in respect of the progressing direction of the vehicle in each of the grills, a link lever 47 for swinging the plurality of sheets of swing louvers 46 centering on fulcra thereof in up and down direction in a predetermined swing range and a louver motor (for example, DC servo motor) 48 as louver driving member for reciprocating the link lever 47 via an arm plate 47a in up and down direction. Further, the swing louvers 46 in each of the grilles correspond to blow condition changing member according to the present invention.

Figure 2:
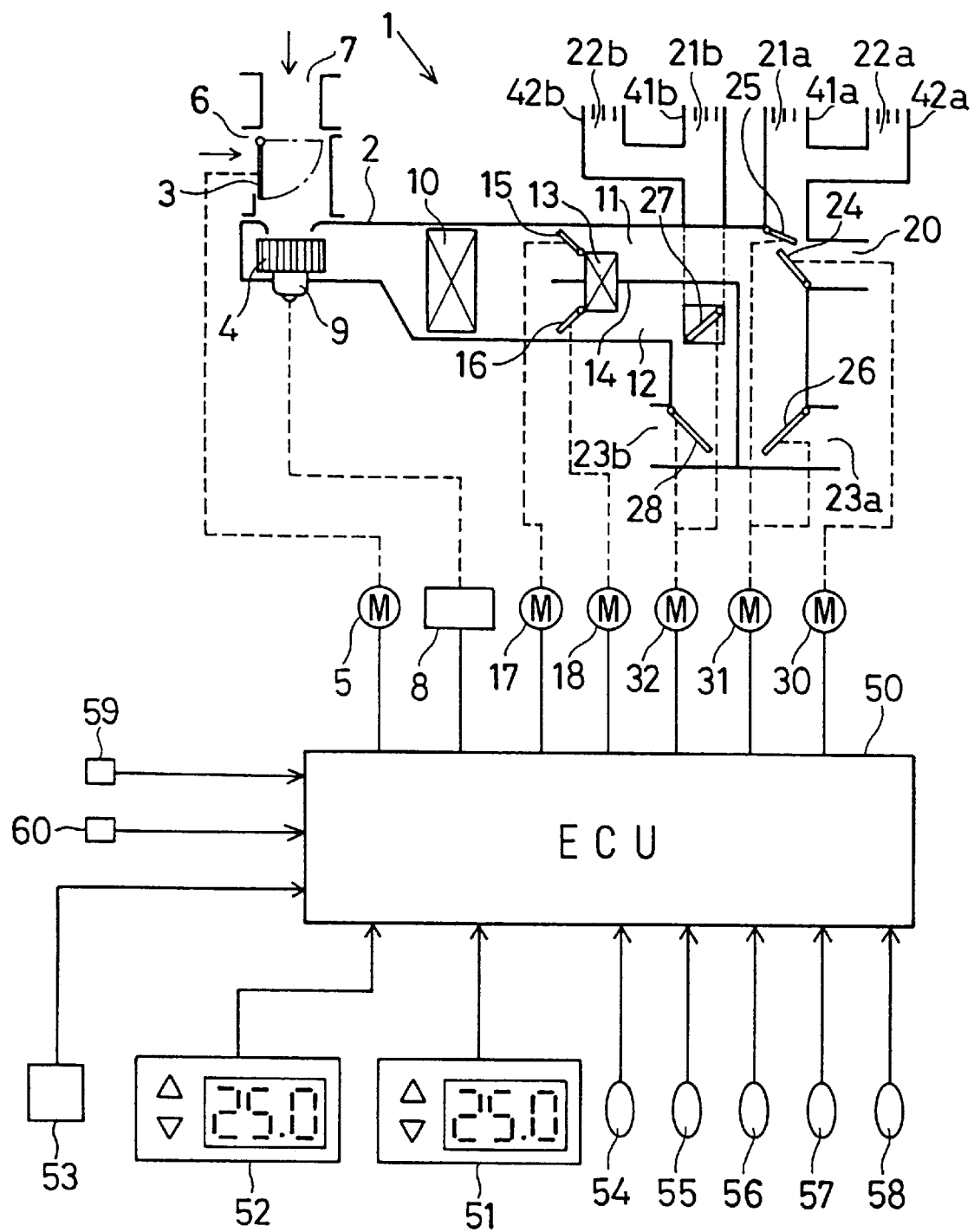
FIG. 2 is a schematic illustration showing a total structure of a vehicle air conditioning apparatus according to the first embodiment of the present invention.
Figure 3:
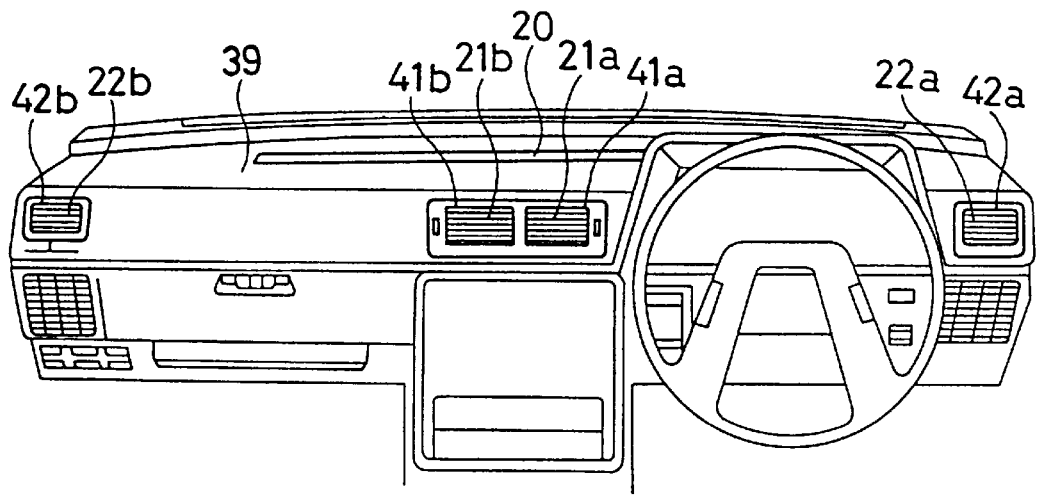
FIG. 3 is a front view showing an instrument panel of a vehicle according to the first embodiment of the present invention.
Figure 4:
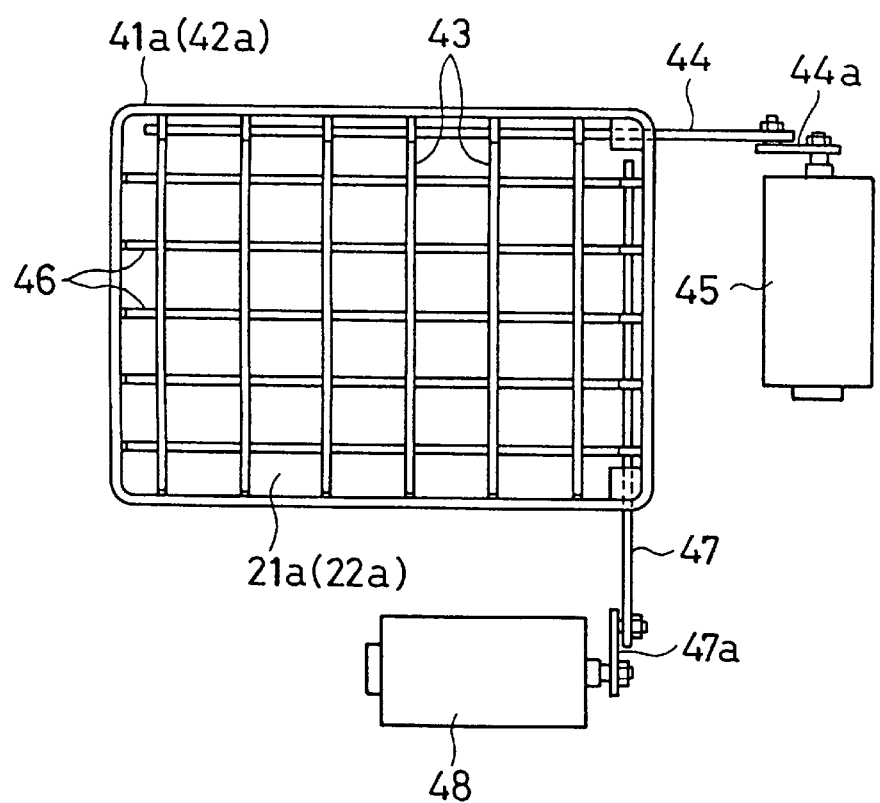
FIG. 4 is an outline view showing a total constitution of a blow condition changing device according to the first embodiment of the present invention.

An air conditioner ECU 50 is installed with a well-known microcomputer comprising CPU, ROM, RAM or the like at inside thereof and is constituted such that sensor signals from respective sensors are inputted to the microcomputer by an input circuit, not illustrated, after A/D (Analogue to Digital) conversion. Further, as shown by FIG. 2, the air conditioner ECU 50 is connected with a driver seat side temperature setting switch 51 for setting the driver seat side air conditioning zone to desired temperature, a passenger seat side temperature setting switch 52 for setting the passenger seat side air conditioning zone to desire temperature, a switch 53 and so on.

Further, the swing switch 53 is louver operation instructing member for instructing operation and stoppage of swinging of the swing louvers 43 and 46 of the blow condition changing devices of the respective grilles 41a, 41b, 42a, 42b (respective FACE blow outlets 21a, 21b, 22a and 22b). Further, the air conditioner ECU 50 is connected with an inner air temperature sensor 54 for detecting temperature in vehicle compartment (hereinafter, referred to as inner air temperature), an outer temperature sensor 55 for detecting temperature outside of vehicle compartment (hereinafter, referred to as outer air temperature) and a solar radiation sensor 56 as solar radiation amount detecting member. Further, the air conditioner ECU 50 is connected with a post evaporator temperature sensor 57 for detecting air temperature immediately after passing through the evaporator 10 (hereinafter, referred to as post evaporator temperature), a cooling water temperature sensor 58 for detecting cooling water temperature of the engine and potentiometers 59 and 60 for detecting blow direction and blow position of air conditioned blown air from the FACE blow outlet.

Among them, the solar radiation sensor 56 corresponds to cooling load detecting member according to the present invention and is provided with solar radiation intensity detecting member (for example, photo transistor, photo diode, solar cell) for detecting solar radiation amounts (solar radiation intensities) irradiated on the driver seat side and the passenger seat side air conditioning zones. Further, the air conditioner ECU 50 is provided with solar radiation direction calculating member (which corresponds to solar radiation direction detecting member according to the present invention) for calculating irradiation direction (solar radiation direction, solar radiation azimuth) of solar ray by reading an output signal (solar radiation amount signal) of the solar radiation sensor 56 and solar radiation elevation calculating member (solar radiation direction detecting member) for calculating elevation (angle of elevation of solar radiation, elevation of solar radiation, angle of elevation of the sun) of solar ray.

In this case, as cooling load detecting member for detecting cooling load of the inside of the vehicle compartment, blow air amount from the respective FACE blow outlets 21a, 21b, 22a and 22b, a blower wind amount of the blower 4, applied voltage (blower control voltage) of the blower motor 9, set temperature, inner air temperature, outer air temperature, post evaporator temperature, cooling water temperature, actual blow temperature, target blow temperature, vehicle speed, seat temperature at front seats (driver seat, passenger seat), steering wheel temperature, skin temperature, a number of passengers of the vehicle and the like are conceivable and sensors for detecting these values and temperature setting member for setting temperature can also be used as the cooling load detecting member.

The potentiometer 59 is louver position detecting member (blow direction detecting member) for detecting blow direction or blow position in left and right direction of the plurality of sheets of swing louvers 43 and is installed at a vicinity of each of the louver left and right direction swinging mechanism. Further, potentiometer 60 is louver position detecting member (blow direction detecting member) for detecting blow direction or blow position in up and down direction of the plurality of sheets of swing louvers 46 and is installed at a vicinity of each of the louver up and down direction swinging mechanism. As shown by FIG. 5 and FIG. 6, specifically, the potentiometers 59 and 60 comprise movable terminals 59a and 60a reciprocating in left and right direction and in up and down direction integrally with the ring levers 44 and 47, resistor elements 59b and 60b changing voltage dividing ratios by movements of the movable terminals 59a and 60a and so on.

Next, an explanation will be given of a method of controlling air conditioning by the air conditioner ECU 50 according to the embodiment in reference to FIG. 1 through FIG. 15. First, when an ignition switch is turned ON and direct current power source is supplied to the air conditioner ECU 50, execution of control program (routine of FIG. 7) is started. In this occasion, firstly, memories for processing data or the like are initialized (step S1). Next, the operation reads data. That is, the operation inputs signals from various switches and sensor signals from various sensors (step S2).

Next, the operation calculates target blow temperature TAO (Dr) on the driver seat side and target blow temperature TAO (Pa) on the passenger seat side based on stored data mentioned above, Equation 1 and Equation 2 as follows (step S3).

$$TAO(Dr)=Kset-Tset(Dr)-KR\cdot TR-KAM\cdot TAM-KS\cdot TS+ Kd(Dr)\{CD(Dr)+Ka(Dr)(10-TAM)\}\{Tset(Dr)-Tset(Pa)\}+C \quad \text{(Equation 1)}$$

$$TAO(Pa)=Kset-Tset(Pa)-KR\cdot TR-KAM\cdot TAM-KS\cdot TS+ Kd(Pa)\{CD(Pa)+Ka(Pa)(10-TAM)\}\{Tset(Pa)-Tset(Dr)\}+C \quad \text{(Equation 2)}$$

In these equations, notations Tset(Dr) and Tset(Pa) represent a set temperature of the driver seat side air conditioning zone and a set temperature of the passenger seat side air conditioning zone, respectively. Notations TR, TAM and TS represent inner air temperature, outer air temperature and an amount of solar radiation into the vehicle compartment, respectively. Notations Kset, KR, KAM, KS, Kd(Dr) and Kd(Pa) represent gain of temperature setting, gain of inner air temperature, gain of outer air temperature, gain of solar radiation amount, and gain of correction of temperature difference between the first and the second air conditioning zones, respectively. Notations Ka(Dr) and Ka(Pa) respectively represent gains of correction degrees of influence effected on respective air conditioning temperatures of the driver seat side air conditioning zone and the passenger seat side air conditioning zone by the outer air temperature TAM. Notations CD(Dr) and CD(Pa) represent constants in accordance with the degrees of influence mentioned above, and notation C represents a correction coefficient. In this case, values of notations Ka(Dr), Ka(Pa), CD(Dr) and CD(Pa) are changed by various parameters such as shape or size of the vehicle, blowing direction of the air conditioning unit 1 and so on.

Next, the operation calculates blower control voltage VA applied on the blower 4 based on the target blow temperature TAO(Dr) on the driver seat side and the target blow temperature TAO(Pa) on the passenger seat side (step S4). Specifically, the blower control voltage VA is calculated by providing blower control voltages VA(Dr) and VA(Pa) in compliance with the target blow temperatures TAO(Dr) and TAO(Pa) based on a characteristic diagram of FIG. 8 and by averaging the blower control voltages VA(Dr) and VA(Pa).

Figure 9:
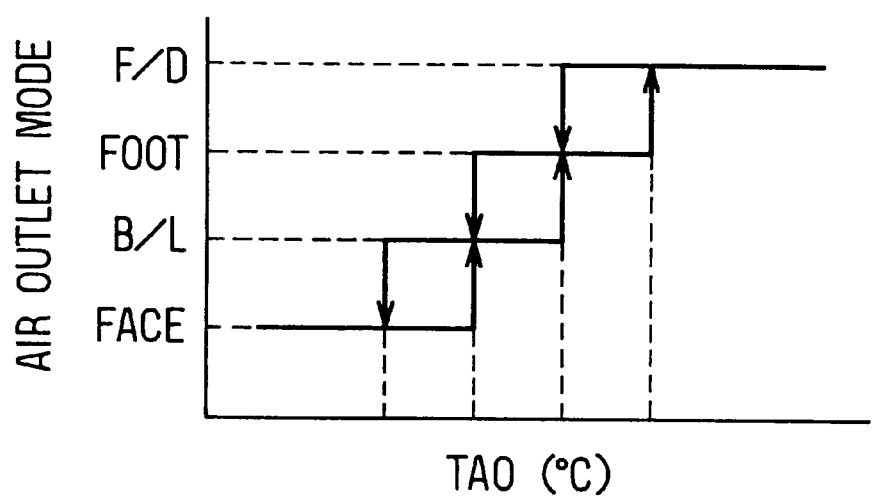
FIG. 9 is a characteristic diagram showing a characteristic of air outlet mode in respect of target blow temperature according to the first embodiment of the present invention.

Next, respective air outlet modes of the driver seat side air conditioning zone and the passenger seat side air conditioning zone are determined based on the target blow temperature TAO(Dr) on the driver seat side and the target blow temperature TAO(Pa) on the passenger seat side mentioned above and a characteristic of air outlet mode in respect of target blow temperature shown by a characteristic diagram of FIG. 9 (step S5). Specifically, in determining the air outlet mode, an FACE mode, a B/L mode, an FOOT mode and an F/D mode are constituted from low temperature to high temperature of the target blow temperatures TAO(Dr) and TAO(Pa). Further, the F/D mode may be set only when a air outlet mode changeover switch installed on an air conditioner operation panel, not illustrated, is operated.

Further, the FACE mode mentioned above is a air outlet mode blowing air conditioned blown air toward an upper half (head, breast) of the body of a passenger of a vehicle. Further, the B/L mode is an air outlet mode blowing air conditioned blown air toward the upper half (head, breast) and the feet of a passenger of a vehicle. Further, the FOOT mode is an air outlet mode for blowing air conditioned blown air toward the feet of a passenger of a vehicle. Further, the F/D mode is an air outlet mode for blowing air conditioned blown air toward the feet of a passenger of a vehicle and an inner face of a front window of a vehicle. Further, according to the embodiment, when the defroster switch installed on an air conditioner operation panel, not illustrated, is operated DEF mode blowing air conditioned blown air toward an inner face of a front window is set. Further, in any of the air outlet modes, the driver seat side side FACE blow outlet 22a and the passenger seat side side FACE blow outlet 22b are opened.

Next, the operation calculates an opening degree SW(Dr) (%) of the driver seat side A/M door 15 and an opening degree SW(Pa) (%) of the passenger seat side A/M door 16 (step S6). Further, such a calculation of the opening degree SW(Dr) and the opening degree SW(Pa) is carried out based on the target blow temperature TAO(Dr) on the driver seat side and the target blow temperature TAO(Pa) on the passenger seat side, post evaporator temperature (TE) detected by the post evaporator temperature sensor 57, cooling water temperature (TW) detected by the cooling water temperature sensor 58 and Equation 3 and Equation 4 as follows.

$$SW(Dr)=\{TAO(Dr)-TE\}\times 100/(TW-TE) \quad \text{(Equation 3)}$$

$$SW(Pa)=\{TAO(Pa)-TE\}\times 100/(TW-TE) \quad \text{(Equation 4)}$$

Next, a routine shown in FIG. 10 (described later) is started and the swing ranges of the swing louvers 43 and 46 of the blow condition changing devices (swing range setting means: step S7) of the respective grilles 41a, 41b, 42a and 42b (respective FACE air outlets 21a, 21b, 22a, 22b), are determined. Incidentally, when the operating swing louvers 43 and 36 are only the swing louvers 43 and 46 of the driver seat side and the passenger seat side center grilles 41a and 41b or only the swing louvers 43 and 46 of the driver seat side and the passenger seat side side grilles 42a and 42b, swing ranges are set to be the swing ranges calculated at step S7 multiplied by 0.7. Thereby, deficiency of the cooled wind in the case of presence of solar radiation or the like can be compensated for.

Further, it has been discovered by an experiment that the driver seat side side grille 42a is proximate to the right hand holding the steering wheel, and the cooled wind is intensively blown to the right hand and unpleasant feeling caused by local refrigeration is brought about to a driver. Hence, the swing ranges of the swing louvers (side louvers) 43 and 46 of the driver seat side side grille 42a is set to be the swing ranges calculated at step S7 multiplied by 1.3. Thereby, the cooled wind is prevented from intensively impinging on the right hand of the driver. Further, in consideration of outlook, the swing ranges of the swing louvers (side louvers) 43 and 46 of the passenger seat side side grille 42b may similarly be widened.

Next, routine of FIG. 13 (described later) is started and swing cycles of the swing louvers 43 and 46 of the blow condition changing devices are set to constant periods. Specifically, swing speeds of the swing louvers 43 and 46 are determined (swing speed setting means: step S8).

Next, an output signal is sent to the blower driver circuit 8 to constitute the determined blower control voltage VA. Further, the servo motors 30 through 32 are controlled by electricity conduction to constitute the determined air outlet mode. Further, the servo motors 17 and 18 are controlled by electricity conduction to constitute the determined opening degree SW(Dr) and the determined opening degree SW(Pa). Further, control signals are sent to the louver motors 45 and 48 to constitute the determined swing range and the determined swing speed (blow condition controlling means: step S9). Next, after elapse of predetermined control period time (τ) at step S10, the operation returns to the processing of step S2.

Next, an explanation will be given of control of determining swing ranges of swing louvers by the air conditioner ECU 50 in reference to FIG. 10 through FIG. 12.

Figure 10:
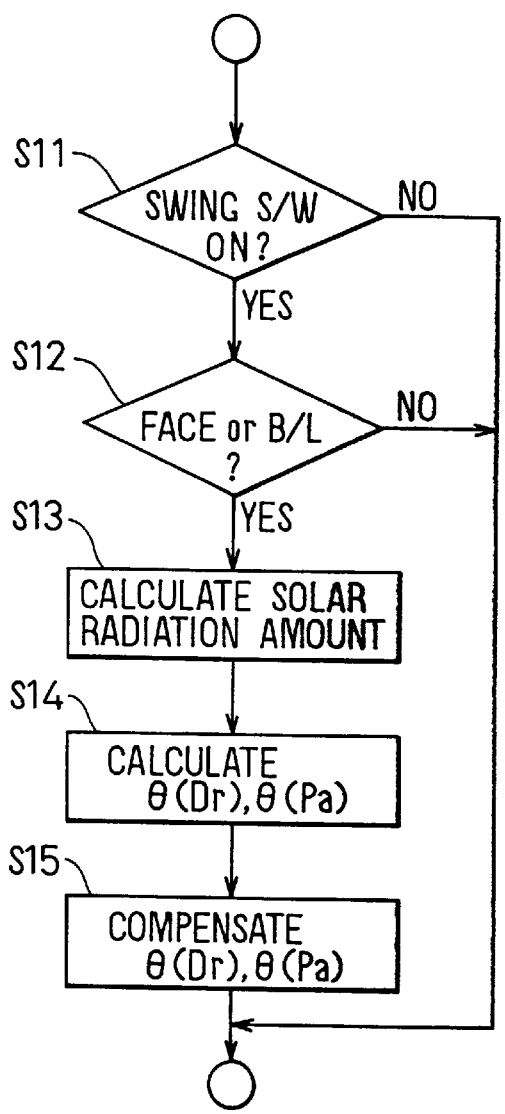
FIG. 10 is a flowchart showing determination of swing ranges of swing louvers according to the first embodiment of the present invention.

First, when routine of FIG. 10 is started, the operation determines whether the swing switch 53 is turned on (ON) (step S11). When a result of determination is NO, the operation finishes with the routine of FIG. 10.

Further, when the result of determination at step S11 is YES, the operation determines whether the air outlet mode is the FACE mode or the B/L mode (step S12). When the result of determination is NO, the operation finishes with the routine of FIG. 10.

Further, when the result of determination at step S12 is YES, solar radiation direction and solar radiation intensity of the driver seat side air conditioning zone and solar radiation direction and solar radiation intensity of the passenger seat side air conditioning zone based on the solar radiation amount detected by the solar radiation sensor 56 (solar radiation direction calculating member, solar radiation intensity calculating member: step S13).

Figure 11:
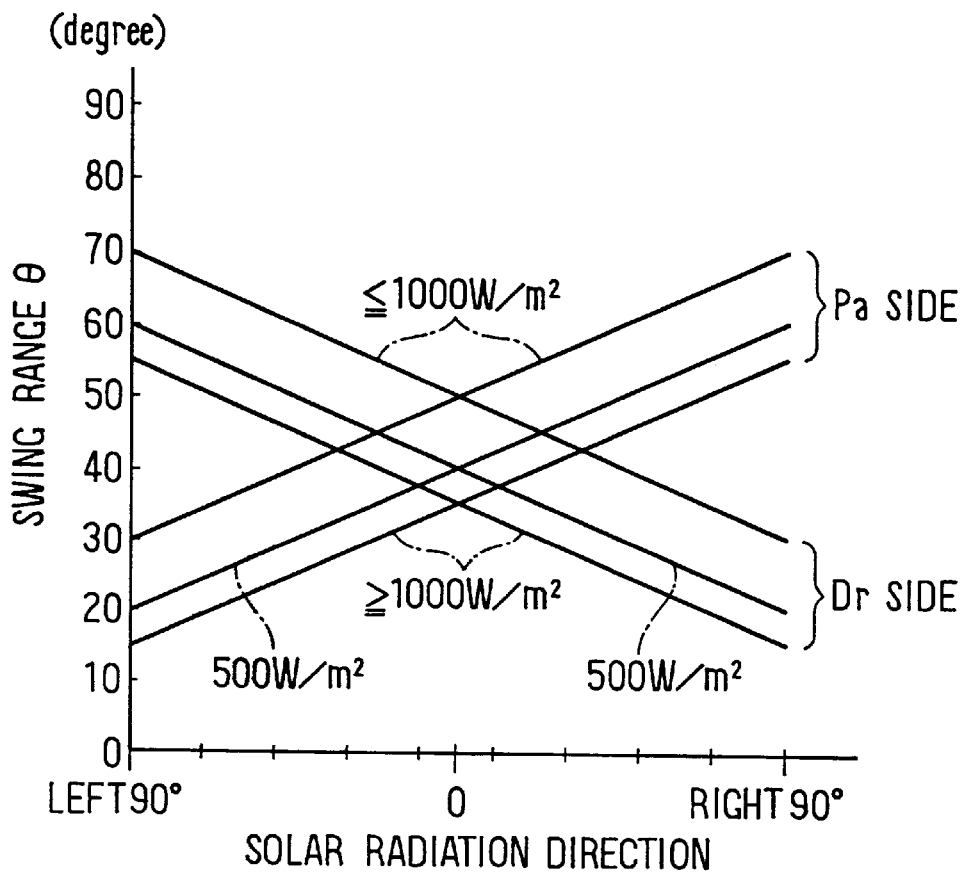
FIG. 11 is a characteristic diagram showing swing ranges in respect of a solar radiation direction and a solar radiation intensity according to the first embodiment of the present invention.
Figure 12:
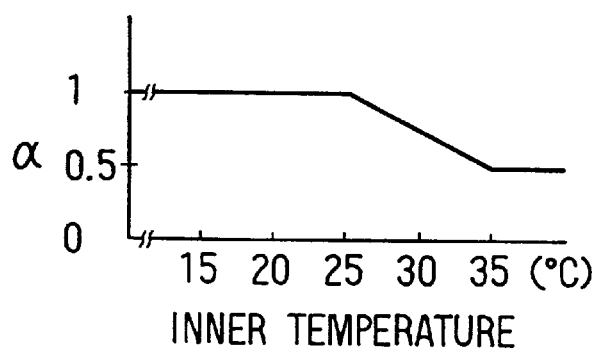
FIG. 12 is a characteristic diagram showing a correction coefficient in respect of inner air temperature according to the first embodiment of the present invention.

Next, the operation calculates the swing ranges (swing angles) θ(Dr) and θ(Pa) of the swing louvers 43 and 46 of the blow condition changing devices of the respective grilles 41a, 41b, 42a and 42b (respective FACE blow outlets 21a, 21b, 22a, 22b) based on the solar radiation direction and the solar radiation intensity of the driver seat side air conditioning zone and the solar radiation direction and the solar radiation intensity of the passenger seat side air conditioning zone which have been calculated at step S13 and a characteristic diagram of FIG. 11 (swing range calculating means: step S14).

Next, the operation carries out an inner air temperature compensation (correction) in respect of the swing ranges θ(Dr) and θ(Pa) of the swing louvers 43 and 46 which have been calculated at step S14. Specifically, the operation calculates target swing ranges θ(Dr) and θ(Pa) based on the swing ranges θ(Dr) and θ(Pa) of the swing louvers 43 and 46, a characteristic diagram of FIG. 12, Equation 5 and Equation 6 specified below (inner air temperature correction member: step S15). Thereafter, the operation finishes with the routine of FIG. 10.

$$\theta(Dr)=\theta(Dr)\times\alpha \quad \text{(Equation 5)}$$

$$\theta(Pa)=\theta(Pa)\times\alpha \quad \text{(Equation 6)}$$

Next, an explanation will be given of control of determining swing speeds of swing louvers by the air conditioning ECU 50 in reference to FIG. 13 through FIG. 15.

Figure 13:
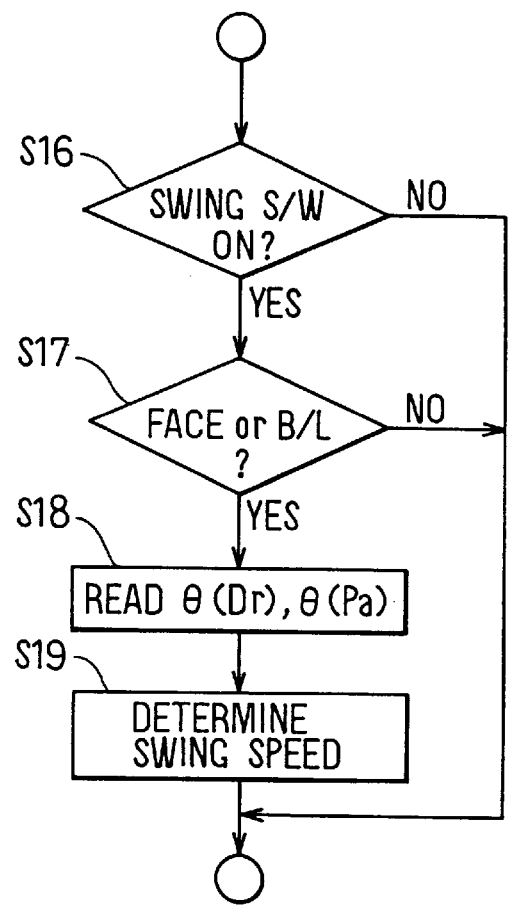
FIG. 13 is a flowchart showing determination of swing speeds of swing louvers according to the first embodiment of the present invention.

First, when routine of FIG. 13 is started, the operation determines whether the swing switch 53 is turn on (ON) (step S16). When a result of determination is NO, the operation finished with the routine of FIG. 13.

Further, when the result of determination at step S16 is YES, the operation determines whether the air outlet mode is the FACE mode or the B/L mode (step S17). When the result of determination is NO, the operation finishes with the routine of FIG. 13.

Further, when the result of determination at step S17 is YES, the operation reads the swing ranges θ(Dr) and θ(Pa) of the swing louvers 43 and 46 of the respective grilles 41*a*, 41*b*, 42*a* and 42*b* which have been calculated at step S14 of FIG. 10 mentioned above (step S18).

Next, the operation calculates the swing speeds of the swing louvers 43 and 46 of the respective FACE blow outlets based on the swing ranges θ(Dr) and θ(Pa) of the swing louvers 43 and 46 which have been read at step S18 mentioned above and characteristic diagrams of FIG. 14 and FIG. 15 (step S19). Thereafter, the operation finishes with the routine of FIG. 13.

Specifically, the swing speed of the swing louvers 43 and 46 becomes higher in proportion to the increase of the swing range of the swing louvers 43 and 46 to keep the swing cycle constant. Conversely, the swing speed of the swing louvers 43 and 46 becomes lower in proportion to the decrease of the swing range of the swing louvers 43 and 46 to keep the swing cycle constant.

Next, an explanation will be given of the operation of the vehicle air conditioning apparatus according to the embodiment in reference to FIG. 1 through FIG. 15.

When the swing switch 53 is turn on (ON), in the case where the air outlet mode is the FACE mode (may be B/L mode), outer air sucked from the outer air intake port 7 by the operation of the blower 4 is cooled down to, for example, about 4° C., thereafter, air enters the first and the second air passages 11 and 12 and an amount of passing the heater core 13 is adjusted in accordance with opening degrees of the driver seat side and the passenger seat side air mix doors 15 and 16 to thereby constitute air conditioned blown air at optimum temperature, respectively.

Thereafter, air conditioned blown air (the cooled wind) is blown to the driver seat side air conditioning zone and the passenger seat side air conditioning zone from the driver seat side center FACE blow outlet 21*a*, the driver seat side side FACE blow outlet 22*a*, the passenger seat side center FACE blow outlet 21*b* and the passenger seat side side FACE blow outlet 22*b* which are opened at the most downstream ends of the first and the second air passages 11 and 12. Particularly, the cooled wind is blown toward the upper half of the body (head, breast) of the passenger of a vehicle at a driver's seat from the driver seat side center FACE blow outlet 21*a* and the driver seat side side FACE blow outlet 22*a* and blown out to the upper half of the body (head, breast) of a passenger at a passenger's seat from the passenger seat side center FACE blow outlet 21*b* and the passenger seat side side FACE blow outlet 22*b*.

In this case, the operation calculates the solar radiation direction and the solar radiation intensity of the driver seat side air conditioning zone and the solar radiation direction and the solar radiation intensity of the passenger seat side air conditioning zone based on the solar radiation amount detected by the solar radiation sensor 56. Further, the operation calculates the swing ranges θ(Dr) and θ(Pa) constituting swing angles of the swing louvers 43 and 46 of respective FACE blow outlets 21*a*, 21*b*, 22*a* and 22*b* based on the calculated value of the solar direction and the solar intensity and the characteristic diagram of FIG. 11.

For example, according to the swing range θ(Dr) which is equal to a total swinging angle of the swing louvers 43 of the driver seat side center FACE blow outlet 21*a* and the driver seat side side FACE blow outlet 22*a*, is 20° when the solar radiation direction A is 60° on the right side of the progressing direction of the vehicle and the solar intensity is 1000 W/m$^2$ or higher, and 30° when the solar radiation intensity is 500 W/m$^2$ and 35° when the solar radiation intensity is 100 W/m$^2$ or lower as shown by FIG. 1 and the characteristic diagram of FIG. 11. Accordingly, the swing range θ(Dr) of the swing louver 43 is set such that even in the case of the same solar radiation direction, the larger the solar radiation intensity, the narrower the swing range θ(Dr) of the swing louver 43 is set. Further, the same goes with the swing range θ(Dr) of the swing louver 46.

Further, for example, as shown by FIG. 1 and the characteristic diagram of FIG. 11, the swing range θ(Dr) of the swing louvers 43 of the driver seat side center FACE blow outlet 21*a* and the driver seat side side FACE blow outlet 22*a*, is 55° in the case of the radiation intensity of the 500 W/m$^2$ and the radiation direction A is 60° on the left side of the progressing direction of the vehicle and 40° when the solar radiation direction A is 0° which is equal to the progressing direction of the vehicle and 30° when the solar radiation intensity is 500 W/m$^2$ and the solar radiation direction A is 60° on the right side of the progressing direction of the vehicle. Further, the same goes with the swing range θ(Dr) of the swing louver 46.

Further, as shown by FIG. 1 and the characteristic diagram of FIG. 11, the swing range θ(Pa) of the swing louvers 43 of the passenger seat side center FACE and side FACE blow outlets 21*b* and 22*b*, is 45° when the solar radiation direction A is 60° on the right side of the progressing direction of the vehicle and the solar radiation intensity is 1000 W/m$^2$ or higher and 55° when the solar radiation intensity is 500 W/m$^2$ and 65° when the solar radiation intensity is 100 W/m$^2$ or lower. Accordingly, the swing range θ(Pa) of the swing louver 43 is set such that even in the case of the same solar radiation direction, the larger the solar radiation intensity, the narrower the swing range θ(Pa) of the swing louver 43 is set. Further, the same goes with the swing range θ(Pa) of the swing louver 46.

Further, as shown by FIG. 1 and the characteristic diagram of FIG. 11, for example, the swing range θ(Pa) of the swing louvers 43 of the passenger seat side center FACE and side FACE blow outlets 21*b* and 22*b*, in the case of the solar radiation intensity of 500 W/m$^2$, when the solar radiation direction A is 60° on the left side of the progressing direction of the vehicle and 40° when the solar radiation direction A is 0° which is equal to the progressing direction of the vehicle and 55° in the case of the solar radiation intensity of 500 W/m$^2$, when the solar radiation direction A is 60° on the right side of the progressing direction of the vehicle. Further, the same goes with the swing range θ(Pa) of the swing louver 46.

In this case, according to the embodiment, the swing ranges θ(Dr) and θ(Pa) of the swing louvers 43 are corrected in accordance with not only the air conditioning thermal load of the solar radiation amount detected by the solar radiation sensor 56 or the like but also the air conditioning thermal load of the driver seat side and the passenger seat side air conditioning zones. For example, the lower the set temperatures Tset(Dr) and Tset(Pa) on the driver seat side and the passenger seat side which are set by the driver seat side and the passenger seat side temperature setting switches 51 and 52, the narrower the swing ranges θ(Dr) and θ(Pa) of the swing louvers 43 are corrected to set. Further, the larger the temperature deviations between the set temperatures Tset(Dr) and Tset(Pa) on the driver seat side and the passenger seat side and the inner air temperature (TR) detected by the inner air temperature sensor 54, the narrower the swing ranges θ(Dr) and θ(Pa) of the swing louvers 43 are corrected to set. Further, the same goes with the swing ranges θ(Dr) and θ(Pa) of the swing louvers 46.

Further, the swing speeds are determined in accordance with the determined swing ranges θ(Dr) of the swing louvers 43 and 46 of the driver seat side center FACE and side FACE blow outlets 21a and 22a and the determined swing ranges θ(Pa) of the swing louvers 43 and 46 of the passenger seat side center FACE and side FACE blow outlets 21b and 22b.

Figure 14:
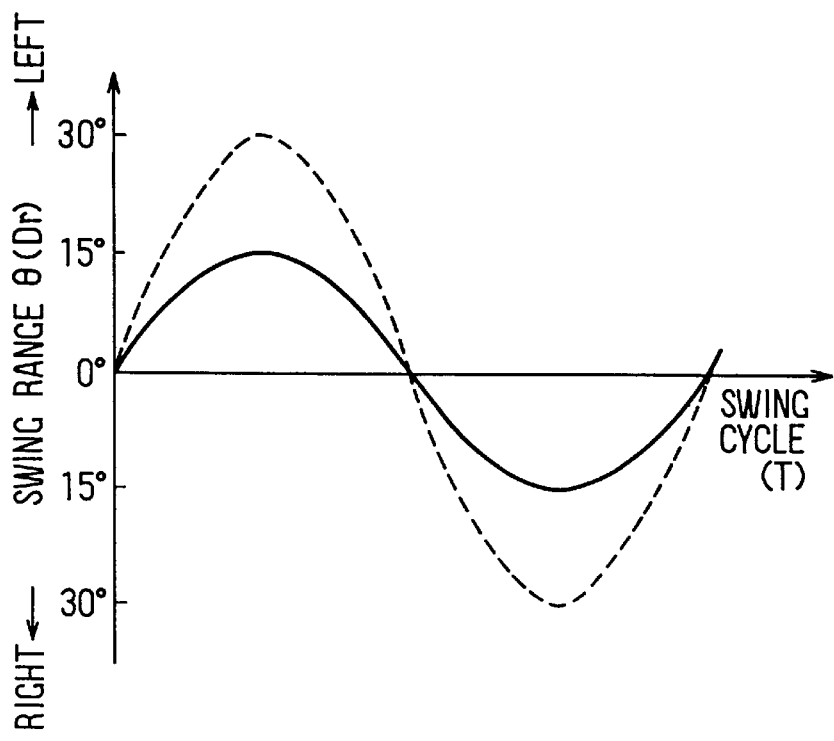
FIG. 14 is a time chart showing a swing range and a swing cycle of a swing louver of the blow condition changing device according to the first embodiment of the present invention.

A swing speed of the swing louvers 43 of the driver seat side center FACE and side FACE blow outlets 21a and 22a becomes a speed indicated by a bold line in the characteristic diagram of FIG. 14 in the case where the swing range θ(Dr) is within 15° from center in left and right direction (up and down direction) and is a speed indicated by a broken line in the characteristic diagram of FIG. 14 in the case where the swing range θ(Dr) is within 30° from center in left and right direction (up and down direction). Thereby, even when the swing range θ(Dr) is changed, the swing louver 43 is swung always at a constant period. Further, the same goes with the swing range θ(Dr) of the swing louver 46.

Figure 15:
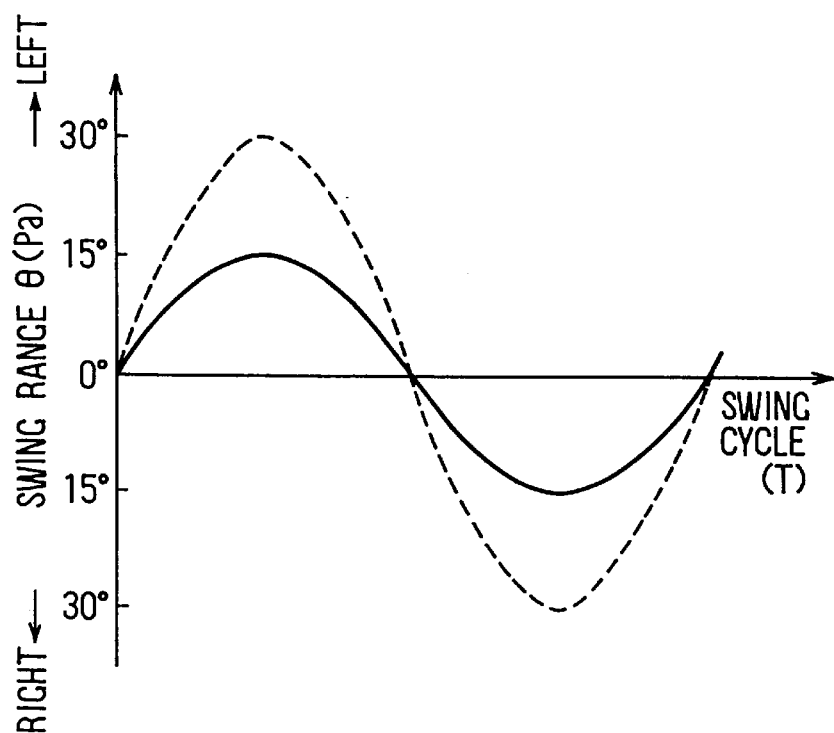
FIG. 15 is a time chart showing a swing range and a swing cycle of a swing louver of the blow condition changing device according to the first embodiment of the present invention.
Figure 16A:
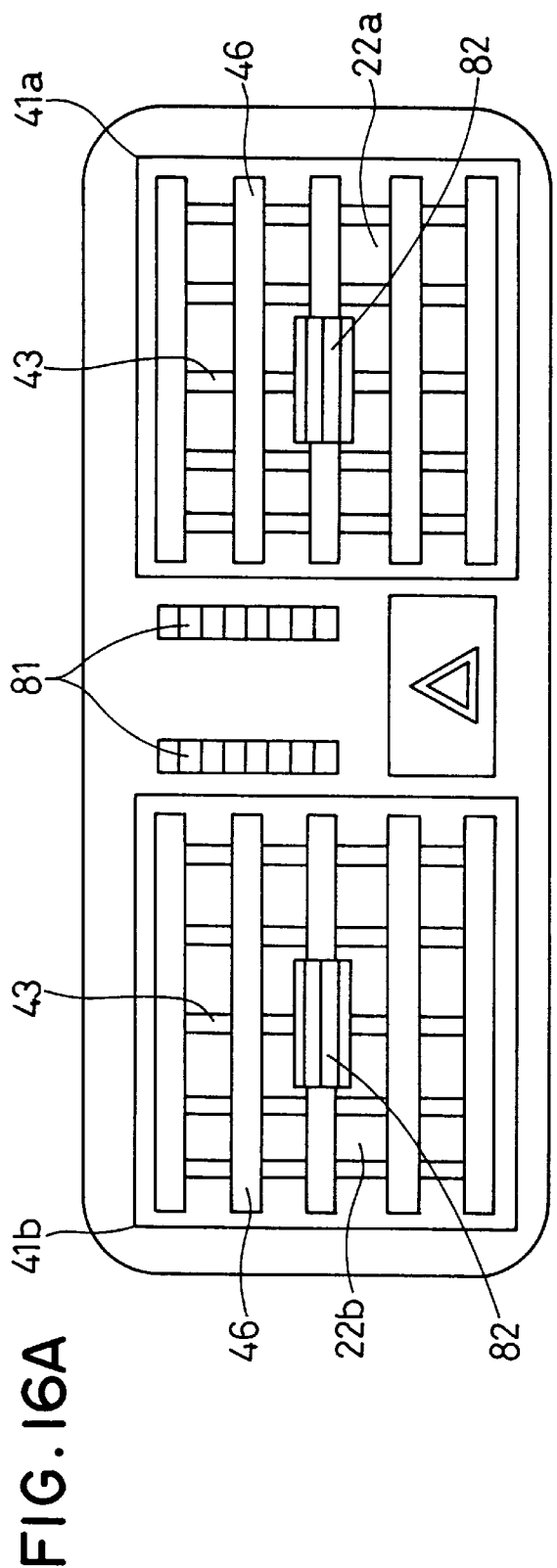
FIGS. 16A and 16B are front views showing an operation panel of an air conditioner according to a second embodiment of the present invention.
Figure 16B:
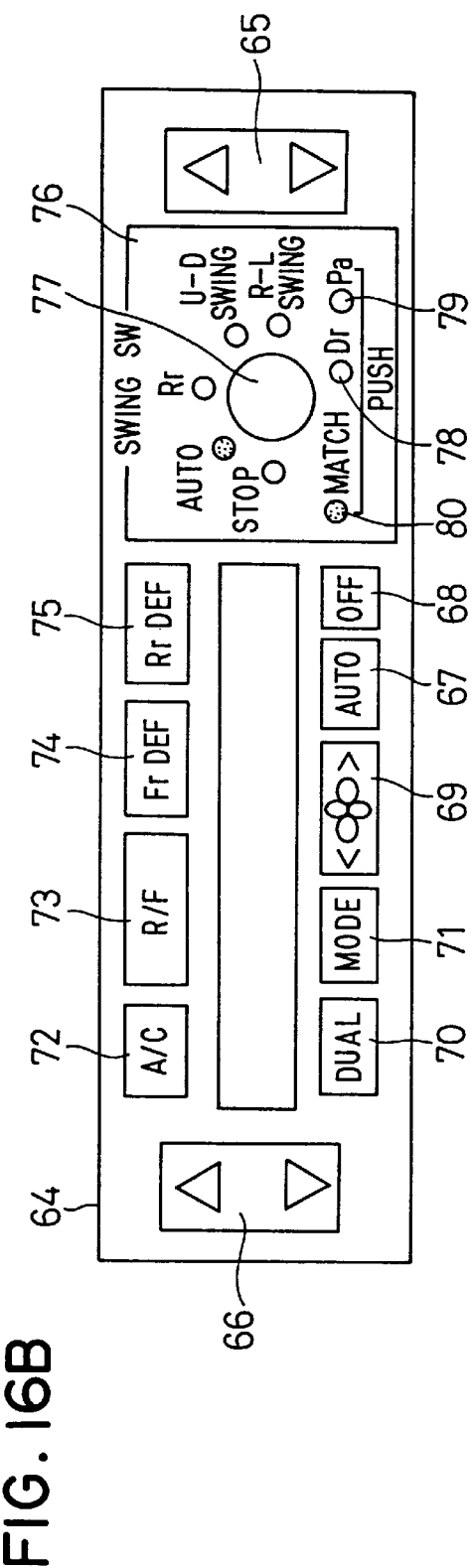
Figure 17:
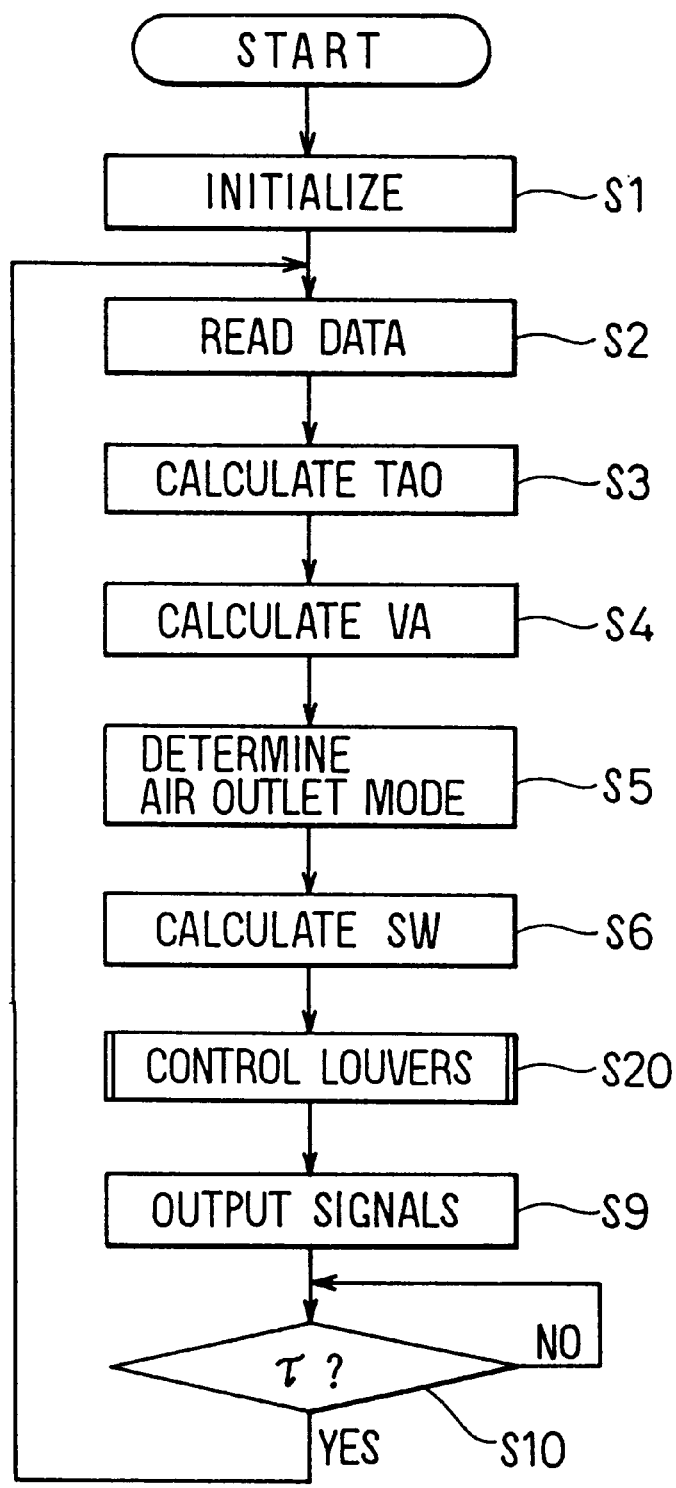
FIG. 17 is a flowchart showing an example of a control program of ECU of an air conditioner according to the second embodiment of the present invention.

Further, similarly, the swing speed of the swing louvers 43 of the passenger seat side center FACE and side FACE blow outlets 21b and 22b becomes a speed indicated by a bold line in the characteristic diagram of FIG. 15 in the case where the swing range θ(Pa) is within 15° in left and right direction (up and down direction) and a speed shown by a broken line in the characteristic diagram of FIG. 15 in the case where the swing range θ(Pa) is within 30° from center in left and right direction (up and down direction). Thereby, the swing louver 43 is swung always at a constant period even when the swing range θ(Pa) is changed. Further, the same goes with the swing range θ(Pa) of the swing louver 46.

According to the vehicle air conditioning apparatus of the first embodiment, the larger the air conditioning thermal load at inside of the vehicle compartment (for example, the larger the solar radiation amount, the lower the set temperature or the larger the temperature deviation between the set temperature and the inner air temperature), the narrower the swing ranges of the swing louvers 43 and 46 become, and accordingly, the cooled wind is supplied to a passenger of a vehicle on the driver seat side of a passenger of the vehicle on the passenger seat side locally (in a spot-like shape). Further, the swing speeds of the swing louvers 43 and 46 are also retarded and accordingly, the cooled wind is supplied intensively at a portion of the body intended to provide the cooled wind feeling and accordingly, agreeable feeling of passengers of the vehicle can significantly be promoted.

Further, even when the swing ranges of the swing louvers 43 and 46 are narrowed, directions of blowing the cooled wind blown from the respective FACE blow outlets 21a, 21b, 22a and 22b are not frequently changed and accordingly, a passenger of a vehicle on the driver seat side or a passenger of a vehicle on the passenger seat side is not annoyed and unpleasant feeling of the passenger of a vehicle on the driver seat side or a passenger of a vehicle on the passenger seat side can be resolved.

Conversely, the smaller the air conditioning thermal load at inside of the vehicle compartment (for example, the smaller the solar radiation amount, the higher the set temperature or the smaller the temperature deviation between the set temperature and the inner temperature), the wider the swing ranges of the swing louvers 43 and 46 become and accordingly, the cooled wind is supplied to the passenger of a vehicle on the driver seat side or the passenger of a vehicle on the passenger seat side in a wide range. Further, the swing speeds of the swing louvers 43 and 46 are accelerated and accordingly, unpleasant feeling (cold feeling) as a result of receiving the cooled wind intensively at a specified portion can be prevented as less as possible and accordingly, the pleasant feeling of the passengers in the vehicle can significantly be promoted.

Furthermore, according to the embodiment, the swing ranges of the swing louvers 43 and 46 of the driver seat side center FACE and side FACE blow outlets 21a and 22a for blowing the cooled wind in the driver seat side air conditioning zone, can be made different from the swing ranges of the swing louvers 43 and 46 of the passenger seat side center FACE and side FACE blow outlets 21b and 22b for blowing the cooled wind into the passenger seat side air conditioning zone and accordingly, a pleasant air conditioning state in correspondence with the air conditioning feeling and the air conditioning thermal load of a passenger of a vehicle on the driver seat side and a passenger of a vehicle on the passenger seat side, can be formed.

Here, when the swing louvers 43 of the driver seat side center grille and the passenger seat side center grille 41a and 41b are initially moved, there is a case where the swing louvers 43 of the respective grilles 41a and 41b are swung such that a direction of blowing the cooled wind to a passenger of a vehicle on the driver seat side and a direction of blowing the cooled wind to a passenger of a vehicle on the passenger seat side, are made proximate to each other. In this case, the swing cycles of the swing louvers 43 of the respective grilles 41a and 41b are set to a constant period even when both of the swing ranges of the driver seat side center grille 41a and the passenger seat side center grille 41b are narrowed because the air conditioning thermal load of the driver seat side air conditioning zone and the passenger seat side air conditioning zone is large.

Thereby, even when the direction of blowing the cooled wind blown from the driver seat side center FACE blow outlet 21a is mostly made proximate to the passenger of the vehicle on the passenger seat side, the direction of blowing the cooled wind blown from the passenger seat side center FACE blow outlet 21b is mostly made proximate to the passenger of the vehicle on the driver seat side. Accordingly, an air curtain is formed between the passenger of the vehicle on the driver seat side and the passenger of the vehicle on the passenger seat side and accordingly, in the case where temperature control of the driver seat side air conditioning zone and temperature control of the passenger seat side air conditioning zone are carried out independently from each other, independent temperature control performances of the driver seat side air conditioning zone and the passenger seat side air conditioning zone can be promoted.

Second Embodiment

FIGS. 16, 17, 18, 19A, 19B, 19C, 20, 21A, 21B, 22A, 22B, 22C, 22D, 23A, 23B, 24A, 24B, 24C, 25, 26A, 26B, 26C, 26D and 26E show a second embodiment of the present invention.

According to the embodiment, the driver seat side side FACE and the passenger seat side side FACE blow outlets 22a and 22b are always opened even when the air outlet mode is the FOOT mode, the F/D mode or the DEF mode for removing fogging of inner faces of neighboring side windows and defogging thereof. Further, according to the embodiment, the plurality of sheets of swing louvers 43 and 46 installed at the driver seat side center FACE and the passenger seat side center FACE blow outlets 21a and 21b, are referred to as center louvers 43 and 46 and the plurality of sheets of the swing louvers 43 and 46 installed at the driver seat side side FACE and the passenger seat side side FACE blow outlets 22a and 22b are referred to as side louvers 43 and 46. Further, the solar radiation sensor 56 according to the embodiment is provided with solar radiation intensity detecting member for detecting a solar radiation amount irradiated into the vehicle compartment, solar direction detecting member for detecting a direction of irradiating solar ray and solar radiation elevation detecting member for detecting elevation of solar ray.

Further, an air conditioner operation panel 64 is arranged with a driver seat side temperature setting switch 65, a passenger seat side temperature setting switch 66, an AUTO switch 67 for instructing automatic control, an OFF switch 68 for instructing to stop control, a blower switch 69 for setting a wind amount level of the blower 4, a DUAL switch 70 for carrying out temperature control of the driver seat side and the temperature control of the passenger seat side independently from each other, a MODE switch 71 for switching the air outlet mode, an A/C switch 72 for instructing operation and stoppage of a refrigerating cycle, an R/F switch 73 for switching the intake port mode, an FrDEF switch 74 for preventing fogging of a front window, an RrDEF switch 75 for preventing fogging of a rear window, a louver operation panel 76 for operating blow condition changing devices and so on. The various switches may be installed in a remote controller for carrying out remote operation.

Among them the louver operation panel 76 is installed with an operation mode changeover switch 77 of the blow condition changing devices, five pieces of LCDs (Liquid Crystal Display) which are turned on in accordance with the switched operation modes, a driver seat side push bottom 78 for operating only the blow condition changing devices on the driver seat side, a passenger seat side push bottom 79 for operating only the blow condition changing devices on the passenger seat side and a MATCH push bottom 80 for operating both of the blow condition changing devices on the driver seat side and the passenger seat side. Further, the operation mode changeover switch 77 can be switched by turning it to respective operation modes of "STOP" for stopping the operation of the blow condition changing devices, "AUTO" for automatically controlling the operation of the blow condition changing devices (automatic louver control), "Rr" for increasing a blown air amount to the rear seat side air conditioning zone, "R-L/SWING" for operating the louver left and right direction swing mechanism, "U-D/SWING" for operating only the louver up and down direction swinging mechanism and so on. In the drawing, numeral 81 designates operation levers for manually operating shutter mechanism (not illustrated) for opening and closing the respective center FACE blow outlets 21a and 21b and numeral 82 designates knobs for changing directions of the swing louvers 43 and 46 by manual operation of passengers of a vehicle.

Next, an explanation will be given of a method of controlling air conditioning by the air conditioning ECU 50 according to the embodiment in reference to FIGS. 16, 17, 18, 19A, 19B, 19C, 20, 21A, 21B, 22A, 22B, 22C, 22D, 23A, 23B, 24A, 24B, 24C, 25, 26A, 26B, 26C, 26D and 26E.

Figure 7:
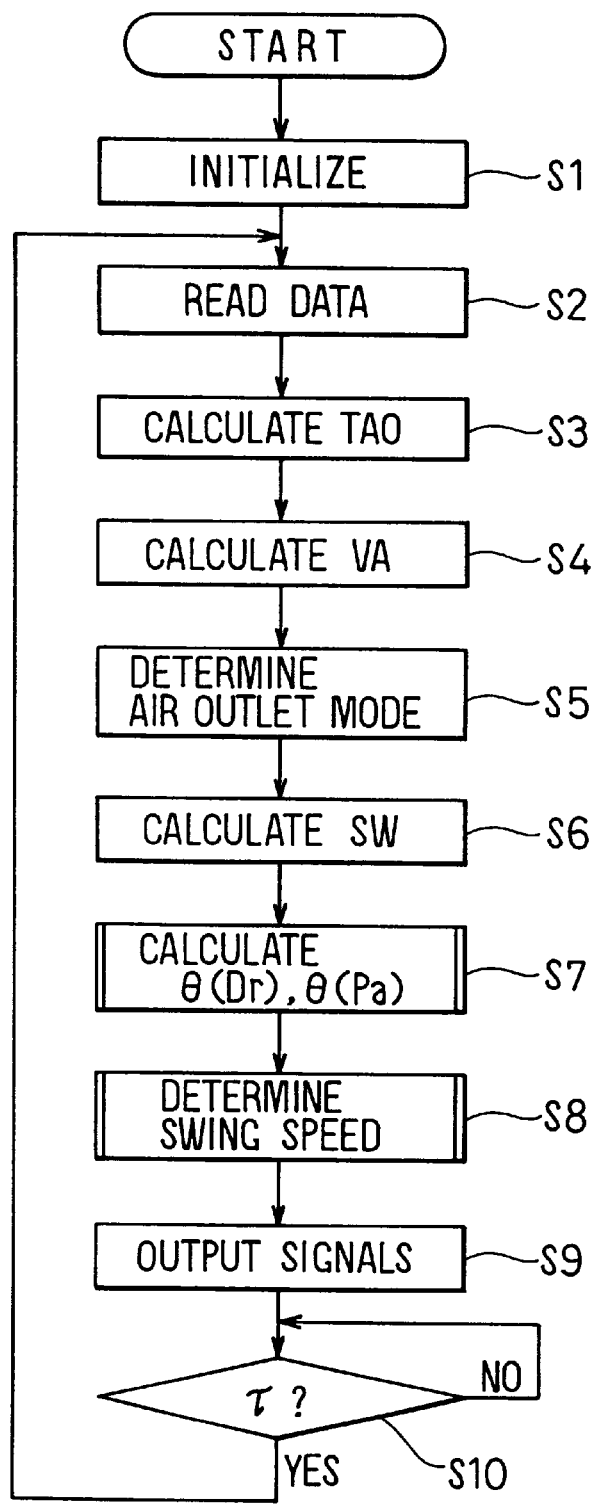
FIG. 7 is a flowchart showing an example of control program of ECU (Electronic Control Unit) of an air conditioner according to the first embodiment of the present invention.
Figure 8:
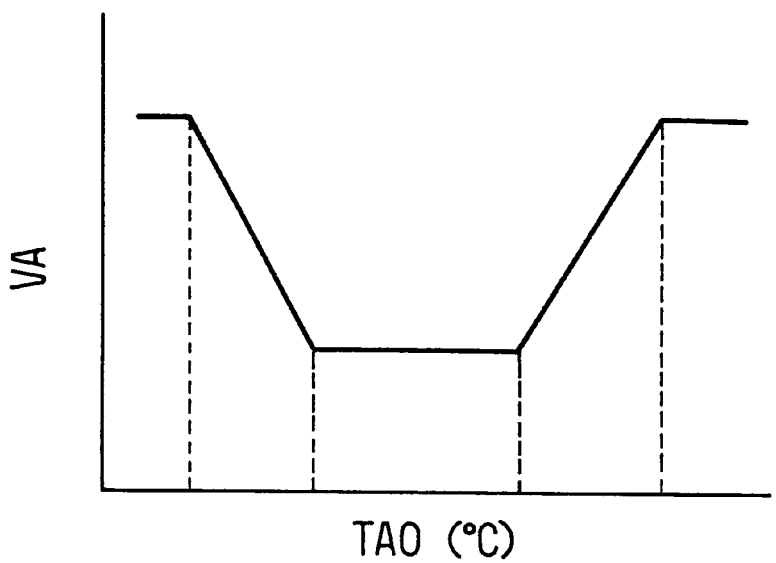
FIG. 8 is a characteristic diagram showing a characteristic of blower control voltage in respect of target blow temperature according to the first embodiment of the present invention.

An explanation will be given of the embodiment only in respect of a point different from the flowchart of FIG. 7 according to the first embodiment. That is, after finishing the control processing of step S6 in FIG. 17, automatic louver control of the center louvers 43 and 46 and the side louvers 43 and 46 of the blow condition changing devices is carried out by starting routine of FIG. 18 (step S20). Thereafter, the control processing of step S9 similar to that in the first embodiment is carried out.

Figure 18:
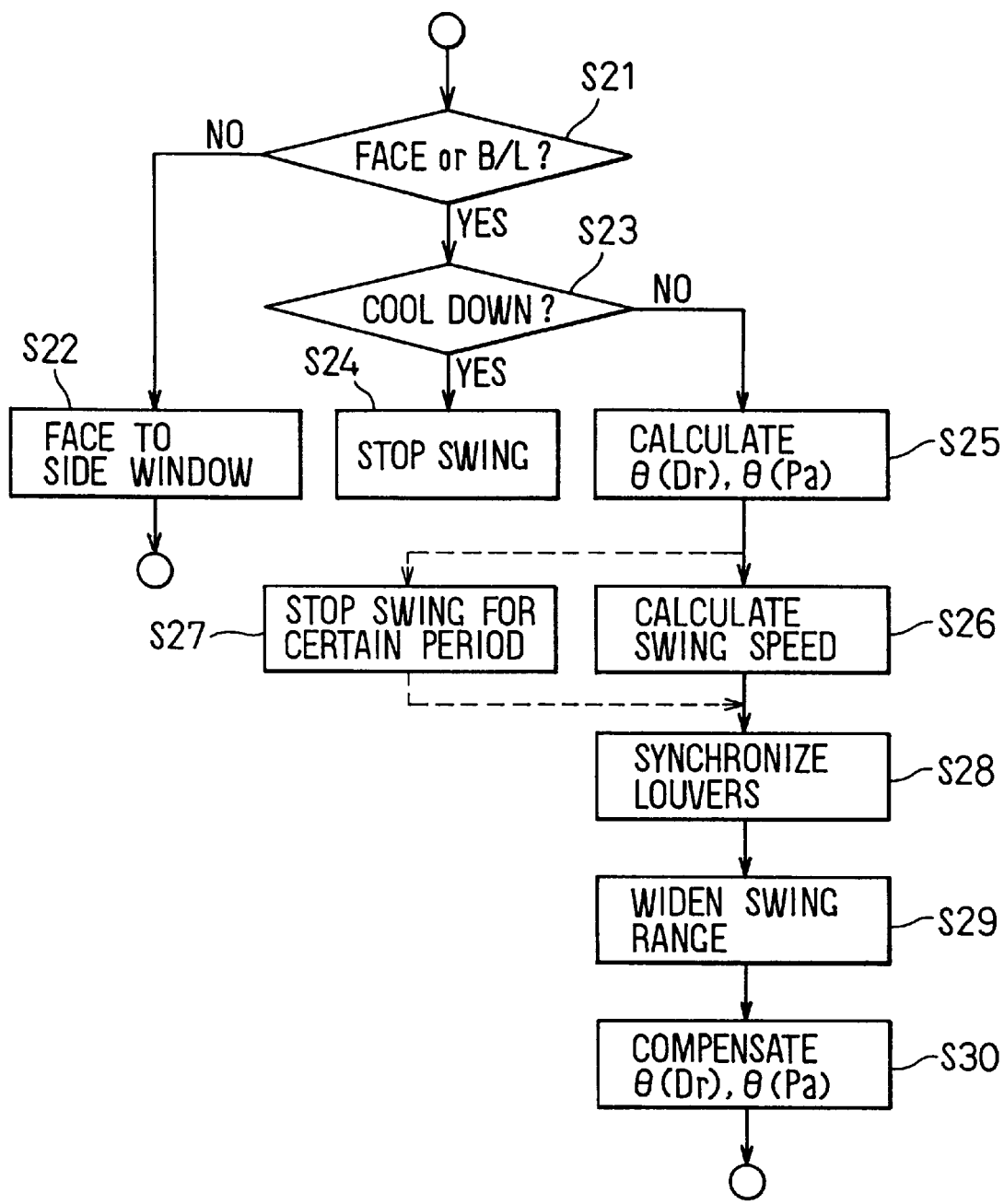
FIG. 18 is a flowchart showing automatic louver control according to the second embodiment of the present invention.
Figure 19A:
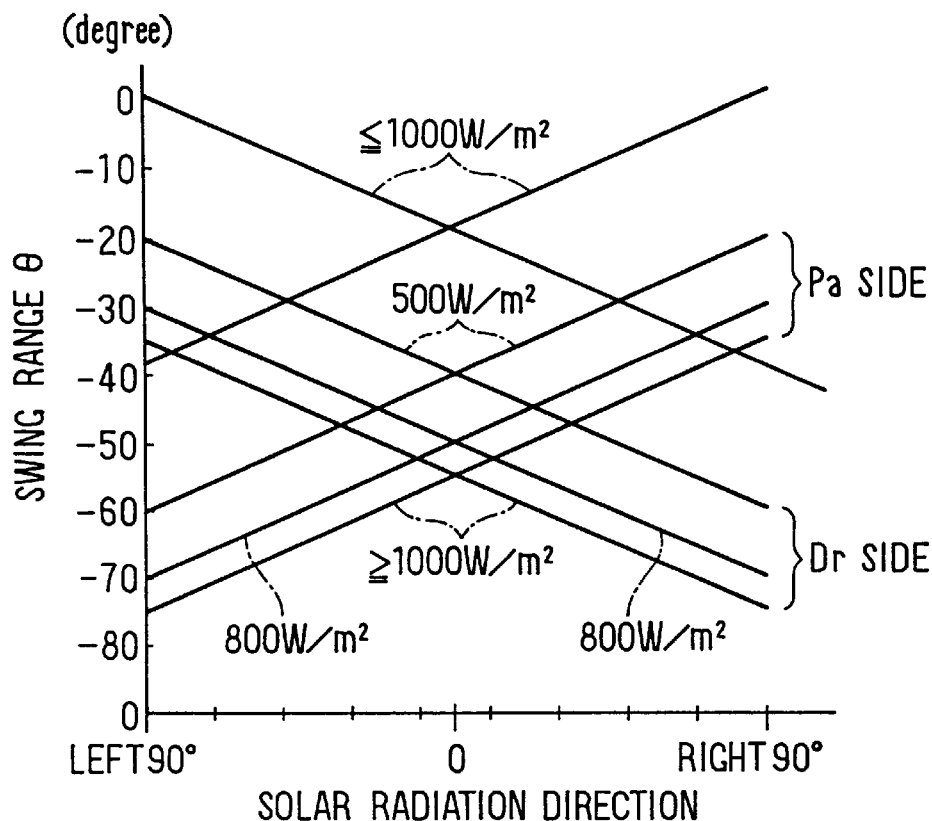
FIG. 19A is a characteristic diagram showing swing ranges in respect of a solar radiation direction and a solar radiation intensity according to the second embodiment of the present invention.
Figure 19B:
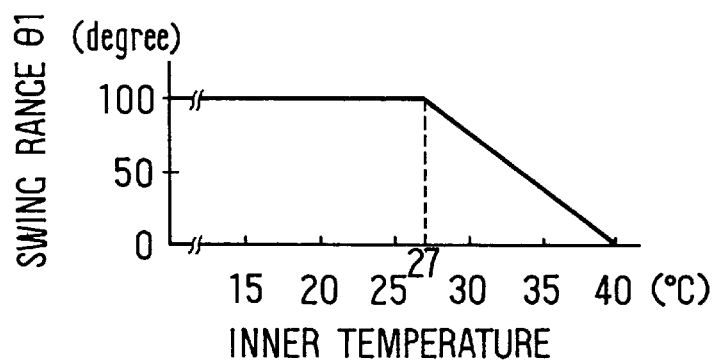
FIG. 19B is a characteristic diagram showing an inner air temperature correction of the swing range according to the second embodiment of the present invention.
Figure 19C:
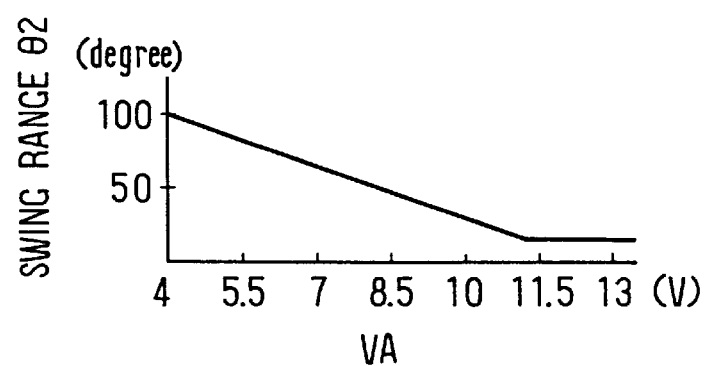
FIG. 19C is a characteristic diagram showing a blower control voltage correction of the swing range according to the second embodiment of the present invention.
Figure 20:
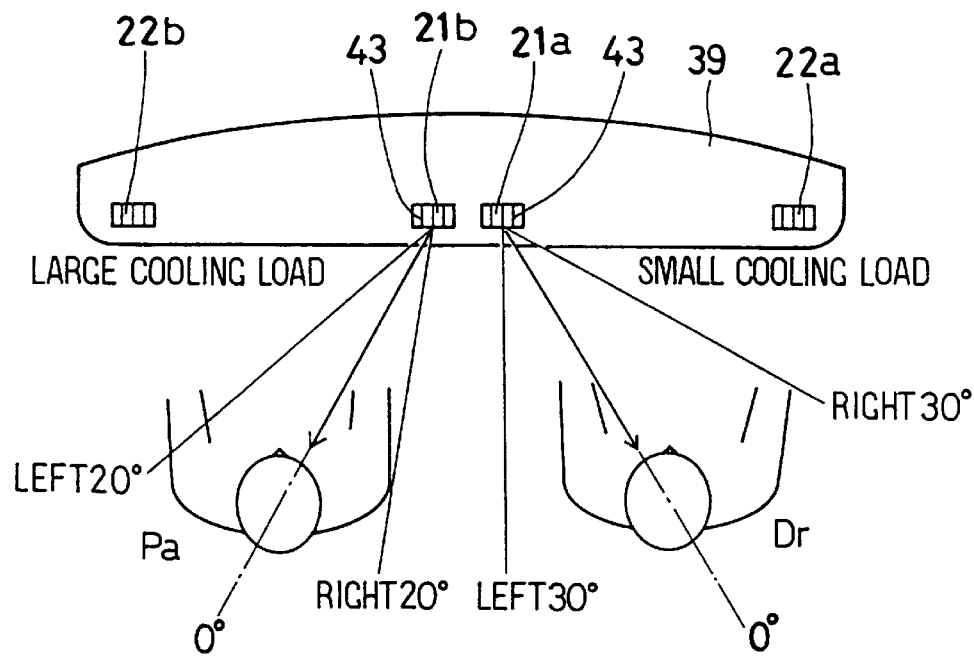
FIG. 20 is an explanatory view showing swing ranges in accordance with magnitude of air conditioning thermal loads according to the second embodiment of the present invention.

Next, an explanation will be given of the automatic louver control by the air conditioning ECU 50 in reference to FIGS. 18, 19A, 19B, 19C, 20, 21A, 21B, 22A, 22B, 22C, 22D, 23A, 23B, 24A, 24B, 24C, 25, 26A, 26B, 26C, 26D and 26E. FIG. 18 is a flowchart showing the automatic louver control by the air conditioning ECU 50.

First, when the routine of FIG. 18 is started, the operation determines whether the air outlet mode is the FACE mode or the B/L mode (step S21). When a result of determination is NO, that is, when the air outlet mode is the FOOT mode, the F/D mode or the DEF mode, directions of the louvers are determined such that the respective side louvers 43 and 46 are directed to neighboring side windows with a purpose of defogging the side windows and cutting cold radiation thereof (louver direction determining member: step S22). Thereafter, the operation finishes with the routine of FIG. 18.

Further, when the result of determination at step S21 is YES, that is, when the air outlet mode is the FACE or the B/L mode, the operation determines whether the vehicle compartment is to be cooled down. That is, the operation determines whether Equation 7 and Equation 8 specified below are satisfied (step S23).

$$5\ (^\circ C.) < \{TR - Tset(Dr)\} \qquad \text{Equation 7}$$

$$5\ (^\circ C.) < \{TR - Tset(Pa)\} \qquad \text{Equation 8}$$

where notation TR designates the inner air temperature detected by the inner air temperature sensor 54 and notations Tset(Dr) and Tset(Pa) are set temperatures on the drivers seat side and the passenger seat side which have been set by the drivers seat side and the passengers seat side temperature setting switches 65 and 66. Further, it is preferable that a criterion of the cooled-down state is varied by the air conditioning thermal load at an initial stage of air conditioning.

When the result of determination of step S23 is YES, that is, in the case where the vehicle compartment is to be cooled down, swinging of the respective center and side louvers 43 and 46 are stopped. For example, directions of the driver seat side and the passenger seat side center louvers 43 and 46 as well as directions of the side louvers 43 and 46 on the driver seat side and the passenger seat side are all fixed to directions of passengers (for example, to vicinities of the necks or to vicinities of shoulders of passengers in a vehicle) (step S24). Thereafter, the operation finishes with the routine of FIG. 18.

Further, when a result of determination at step S23 is NO, the operation determines swing ranges in accordance with air conditioning thermal load. That is, the operation determines the swing ranges θ(Dr) and θ(Pa) of the respective center and side louvers 43 and 46 centering on reference positions of swinging (for example, vicinities of the necks of passengers of a vehicle) based on solar radiation direction and solar radiation intensity of the driver seat side air conditioning zone, solar radiation direction and solar radiation intensity of the passenger seat side air conditioning zone and a characteristic diagram of FIG. 19A (swing range determining member).

Next, an inner temperature compensation of the swing ranges of the respective center and side louvers 43 and 46 is carried out (inner temperature compensation means). Further, a blown air amount compensation of the swing ranges of the respective center and side louvers 43 and 46 is carried out (blown air amount compensation means). Specifically, the swing ranges θ(Dr) and θ(Pa) are calculated based on the swing ranges θ(Dr) and θ(Pa) of the swing louvers 43 and 46, a characteristic diagram of FIG. 19B, a characteristic diagram of FIG. 19C and Equations 9 through 12 specified below.

$$\theta(Dr)=\theta(Dr)+\theta 1(Dr) \quad \text{(Equation 9)}$$

$$\theta(Pa)=\theta(Pa)+\theta 1(Pa) \quad \text{(Equation 10)}$$

$$\theta(Dr)=\theta(Dr)+\theta 2(Dr) \quad \text{(Equation 11)}$$

$$\theta(Pa)=\theta(Pa)+\theta 2(Pa) \quad \text{(Equation 12)}$$

Next, the operation determines the swing speeds of the respective center and side louvers 43 and 46 such that the swing cycles are maintained constant regardless of the swing ranges θ(Dr) and θ(Pa) (step S26). That is, although the swing ranges can be calculated for respectives of the center and the side louvers 43 and 46, the swing cycles are equalized to each other regardless of swing ranges in order to ensure excellent outlook and independent control performance. In this case, when the air conditioning thermal load is large and the swing range is narrow, the swing speed is retarded and when the air conditioning thermal load is small and the swing range is wide, the swing speed is accelerated. Further, the swing speed is preferably 10 seconds through 15 seconds.

In this case, when the swing speed is difficult to change, or when the blown air amount to the rear seat side air conditioning zone is intended to increase (when operation mode changeover switch 77 is set to "Rr"), in the case where the respective center louvers 43 are directed to the rear seat side, that is, when blow direction or blow position of air conditioned blown air is deviated from passengers of a vehicle on the front seat side, the swing cycle may be conformed to that of a contiguous one of the center louver 43 by stopping swinging operation for a predetermined period of time (step S27).

Next, timings of the respective center louvers 43 are adjusted regardless of the magnitude of the air conditioning thermal load, that is, regardless of the swing ranges θ(Dr) and θ(Pa) (step S28). Specifically, even when start points of swinging motion of the driver seat side and the passenger seat side center louvers 43 are deviated from each other, based on an explanatory view of FIG. 20 and characteristic diagrams of FIGS. 21A and 21B, a timing where the center louver 43 on the driver seat side is directed to the passenger seat side and a timing where the center louver 43 on the passenger seat side is directed to the driver seat side, are made to coincide with each other.

Figure 21A:
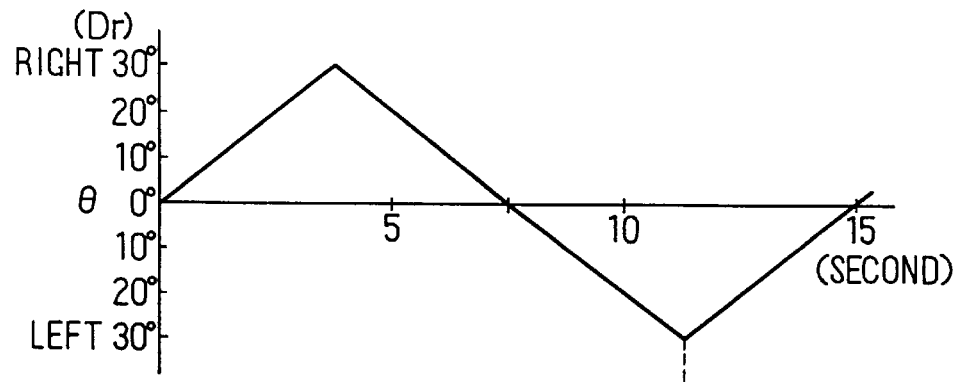
FIG. 21A is a characteristic diagram showing a timing of a center louver on the driver seat side according to the second embodiment of the present invention.
Figure 21B:
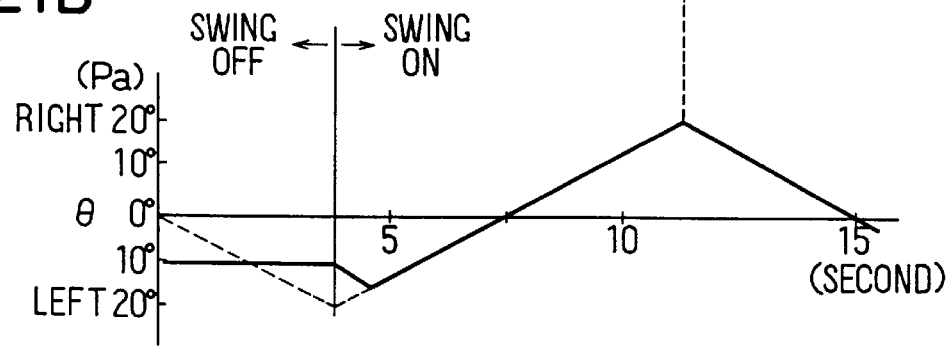
FIG. 21B is a characteristic diagram showing a timing of the center louver on the passenger seat side according to the second embodiment of the present invention.

That is, as shown by FIGS. 21A and 21B, when in swinging the center louver 43 on one side (for example, driver seat side), swinging of the center louver 43 on the other side (for example, passenger seat side) is started, the center louver 43 which has been stopped start operation such that it approaches a route on which it is to be moved originally (broken line in FIG. 21B) and is swung thereafter in an original swing range at an original swing speed. Further, the other one of the center louver 46 and the side louvers 43 and 46 may be controlled similarly. In FIG. 21A, the left 30 is the closest point to the adjacent air conditioning zone (Pa).

Accordingly, even when timings for staring operation of the center louver 43 on the driver seat side and the center louver 43 on the passenger seat side are shifted from each other, in the case where a direction of blowing air conditioned blown air blown from the driver seat side center FACE blow outlet 21a mostly approaches a passenger of a vehicle on the passenger seat side, a direction of blowing air conditioned blown air blown from the passenger seat side center FACE blow outlet 21b mostly approaches a passenger of the vehicle on the driver seat side. Therefore, an air curtain is formed between the passenger of the vehicle on the driver seat side and the passenger of the vehicle on the passenger seat side and accordingly, independent temperature control performances of the driver seat side air conditioning zone and the passenger seat side air conditioning zone can be promoted. Further, timings where the center louvers 43 on the driver seat side and the passenger seat side are directed to central portions in the vehicle direction and timings where they are directed to both sides in the vehicle direction become the same and accordingly, appearance is improved.

Next, in order to prevent influence from being effected in a contiguous air conditioning zone, a restriction region is set in the swing range of each of the center louvers 43 (restriction region setting member). For this purpose, when the swing range which is calculated in accordance with the air conditioning thermal load cannot be maintained, the swing range of each of the center louvers 43 is widened in a direction reverse to the restriction region (blow condition controlling member). Further, directions of widening the swinging operations of the respective center and side louvers 43 are adjusted in directions of enhancing the blown air amount to the rear seat side air conditioning zone (step S29).

That is, at an initial stage of cooling down operation, blow direction or blow position of air conditioned blown air is frequently concentrated on the front seats for safety driving. For example, as shown by FIG. 22A, when the inner air temperature TR is 40° C., the direction of the center louver 43 on the driver seat side is fixed to direct to a vicinity of the shoulder of the passenger of the vehicle on the driver seat side. Further, as shown by FIG. 22B, when the inner air temperature TR to lowered to 38° C., the swing range of the passenger seat side is enlarged such that the center louver 43 on the driver seat side is easy to direct to the rear seat side air conditioning zone by which the air conditioned blown air is blown to the rear seat side air conditioning zone as early as possible, for example, at an early stage of cooling down operation.

Further, as shown by FIGS. 22C and 22D, when the inner air temperature TR is lowered from 35° C. to 30° C., in order to prevent influence from being effected on the contiguous air conditioning zone (passenger seat side air conditioning zone) and in order to supply sufficiently air conditioned blown air to the front seat side air conditioning zone, after widening the swing range to a vicinity of a restriction location of the restriction region, the swing range of the center louver 43 on the driver seat side is enlarged to a side of a side window at this time.

Or, as shown by FIG. 23A, when the inner air temperature TR is lowered from 35° C. to 30° C., in the case where the swing range which has been calculated in accordance with the air conditioning thermal load cannot be maintained, without widening the swing range in a direction reverse to the restriction region, the swinging operation of the respective center louvers 43 may be stopped at a swing end (vicinity of restriction location of restriction region) until elapse of a predetermined time period of stoppage. It is preferable that the time period for stoppage is substantially equal to a time period necessary for exceeding the restriction location and returning again to the restriction location if there were no restriction in movement to the contiguous air conditioning zone. For example, when the inner air temperature TR is 35° C. as in FIG. 23A, the time period for stoppage is 2 seconds and when the inner air temperature TR is 30° C. as in FIG. 23B, the time period for stoppage is 8 seconds.

Figure 24A:
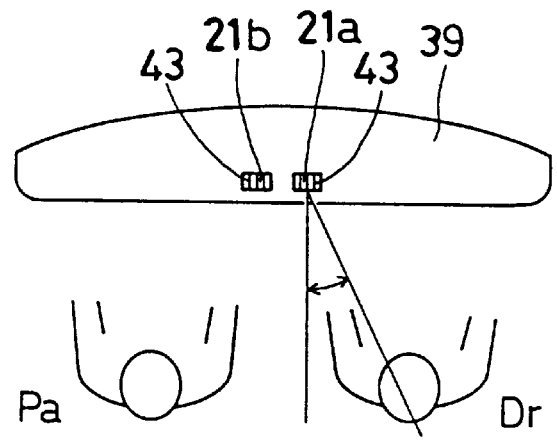
FIGS. 24A, 24B and 24C are explanatory views showing another modified example of way of widening a swing range in respect of inner air temperature according to the second embodiment of the present invention.
Figure 24B:
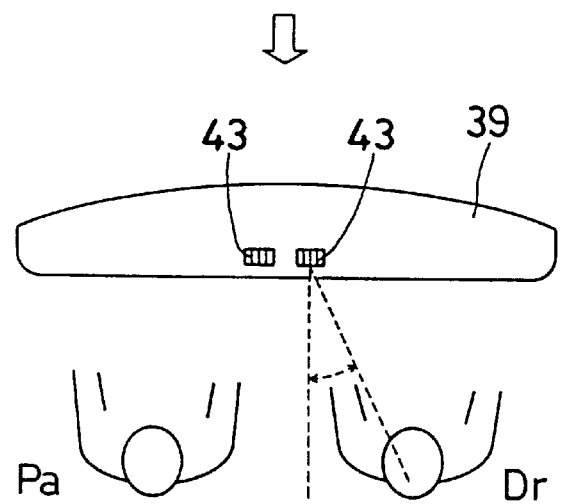
Figure 24C:
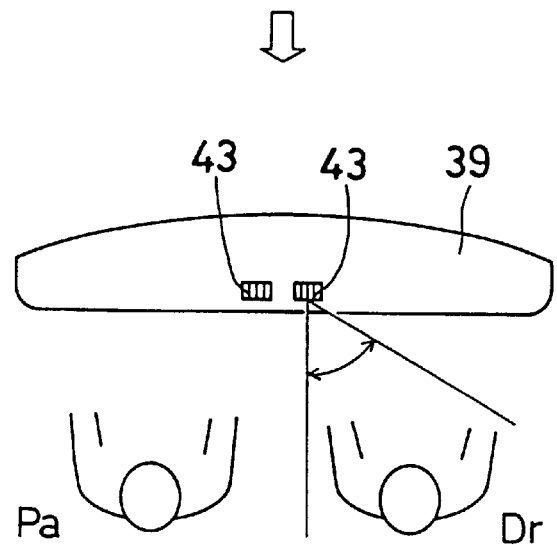

In this way, not only the agreeableness of passengers of a vehicle on the rear seat side where they are liable to dissatisfy can be promoted but also influence to a contiguous air conditioning zone can be reduced. Further, as shown by FIGS. 24A, 24B and 24C, when the stoppage operation of the predetermined time period for stoppage exceeds a predetermined time period, the swing range may be widened in an inverse direction. Thereby, both passengers of a vehicle on the front seat side and the passengers of the vehicle on the rear seat side can be provided with an agreeable air conditioning state.

Next, the swing range is adjusted in respect of solar radiation direction (deviated solar radiation) based on a characteristic diagram of FIG. 25 (step S30). Thereafter, the operation finishes with the routine of FIG. 18.

Figure 26A:
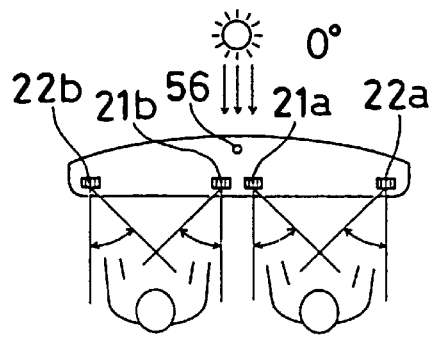
FIGS. 26A, 26B, 26C, 26D and 26E are explanatory views showing a modified example of way of widening swing ranges in respect of a solar radiation direction according to the second embodiment of the present invention.
Figure 26B:
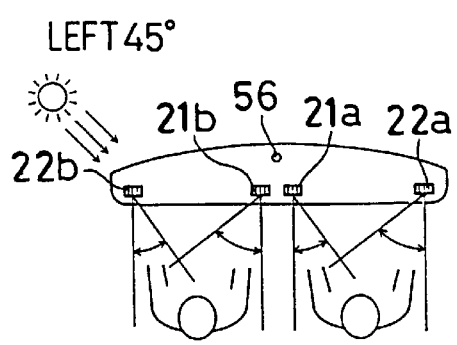
Figure 26C:
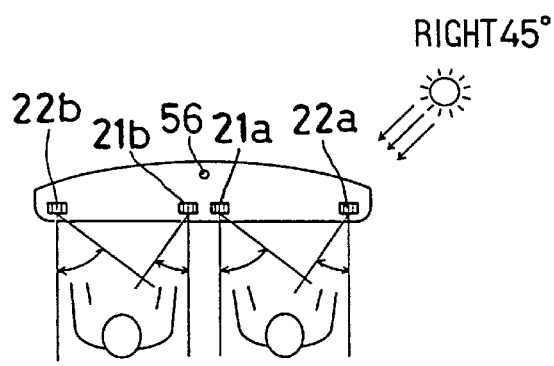
Figure 26D:
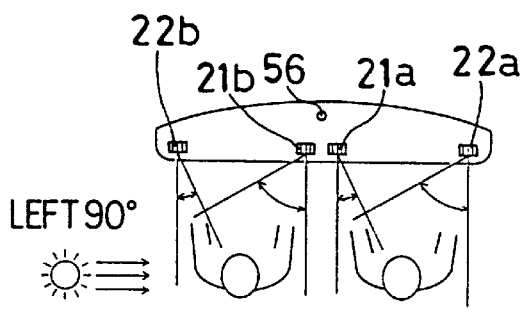
Figure 26E:
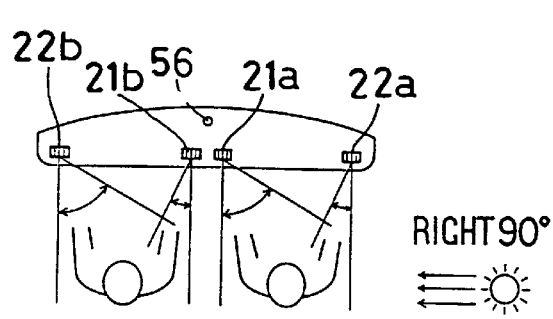

Specifically, as shown by FIG. 26A, when the solar radiation direction is directed to the front face or the right behind of passengers of a vehicle on the front seat (Dr, Pa) side, the influence of solar radiation is effected uniformly in left and right direction and accordingly, deviated solar radiation correction is carried out uniformly in left and right direction. Here, as shown by FIGS. 26A, 26B, 26C, 26D and 26E, when solar radiation is deviated to either of left and right of passengers of a vehicle on the driver seat side and the passenger seat side, the air conditioning thermal load differs depending on the right half of the body and the left half of the body of each of the passengers of the vehicle. Accordingly, the swing ranges of the left and right louvers 43 and 46 for the passengers of the vehicle are made to differ from each other. That is, the swing ranges of the louvers 43 and 46 on the side where the solar radiation is incident are narrowed and the swing ranges of the louvers 43 and 46 on the side where the solar radiation is not incident are widened by which air conditioned blown air in accordance with solar radiation load can be supplied to the passengers of the vehicle.

In this case, although according to the embodiment, the swinging operation of the louver is stopped until elapse of a predetermined time period for stoppage, a similar effect can be achieved also by swinging the louver very slowly when the louver enters the restriction region.

Further, it is preferable that the above-described respective functions are provided with selecting member capable of selecting execution and prohibition in accordance with preference of passenger of a vehicle.

Further, when absence of passengers of a vehicle at the rear seat can be detected at an initial stage of air conditioning, it is preferable to set swing ranges such that swinging operation is carried out with preference to swing ranges covering passengers of a vehicle on the front seat side.

Third Embodiment

Figure 27:
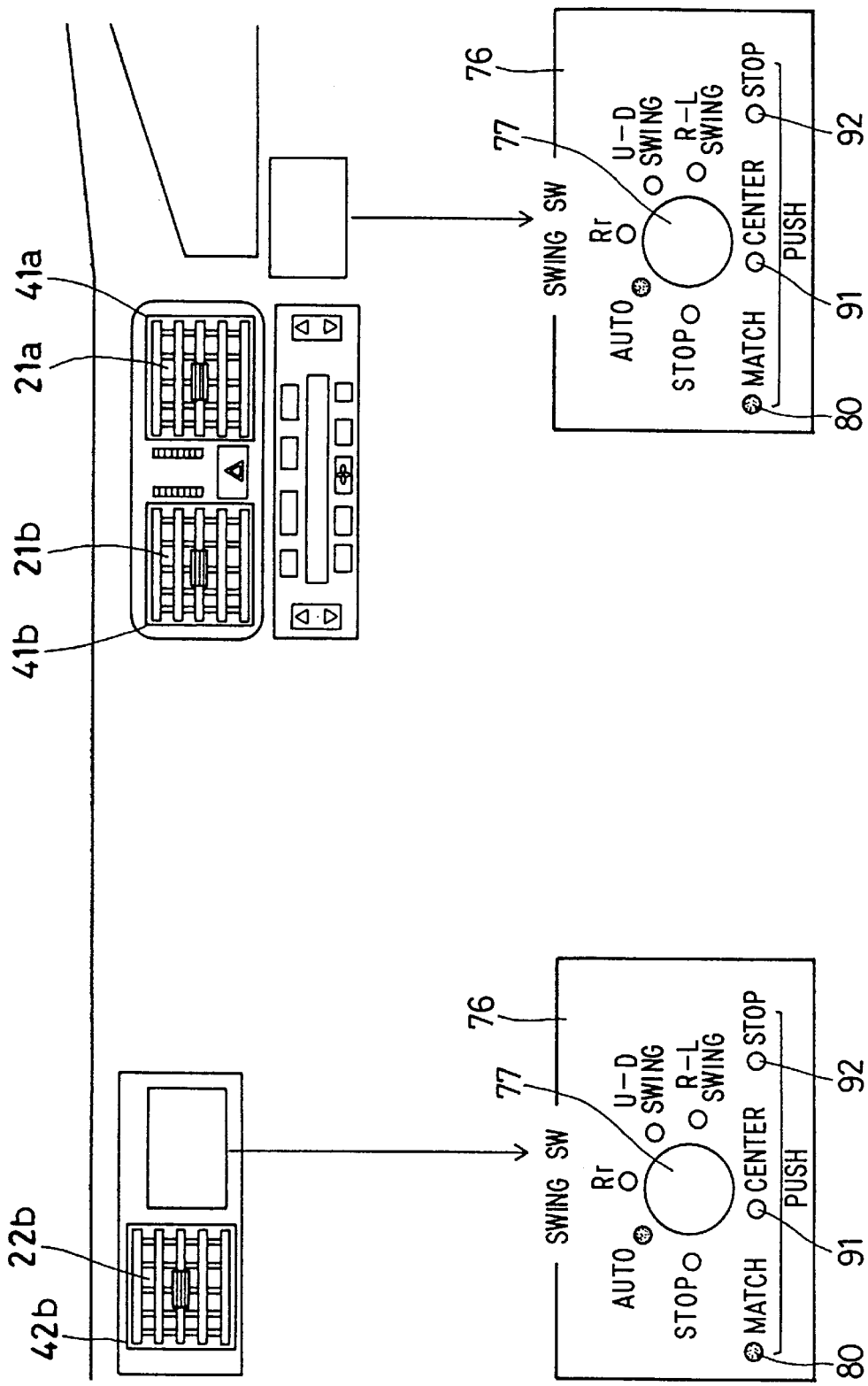
FIG. 27 is a front view showing an air conditioner operation panel according to a third embodiment of the present invention.

FIG. 27 shows a third embodiment of the present invention and is a view showing an air conditioner operation panel.

According to the third embodiment, the louver operation panels 76 are respectively installed to the driver seat side and the passenger seat side. Further, the louver operation panels 16 on the driver seat side and the passenger seat side are respectively provided with center louver switches 91 and side louver switches 92 such that the blow condition changing devices of the driver seat side center FACE and the passenger seat side center FACE blow outlets 21a and 21b and the blow condition changing devices of the driver seat side side FACE and the passenger seat side side FACE blow outlets 22a (not shown) and 22b can be controlled independently from each other.

According to the embodiment, by setting the operation mode changeover switch 77 to "U-DSWING" or "R-LSWING" installed at the louver operation panel 76 on the driver seat side or the passenger seat side, the swing louvers 43 and 46 can be swung in predetermined swing ranges. The swing ranges may be modified in accordance with manual operation of passengers of a vehicle, positions of seats, air conditioning thermal load, swing time period or the like.

Fourth Embodiment

Figure 28:
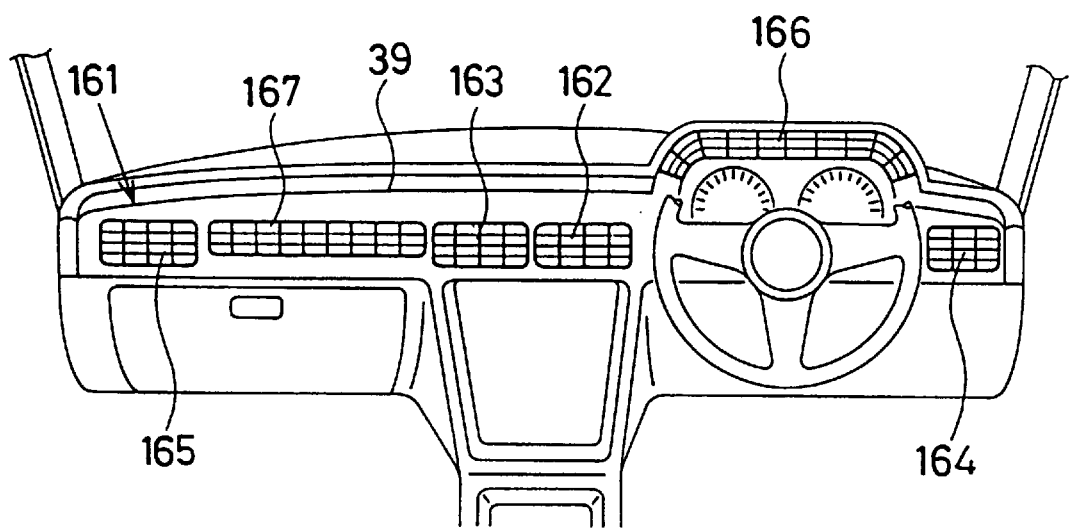
FIG. 28 is a front view showing an instrument panel of a vehicle according to a fourth embodiment of the present invention.
Figure 29:
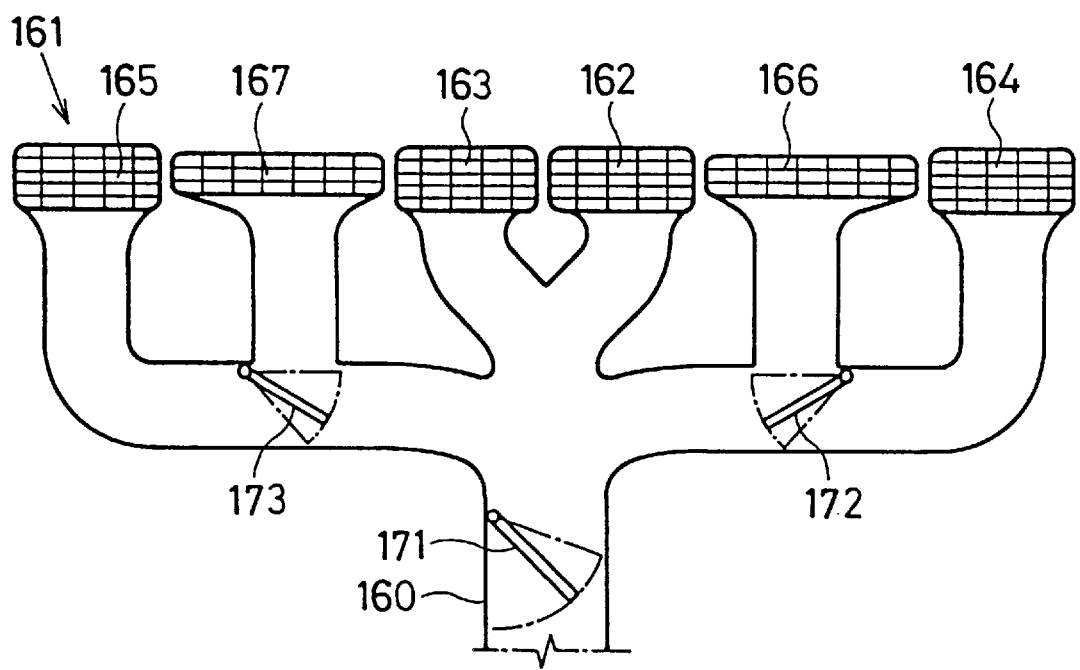
FIG. 29 is a sectional view showing a face duct of an air conditioning unit according to the fourth embodiment of the present invention.

FIG. 28 and FIG. 29 show a fourth embodiment of the present invention.

According to the embodiment, the partition plate 14 in the air conditioning duct 2 according to the second embodiment is abolished. Further, as a front seat side FACE blow outlet, a wide flow FACE blow outlet 161 which is opened on the most downstream side of air of a face duct 160 connected to an air downstream side end portion of the air conditioning duct 2, is installed. The wide flow FACE blow outlet 161 is constituted by driver seat side and passenger seat side center FACE blow outlets 162 and 163 which are opened at center of the front FACE of the instrument panel 39, driver seat side and passenger seat side side FACE blow outlets 164 and 65 on both sides of the instrument panel 39 in the vehicle width direction, that is, at vicinities of side windows of the vehicle and driver seat side and passenger seat side middle FACE blow outlets 166 and 167 which are opened between these FACE blow outlets. Further, a plurality of louvers for changing blow direction of air conditioned blown air by manual operation of passengers of the vehicle are installed respectively at the FACE blow outlets 162 through 167.

Further, the face duct 160 is pivotably installed with an FACE door 171 for opening and closing the respective FACE blow outlets 162 through 167, pivotably installed with a driver seat side middle FACE door 172 for opening and closing the driver seat side side FACE and middle FACE blow outlets 164 and 166 and pivotably installed with a passenger seat side middle FACE door 173 for opening and closing the passenger seat side side FACE and middle FACE blow outlets 165 and 167. Further, the driver seat side and the passenger seat side middle FACE doors 172 and 173 correspond to blow condition changing member according to the present invention and change blow conditions (for example, wide blow mode and spot blow mode) of air conditioned blown air blown from the driver seat side and the passenger seat side FACE blow outlets 164 and 165 as well as the driver seat side and the passenger seat side middle FACE blow outlets 166 and 167 to respective air conditioning areas in accordance with opening degrees.

In this embodiment, the FACE door 171 is moved to the opening side by an actuator of a servo motor or the like and the driver seat side and the passenger seat side middle face doors 172 and 173 are moved to the closing side by actuators of servo motors or the like. Thereby, the driver seat side and the passenger seat side center FACE blow outlets 162 and 163 as well as the driver seat side and the passenger seat side side FACE blow outlets 164 and 165 are opened and the driver seat side and the passenger seat side middle FACE blow outlets 166 and 167 are closed by which an opening area of the wide flow FACE blow outlet 161 is reduced whereby blow range of air conditioned blown air blown from the wide flow FACE blow outlet 161 is reduced and air conditioned blown air is locally blown to portions of the bodies of passengers of a vehicle in air conditioning areas (spot blow mode).

Further, the FACE door 171 is moved to the opening side and the driver seat side and the passenger seat side middle FACE doors 172 and 173 are moved to intermediary positions. Thereby, the driver seat side and the passenger seat side center FACE blow outlets 162 and 163, the driver seat side and the passenger seat side side FACE blow outlets 164 and 165 and the driver seat side and the passenger seat side middle FACE blow outlets 166 and 167 are opened by which the opening area of the wide flow FACE blow outlet 161 is increased whereby air conditioned blown air is divergently blown into the air conditioning areas by increasing blow range of air conditioned blown air blown from the wide flow FACE blow outlet 161 (wide blow mode).

Further, further fine control of changing air distribution amount may be carried out by adding FACE doors in the face duct 160 or air distribution amounts for respective passengers of a vehicle in the driver seat side and the passenger seat side air conditioning areas may be changed by putting one or two partition plates in the air conditioning duct 2 and the face duct 160, arranging blowers for respective air passages and differentiating wind blow amounts of the respective blowers from each other.

Fifth Embodiment

Figure 30:
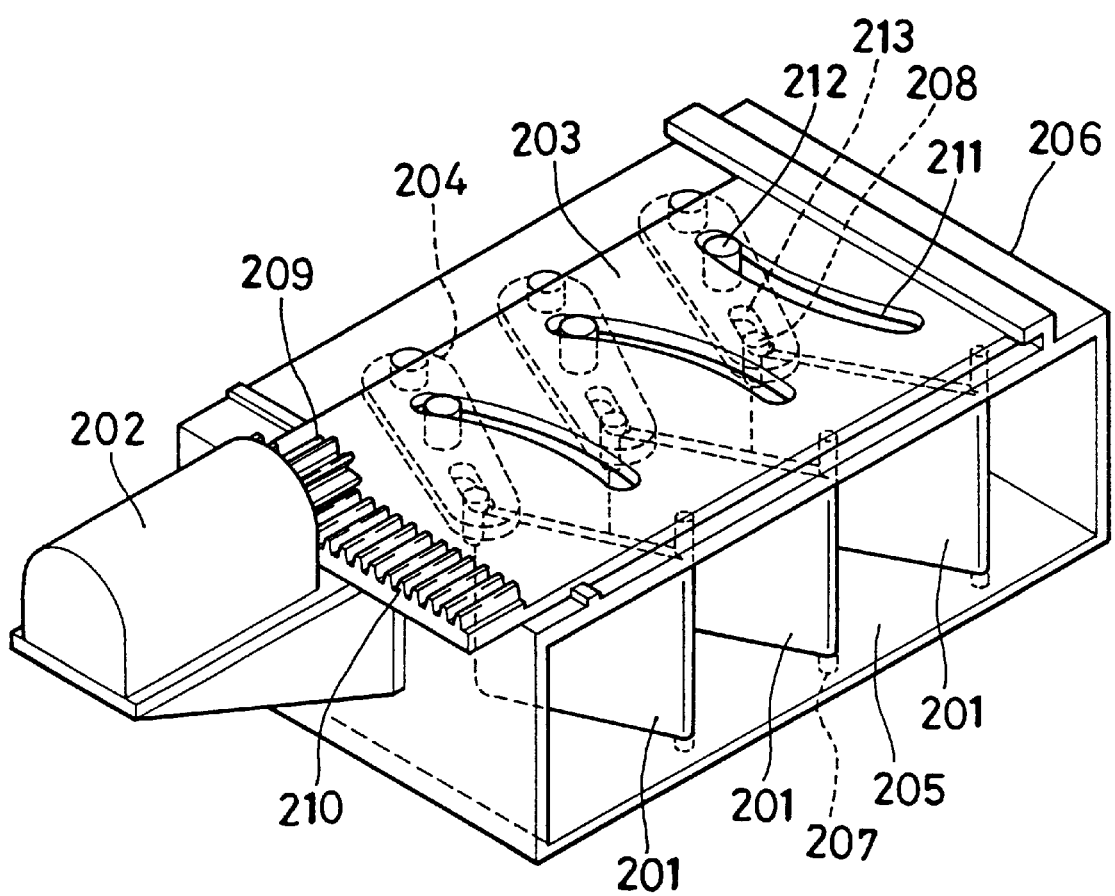
FIG. 30 is a perspective view showing a blow condition changing device according to a fifth embodiment of the present invention.
Figure 31A:
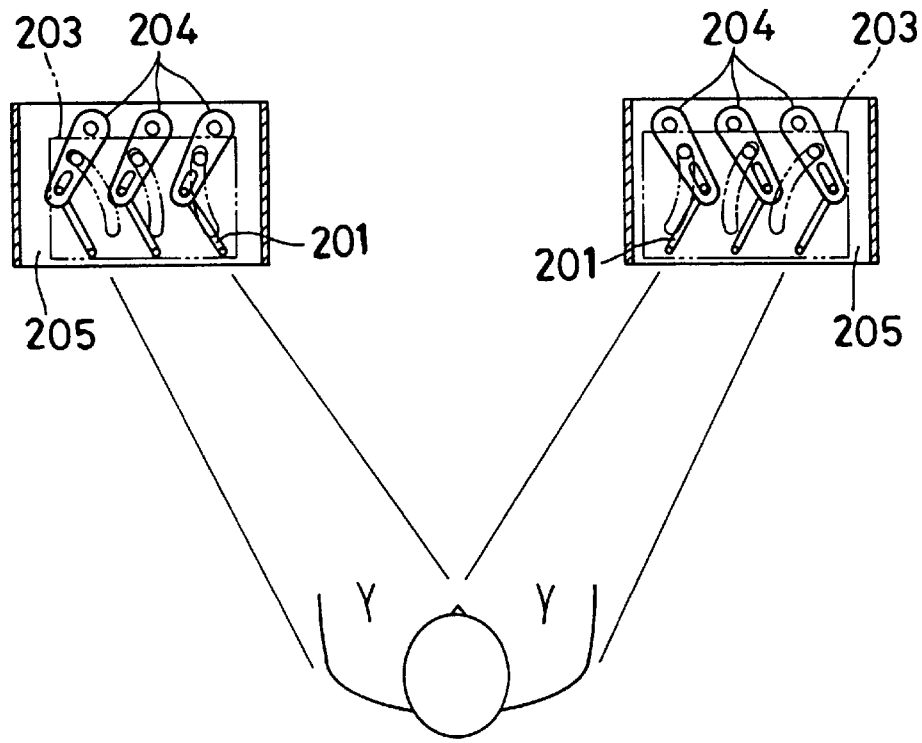
FIGS. 31A and 31B are explanatory views of operation of the blow condition changing device according to the fifth embodiment of the present invention.
Figure 31B:
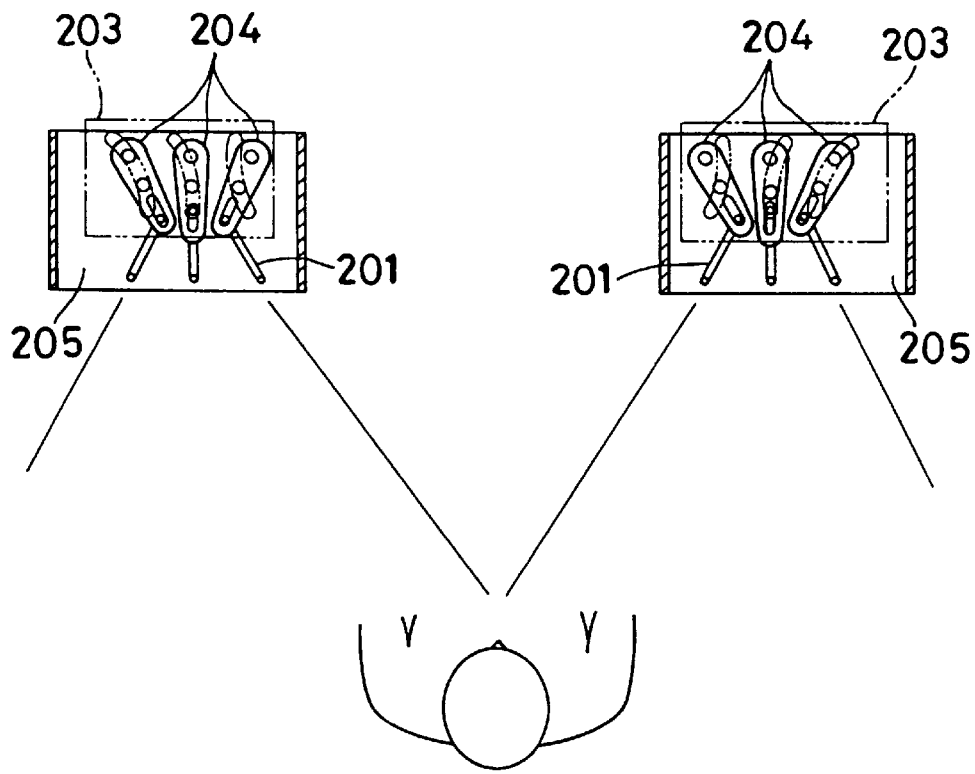

FIG. 30, FIGS. 31A and 31B show a fifth embodiment of the present invention.

A blow condition changing device according to the embodiment is constituted by a plurality of louvers 201, a louver motor 202, a link plate 203, link levers 204 and so on. The louver 201 is rotatably installed while centering on a rotating shaft 207 rotatably supported by an FACE grille 206 forming an FACE blow outlet 205 and is provided with a pin 208 projected upwardly as illustrated at an upper end portion of the rotating shaft 207 on the opposite side.

The louver motor 202 is fixed with a gear 209 at an outer periphery of a front end of an output shaft (not illustrated). The link plate 203 is arranged at an upper portion of the FACE grille 206, provided with a rack 210 in mesh with the gear 209 of the louver motor 202 at one end portion thereof and is installed slidably in forward and rearward direction of the FACE grille 206 in accordance with rotation of the output shaft. Further, the link plate 203 is formed with a plurality (same as number of louvers 201) of link grooves 211.

The link levers 204 are for transmitting movement of the link plate 203, installed by a number the same as the number of the louvers 201 and formed with pins 212 for fitting to the link grooves 211 of the link plate 203 and guide grooves 213 to which the pins 208 installed to the louvers 201 are fit.

According to the embodiment, when the link plate 203 is moved forwardly on the FACE grille 206 by rotating the output shaft of the louver motor 202, as shown by FIG. 31A, directions of the respective louvers 201 are driven to positions directing to the passenger via the respective link levers 204. Thereby, air conditioned blown air is intensively blown from the center FACE grille 206 and the side FACE grille 206 to the direction of the passenger (concentrating mode).

Meanwhile, when the link plate 203 is moved rearwardly on the FACE grille 206 by reversely rotating the output shaft of the louver motor 202, as shown by FIG. 31B, the direction of the respective louvers 201 are driven to diverge to outer sides via the respective link levers 204. Thereby, air conditioned blown air blown from the center FACE grille 206 and the side FACE grille 206 is diverged respectively (diverging mode).

According to the blow condition changing device, air conditioned blown air can be directed to the passenger of the vehicle intensively by selecting the concentrating mode. Further, when the diverging mode of selected, not only air conditioned blown air is blown widely into air conditioning zones but the blown air amount of air conditioned blown air to the passenger of the vehicle can be reduced.

Sixth Embodiment

Figure 32:
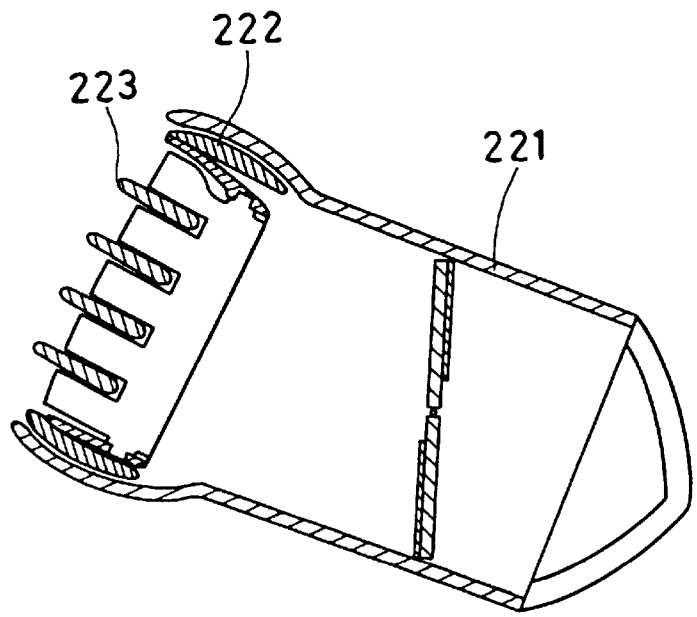
FIG. 32 is a sectional view showing a blow condition changing device according to a sixth embodiment of the present invention.
Figure 33:
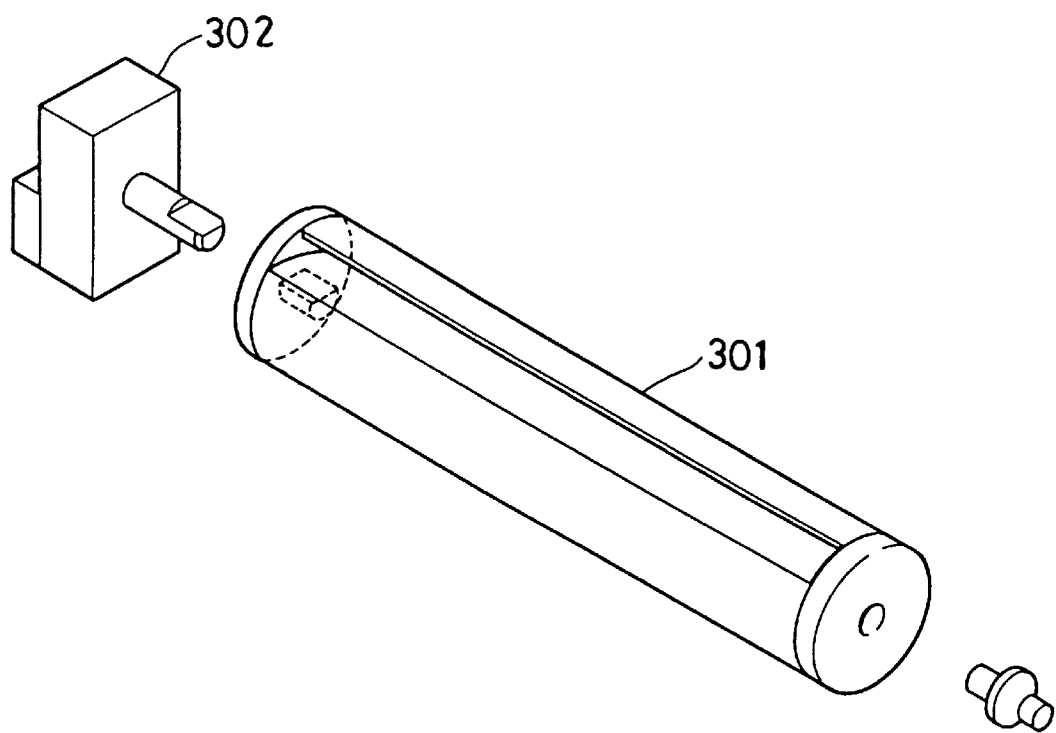
FIG. 33 is a perspective view showing a blow condition changing device according to a seventh embodiment of the present invention.

FIG. 32 shows a sixth embodiment of the present invention.

A blow condition changing device of the embodiment is constituted by a case 221, a drum 222 pivotably integrated to the case 221, louvers 223 attached to the drum 222 and so on. According to the blow condition changing device, by pivoting the drum 222 in respect of the case 221, blow direction of air conditioned blown air can be changed by changing directions of the louvers 223 integrally with the drum 222.

Seventh Embodiment

FIGS. 33, 34A, 34B, 35, 36A, 36B, 36C, 36D, 37A, 37B and 37C show a seventh embodiment according to the present invention.

Figure 34A:
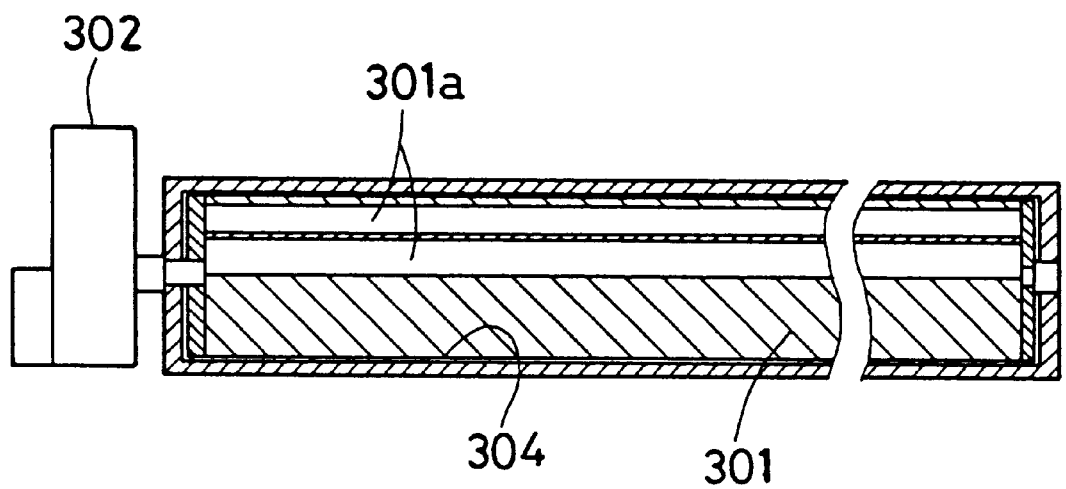
FIG. 34A is a sectional view showing a blow condition changing device according to the seventh embodiment of the present invention.
Figure 34B:
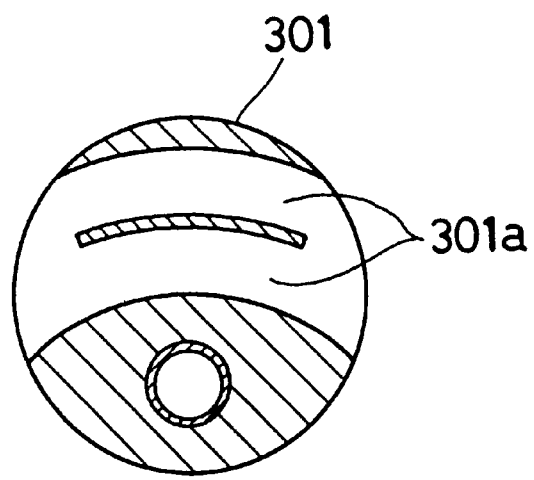
FIG. 34B is a part of a sectional view showing a louver itself according to the seventh embodiment of the present invention.

A blow condition changing device according to the embodiment is provided with a louver main body 301 installed in a slender cylindrical state and a louver motor 302 for driving to rotate the louver main body 301. As shown by FIG. 34B, the louver main body 301 is formed with an air passage 301 forming a shape of a circular arc having a constant width at a position eccentric to the rotational center.

Figure 35:
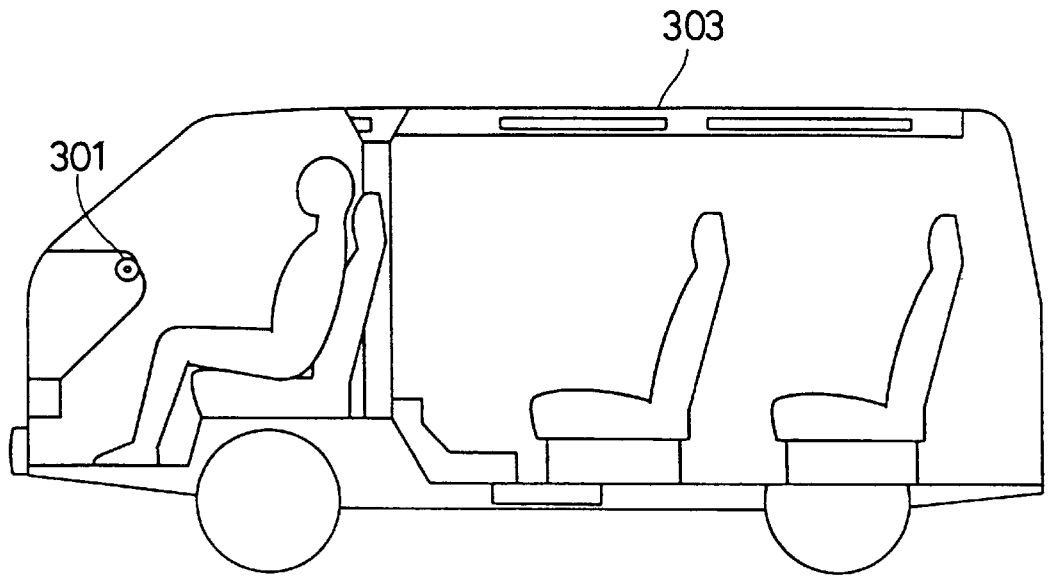
FIG. 35 is a schematic view of a vehicle showing a position of attaching the blow condition changing device according to the seventh embodiment of the present invention.
Figure 36A:
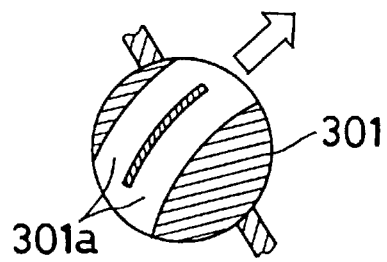
FIGS. 36A, 36B, 36C and 36D are explanatory views of operation of the blow condition changing device according to the seventh embodiment of the present invention.
Figure 36B:
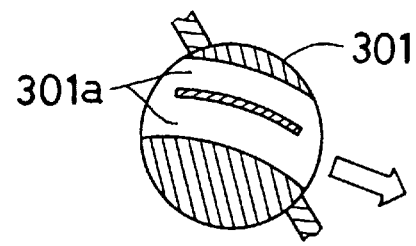
Figure 36C:
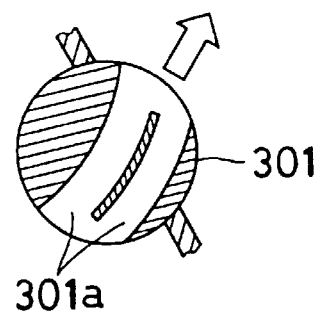
Figure 36D:
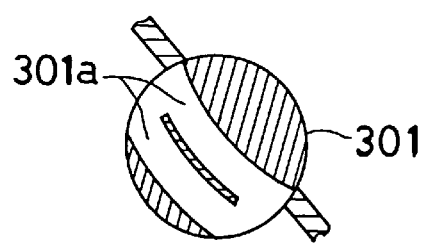

As shown by, for example, FIG. 35, the blow condition changing device can be used by being attached to an air blow outlet 304 (refer to FIG. 34A) of a vehicle 303 of a style of a "one box car" or the like.

By driving to rotate the louver main body 301 by the louver motor 302, a direction of blowing air conditioned blown air blown from the air blow outlet 304 can be selected to an arbitrary direction in up and down direction. For example at a position indicated by FIG. 36A, air conditioned blown air can be blown mainly to the upper half of the body of the passenger of a vehicle. Further, at a position indicated by FIG. 36B, air conditioned blown air can be mainly blown to the lower half of the body of the passenger of the vehicle. Further, at a position shown by FIG. 36C, air conditioned blown air can be blown to a direction of a ceiling of a vehicle 303. Further, at a position shown by FIG. 36D, the air blow outlet 304 can be closed.

Figure 37A:
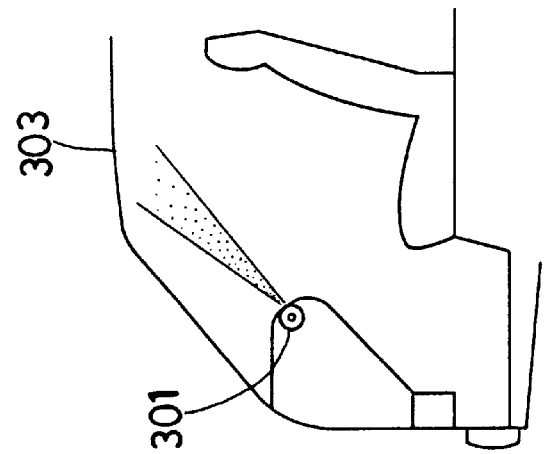
FIGS. 37A, 37B and 37C are schematic views showing a swing range of air conditioned blown air according to the seventh embodiment of the present invention.
Figure 37B:
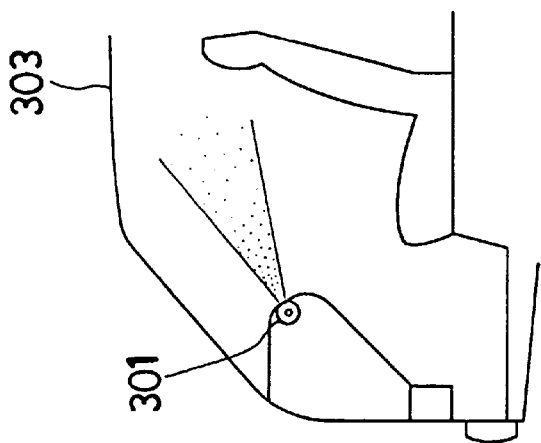
Figure 37C:
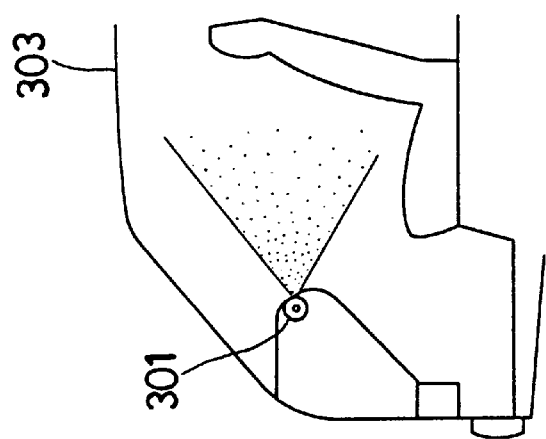
Figure 38:
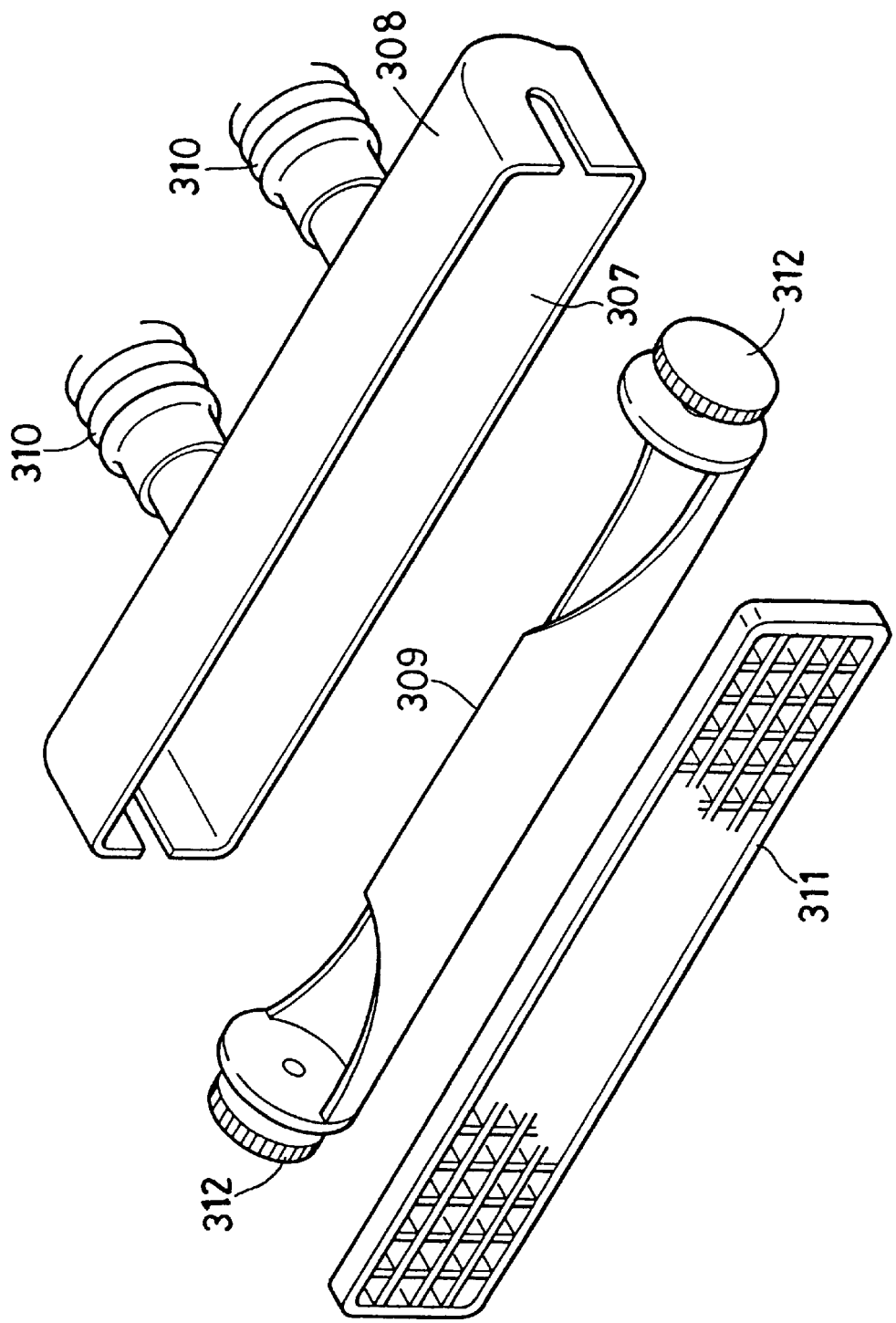
FIG. 38 is a disassembled perspective view showing a blow condition changing device according to an eighth embodiment of the present invention.
Figure 41A:
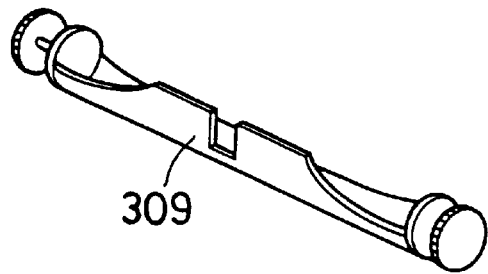
FIGS. 41A, 41B, 41C, 41D and 41E are perspective views showing modified examples of rotary valves according to the eighth embodiment.
Figure 41B:
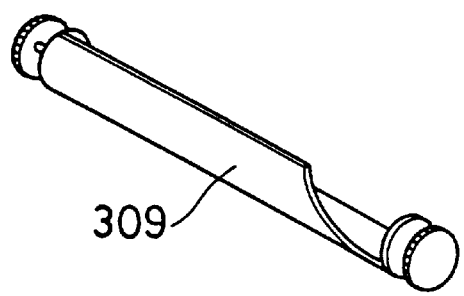
Figure 41C:
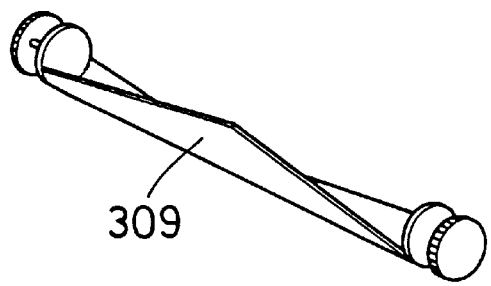
Figure 41D:
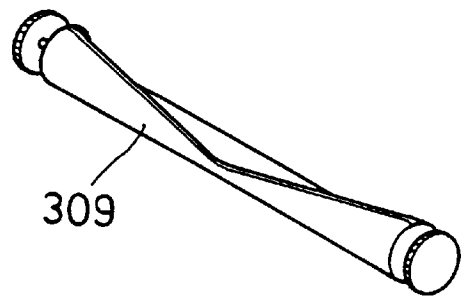
Figure 41E:
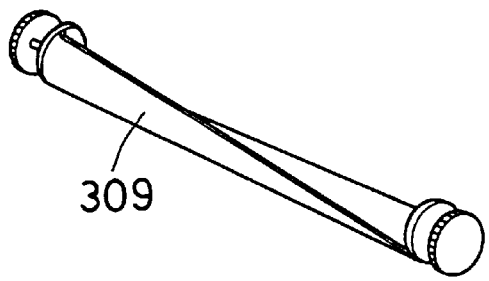

Further, as shown by FIG. 37A, 37B and 37C, when the louver main body 301 is swung, air conditioned blown air blown from the air blow outlet 304 can be blown in a predetermined swing range in accordance with the swing width of the louver main body 301.

Eighth Embodiment

FIGS. 38, 39A, 39B, 39C, 40A, 40B, 40C, 41A, 41B, 41C, 41D and 41E show an eighth embodiment of the present invention.

A blow condition changing device according to the embodiment can change blow region of air conditioned blown air in the vehicle width direction and is provided with a rotary valve 309 rotatably attached to a case 308 forming an FACE blow outlet 307. In the case 308, air conditioned blown air is supplied from two of wind blowing ducts 310 connected to a rear face thereof. The front face of the case 308 is attached with an FACE grille 311 in a lattice shape.

The rotational position of the rotary valve 309 can be adjusted by adjusting dials 312 attached to both ends thereof and a valve motor, not illustrated, and as shown by, for example, FIGS. 39A, 39B and 39C and FIGS. 40A, 40B and 40C, blow region of air conditioned blown air can be changed in the vehicle width direction by changing an opening state of the FACE blow outlet 307 in accordance with the rotational position of the rotary valve 309. Further, a variety of blow conditions can be provided by changing the shape of the rotary valve 309 as shown by FIGS. 41A, 41B, 41C, 41D and 41E. Also, the rotary valve 309 can also be used as the louver main body 301 according to the seventh embodiment.

Ninth Embodiment

Figure 42:
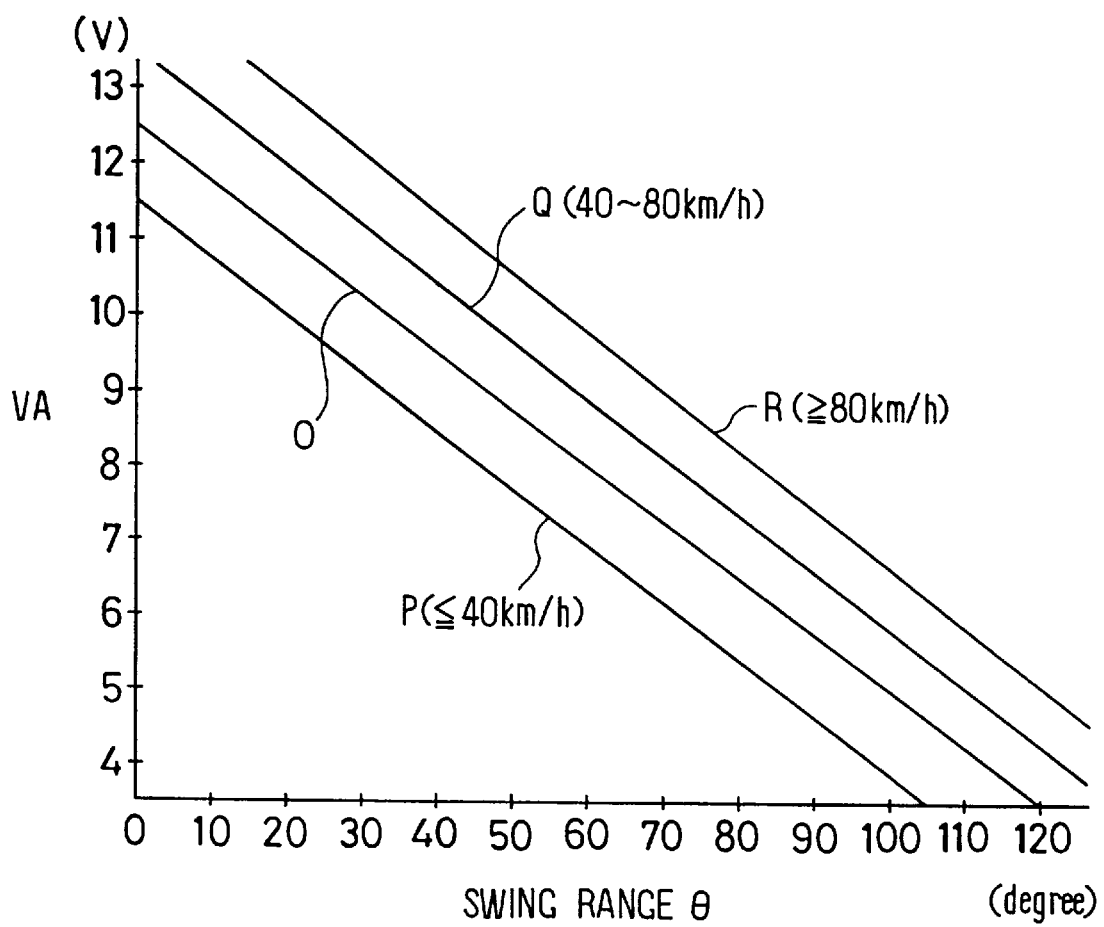
FIG. 42 is a characteristic diagram showing swing range θ in respect of blower control voltage VA according to a ninth embodiment of the present invention.

FIG. 42 shows a ninth embodiment according to the present invention.

According to automatic blower control of the embodiment based on a target blow temperature TAO, a blower wind amount (blower control voltage applied on the blower motor 9) is linearly set, for example, from 4 V to 13 V. Further, according to control for determining swing ranges in this embodiment, swing ranges of the swing louvers 43 and 46 at the respective FACE blow outlets 21a, 21b, 22a and 22b are calculated based on the intake port mode, the vehicle speed of a vehicle of an automobile or the like, the blower control voltage VA and a characteristic diagram of FIG. 24.

In this case, as the intake port modes, there are at least an inner air circulation mode and an outer air introducing mode, the inner air circulation mode is an intake port mode for introducing inner air from the inner air intake port 6 by closing the outer air intake port 7 by the inner and outer switching door 3 and the outer air introducing mode is an intake port mode for introducing outer air from the outer air intake port 7.

For example, when the blower control voltage is 8 V and the intake port mode is the inner air circulation mode (case O in FIG. 42), the swing ranges of the swing louvers 43 and 46 become 62°. Further, when the blower control voltage is 8 V, the intake port mode is the outer air introducing mode and the vehicle speed of the vehicle is 40 km/h or lower (case P in FIG. 42), the swing ranges of the swing louvers 43 and 46 become 47°. Further, when the blower control voltage is 8 V, the intake port mode is the outer air introducing mode and the vehicle speed of the vehicle is higher than 40 km/h but lower than 80 km/h or less (case Q in FIG. 42), the swing ranges of the swing louvers 43 and 46 become 76°. Further, when the blower control voltage is 8 V, the intake port mode is the outer air introducing mode and the vehicle speed of the vehicle is 80 km/h or higher (case R in FIG. 42), the swing ranges of the swing louvers 43 and 46 become 88°.

Therefore, according to the embodiment, the larger the blower wind amount, the narrower the swing ranges of the swing louvers 43 and 46 and the narrower the swing ranges, the more slowly the swing louvers 43 and 46 are swung by which air conditioned blown air having a pertinent amount in respect of all of air conditioning thermal load of blower wind amount, solar radiation intensity, solar radiation direction, temperature deviation between inner temperature and set temperature and so on, can be supplied to passengers of the vehicle. Further, even when the swing ranges of the swing louvers 43 and 46 are narrow, annoying feeling in respect of movements of the swing louvers 43 and 46 and unpleasant feeling of passengers of the vehicle can be resolved.

Tenth Embodiment

Figure 43:
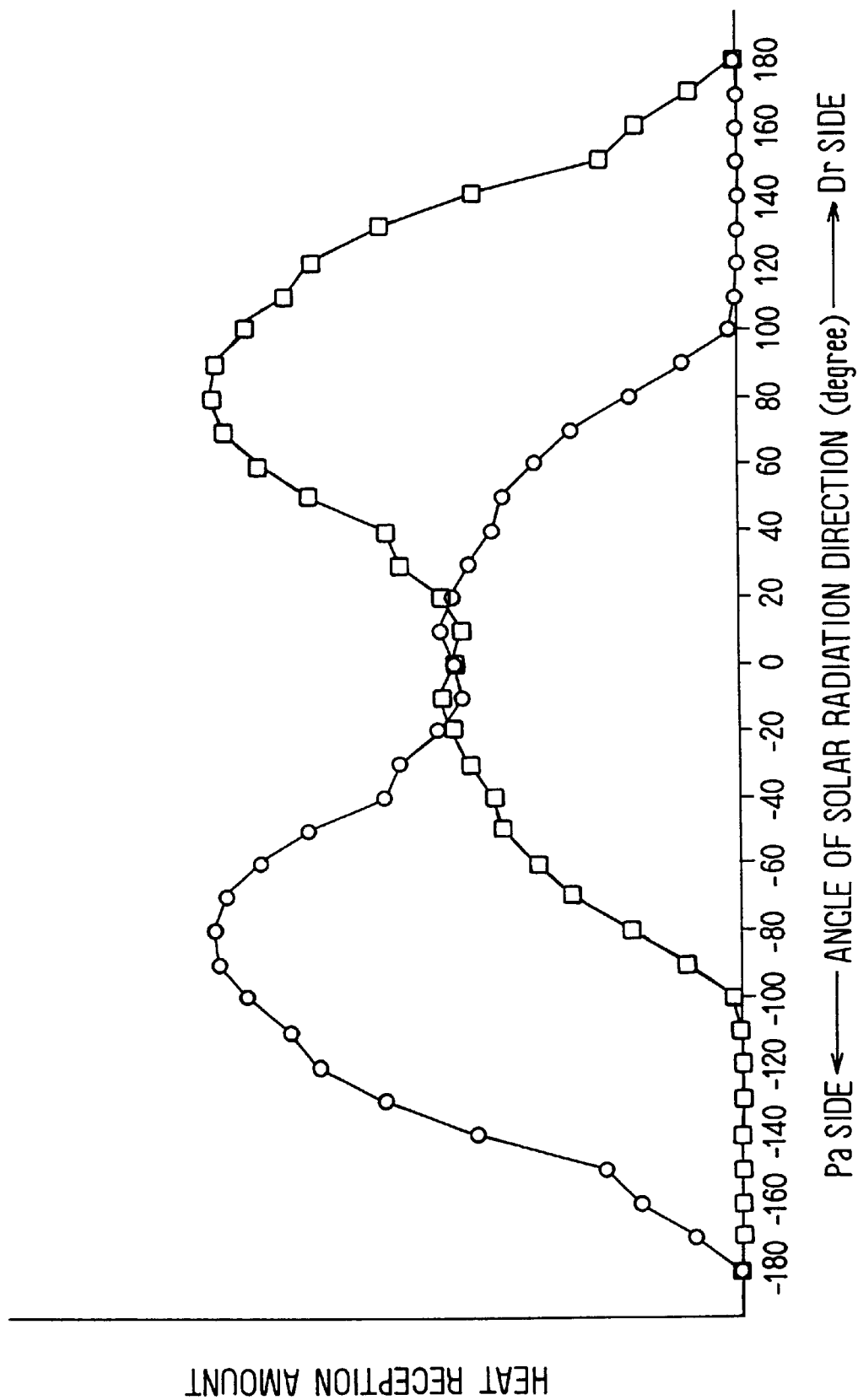
FIG. 43 is a characteristic diagram showing changes in heat reception amount in respect of changes in left and right angles of solar ray for left and right passengers at front seats according to a tenth embodiment of the present invention.
Figure 44A:
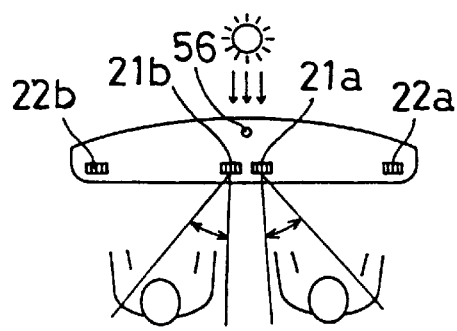
FIGS. 44A, 44B, 44C, 44D and 44E are explanatory views showing setting of swing ranges in respect of a solar radiation direction according to the tenth embodiment of the present invention.
Figure 44B:
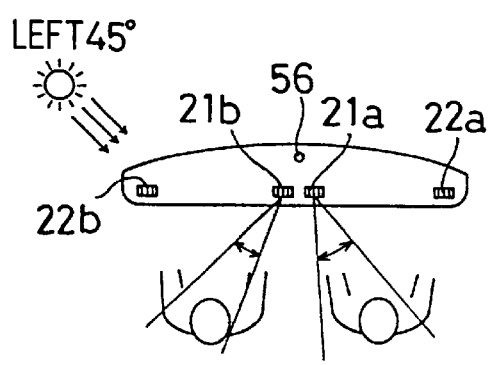
Figure 44C:
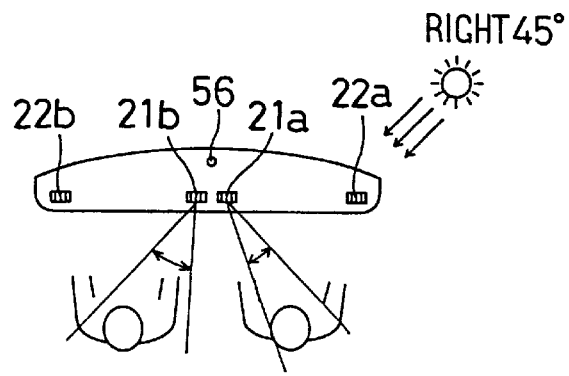
Figure 44D:
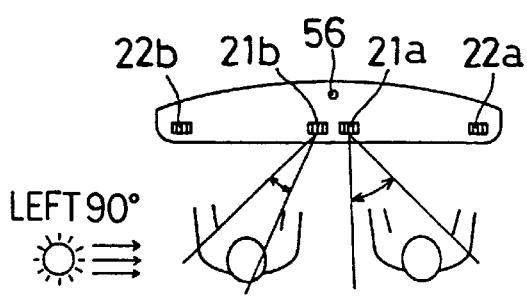
Figure 44E:
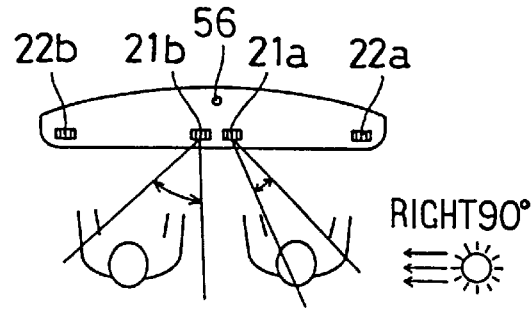
Figure 45:
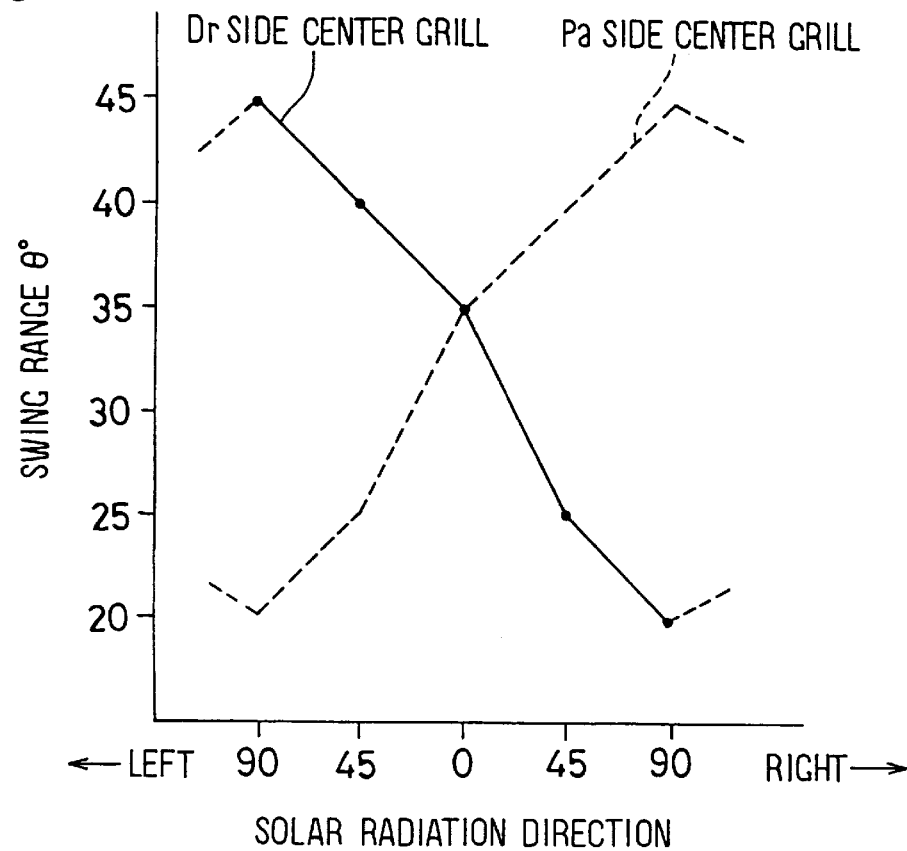
FIG. 45 is a characteristic diagram showing swing ranges in respect of the solar radiation direction at center grills on the driver seat side and the passenger seat side according to the tenth embodiment of the present invention.

FIGS. 43, 44A, 44B, 44C, 44D, 44E and 45 show a tenth embodiment according to the present invention in which FIG. 43 is a diagram showing a change in a heat reception amount in respect of a change of the angle of the solar radiation direction for each of left and right passengers at front seats which is calculated by simulation by the inventors, FIGS. 44A, 44B, 44C, 44D and 44E are diagrams showing setting of swing ranges in respect of the solar radiation direction (deviated solar radiation) and FIG. 45 is a diagram showing swing ranges in respect of solar radiation direction at a driver seat side center grille and a passenger seat side center grille. In FIG. 43, the square represents the driver seat side, and the circle represents the passenger seat side.

According to the graph of FIG. 43, it is known that the same solar radiation amount, in comparison with the case where the sun is situated at the front face of the vehicle, the further the sun is disposed to the side face of the vehicle, that is, the further the deviated solar radiation, the larger the heat reception amount of a passenger of the vehicle on the side where the solar radiation is incident. In accordance therewith, as shown by explanatory views of FIGS. 44A, 44B, 44C, 44D and 44E and a characteristic diagram of FIG. 45, by changing swing ranges of object air conditioning zones in accordance with the angle of the sun in left and right direction, a difference in the heat receiving amounts caused by the deviated solar radiation can accurately be canceled out and pleasant feeling can be provided.

Further, as shown by the explanatory views of FIGS. 44A, 44B, 44C, 44D and 44E, by changing the swing ranges of the swing louvers 43 and 46 in accordance with the deviated solar radiation and changing the portion of the passenger of the vehicle to which air conditioned blown air is blown, the portion of the passenger where the solar radiation is incident can be cooled and pleasant feeling can be promoted. Further, FIGS. 44A, 44B, 44C, 44D and 44E and FIG. 45 show a case where a two swing louvers type having blow condition changing devices (swing louvers 43, 46) of only the driver seat side and the passenger seat side center grilles 41a and 41b or two of the blow condition changing devices each of the driver seat side center grille 41a or the passenger seat side center grille 41b are operated.

Eleventh Embodiment

Figure 46:
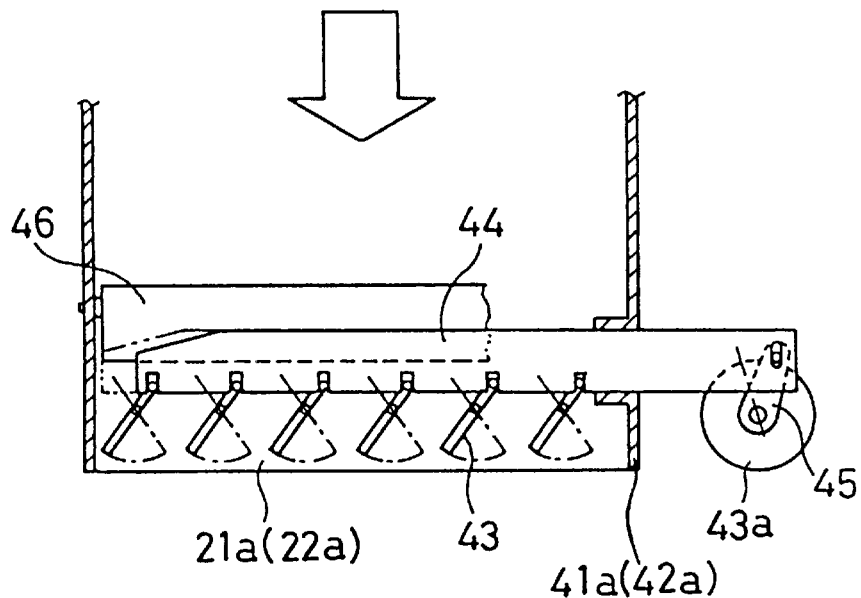
FIG. 46 is a schematic view showing a mechanism of swinging louvers in left and right direction of a blow condition changing device according to an eleventh embodiment.
Figure 47:
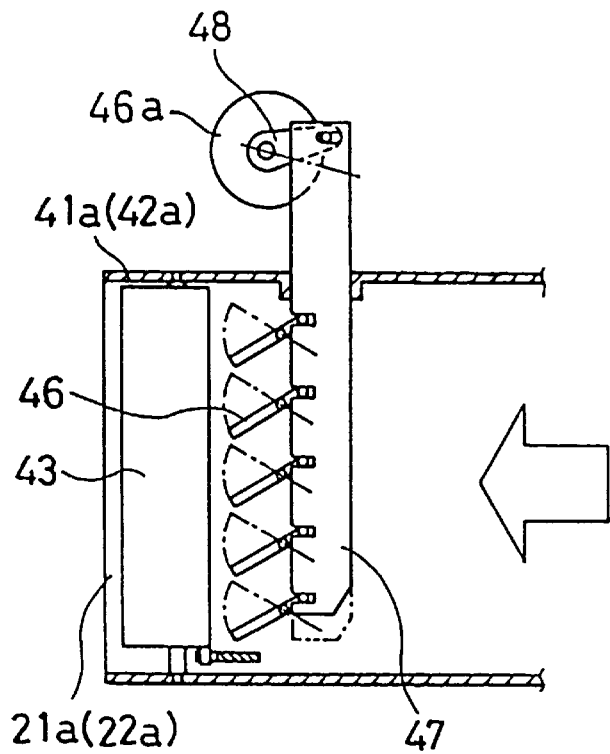
FIG. 47 is a schematic view showing a mechanism of swinging louvers in up and down direction of the blow condition changing device according to the eleventh embodiment of the present invention.

FIG. 46 and FIG. 47 show an eleventh embodiment according to the present invention.

According to the embodiment, stepping motors 43a and 46a are used as louver driving member and the swing louvers 43 and 46 can be swung by outputting pulse signals from the air conditioner ECU 50 to the stepping motors 43a and 46a by operating a swing switch (not illustrated) by passengers of a vehicle. Further, an amount of moving a louver can be calculated by counting a number of pulses (number of ON) outputted from the air conditioner ECU 50 and accordingly, in place of the potentiometers 59 and 60 according to the first embodiment, it can be utilized as louver position detecting member. In this case, it is preferable that passengers of a vehicle cannot operate the louvers other than via the swing switch.

According to a blow condition changing device of the embodiment, when the swing louvers 43 and 46 are directly moved by manual operation of passengers of a vehicle, absolute positions of the swing louvers 43 and 46 cannot be grasped by the air conditioner ECU 50, however, by carrying out the swing louver control in accordance with the above-described method, all of control of this embodiment is applicable.

Further, potentiometers may be installed to the swing louvers 43 and 46 using the stepping motors 43a and 46a or a manual operation switch for manually operating directions of louvers may be provided and member for transmitting extra pluses by an amount of manual operation (operation amount) (including reverse direction) may be provided.

Twelfth Embodiment

Figure 48:
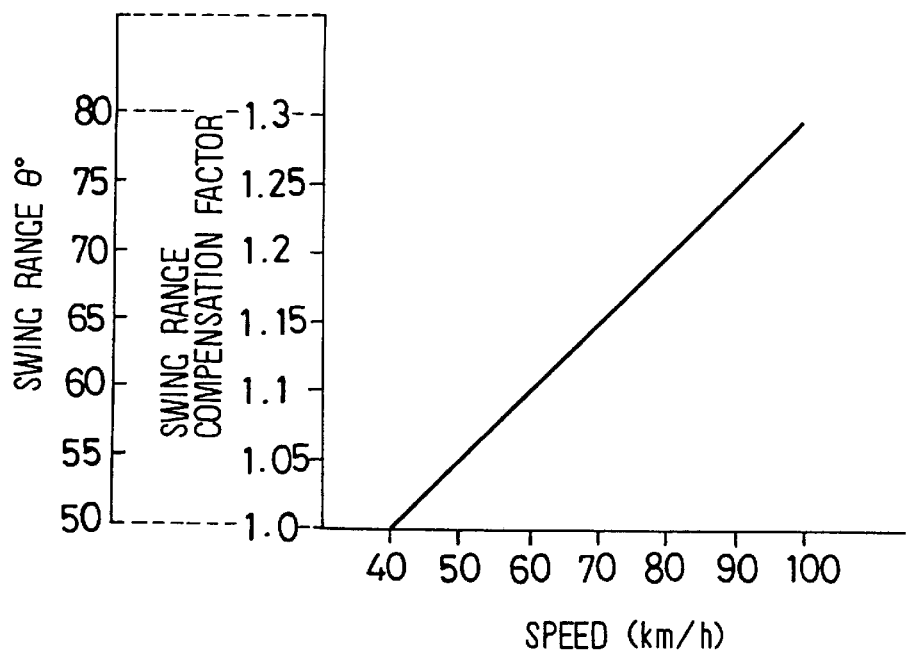
FIG. 48 is a diagram showing a swing range and a swing range compensation factor in respect of a vehicle speed in an outer air introducing mode according to a twelfth embodiment of the present invention.

FIG. 48 shows a twelfth embodiment according to the present invention.

Generally, when the intake port mode is the outer air introducing mode, the faster the vehicle speed of the vehicle, the more increased is a blow wind amount (blown air amount) of air conditioned blown air blown from the respective FACE blow outlets and accordingly, passengers of a vehicle may feel chilly by an increase in the cooled wind amount from the FACE blow outlets to passengers of the vehicle.

Hence, as shown in FIG. 48, in the case of the outer air introducing mode, the faster the vehicle speed, the wider the swing ranges of the swing louvers 43 and 46 are set, and the slower the vehicle speed, the narrower the swing ranges of the swing louvers 43 and 46 are set. Selectively, corrected swing ranges may be calculated by multiplying the basic swing range by a swing range compensation factor to determine the corrected swing range. In this case, the faster the vehicle speed, the larger the correction rates of the swing ranges of the swing louvers 43 and 46 are set, and the slower the vehicle speed, the smaller the correction rates of the swing ranges of the swing louvers 43 and 46 are set.

Thirteenth Embodiment

Figure 49:
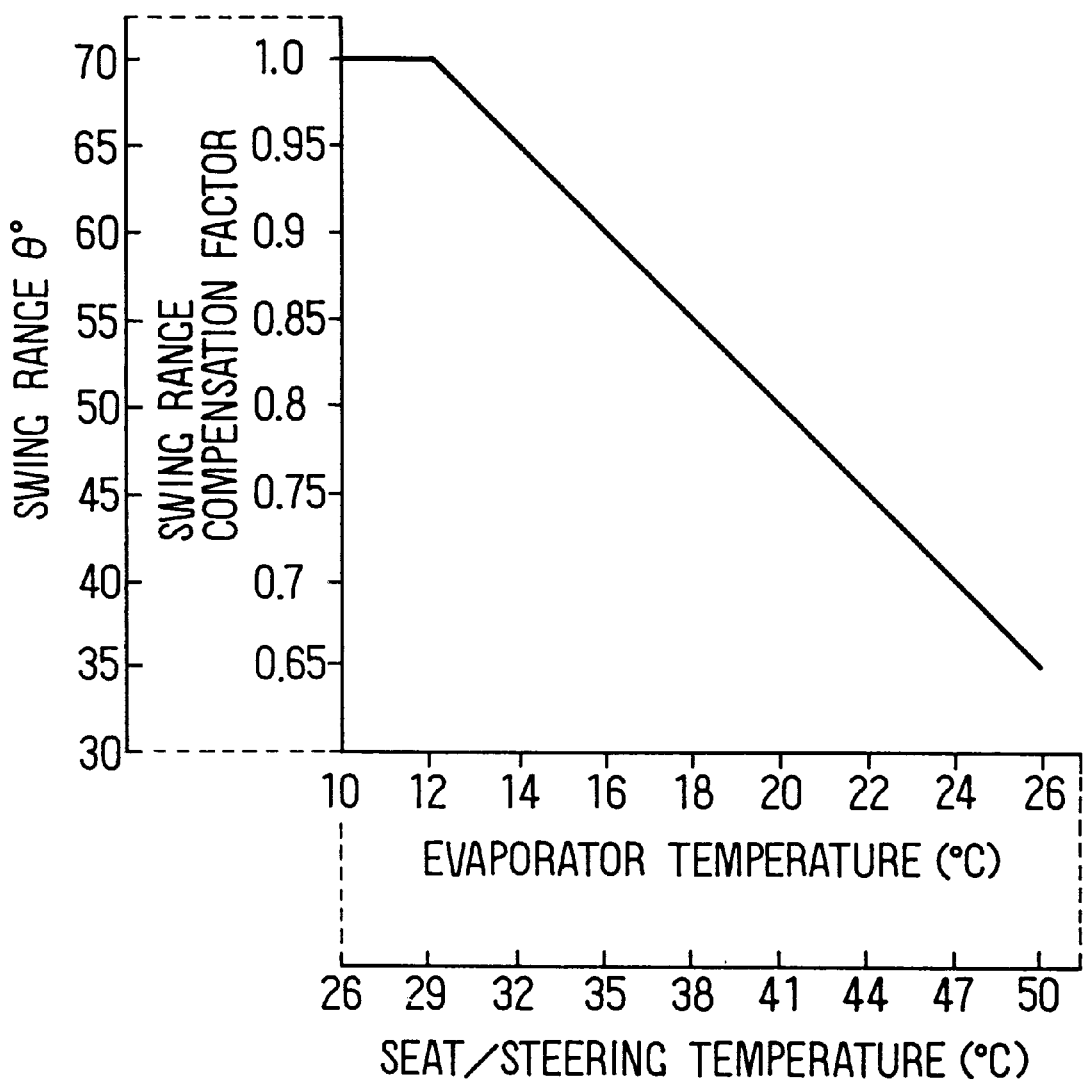
FIG. 49 is a characteristic diagram showing relationships between a swing range, a swing range compensation factor, post evaporator temperature, blow temperature, seat temperature and steering temperature according to a thirteenth embodiment of the present invention.

FIG. 49 shows a thirteenth embodiment according to the present invention.

According to the embodiment, the air conditioner ECU 50 is connected with the post evaporator temperature sensor 57 for detecting temperature (post evaporator temperature) of air immediately after passing through the evaporator 10, or a blow temperature sensor (not illustrated) for detecting blow temperature of air blown from an FACE blow outlet into vehicle compartment. Further, when the air conditioning capacity is low by deficiency of coolant in the refrigerating cycle or the like and the post evaporator temperature or the blow temperature is high, the deficiency in the air conditioning capacity may be compensated for by supplying a larger amount of the cooled wind to the passenger of a vehicle by narrowly setting the swing ranges of the swing louvers 43 and 46.

Further, the air conditioner ECU50 is connected with a seat temperature sensor (not illustrated) for detecting seat temperature of front seats (driver seat, passenger seat) or a steering wheel temperature sensor (not illustrated) for detecting a steering wheel temperature. Further, when a passenger of a vehicle gets in the vehicle parking in summer and air in the vehicle compartment is conditioned, in the case where the seat temperature or the steering wheel temperature is high, the passenger of the vehicle feels hot all the more and becomes unpleasant. Hence, the higher the seat temperature or the steering wheel temperature, the narrower the swing ranges of the swing louvers 43 and 46 are set and the larger amount the cooled wind is supplied to the passenger of the vehicle by which disagreeable feeling of the passenger of the vehicle can be resolved.

Fourteenth Embodiment

Figure 50:
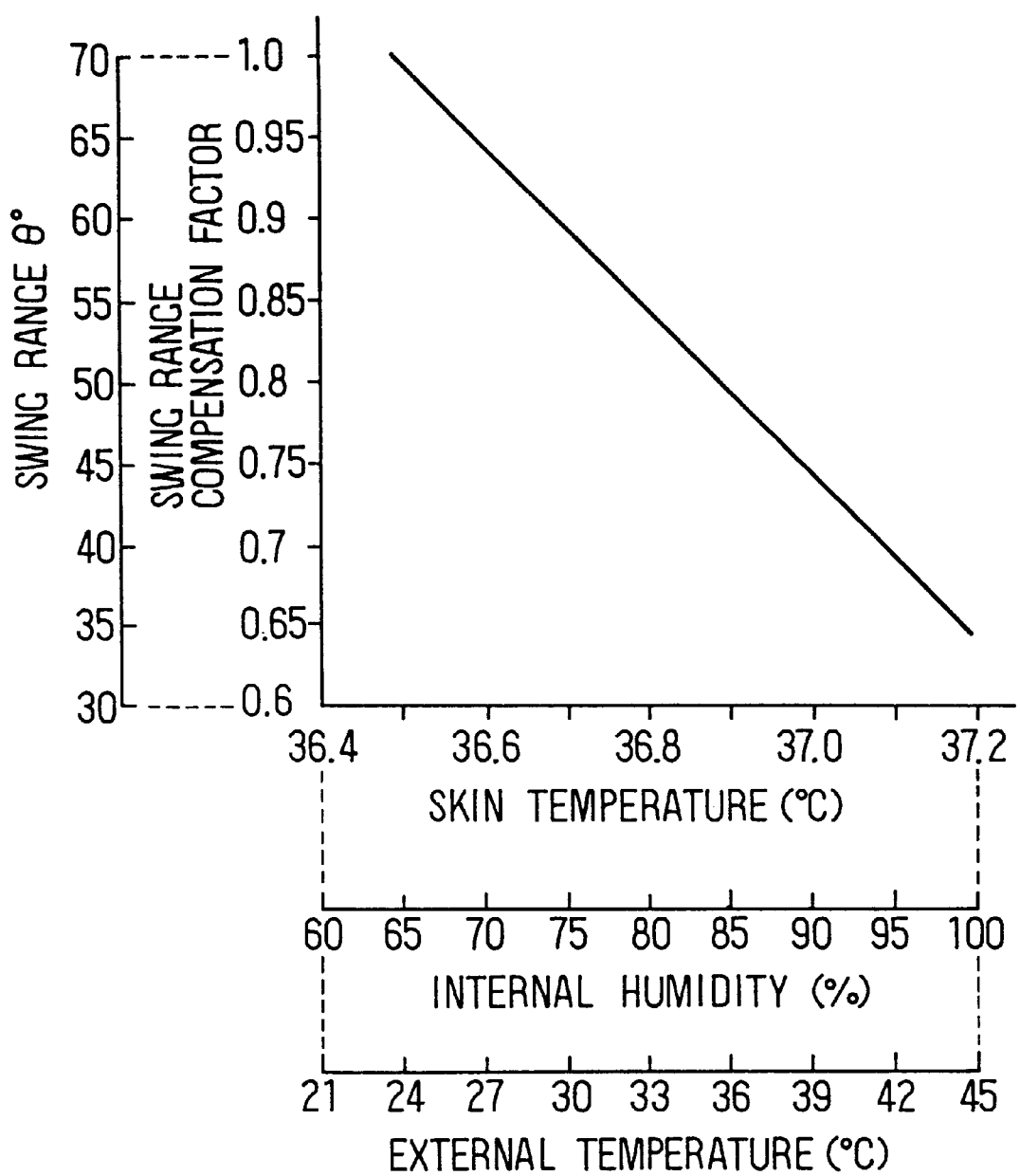
FIG. 50 is a characteristic diagram showing a relationships between a swing range, a swing range compensation factor, skin temperature, humidity in vehicle compartment or outer air temperature according to a fourteenth embodiment of the present invention.

FIG. 50 shows a fourteenth embodiment according to the present invention.

According to the embodiment, the air conditioner ECU 50 is connected with a skin temperature sensor (not illustrated) for detecting skin temperature of a passenger of a vehicle, a humidity sensor (not illustrated) for detecting the humidity in the vehicle compartment or the outer air temperature sensor 55 for detecting outer air temperature. Further, when the skin temperature is high, the passenger of the vehicle may highly probably feel hot by exercise before getting in the vehicle and accordingly, the swing ranges of the swing louvers 43 and 46 may be set narrowly. Further, when the humidity in the vehicle compartment is high, the passenger of the vehicle is liable to feel hot and accordingly, the swing ranges of the swing louvers 43 and 46 may be set narrowly. Furthermore, when the outer air temperature is high, thermal radiation becomes large and the passenger of the vehicle feels hot and accordingly, the swing ranges of the swing louvers 43 and 46 may be set narrowly.

Other Embodiments

Although according to the embodiments, the present invention is applied to the vehicle air conditioning apparatus where temperature adjustments of left and right sides in the vehicle compartment (driver seat side air conditioning zone and passenger seat side air conditioning zone) can be carried out independently from each other, the present invention may be applied to a vehicle air conditioning apparatus where temperature adjustments of the front side and the rear side in the vehicle compartment (air conditioning zone on front seat side and air conditioning zone on rear seat side) can be carried out independently from each other. Further, the present invention may be applied to a vehicle air conditioning apparatus where the temperature adjustment in the vehicle compartment is carried out by a single temperature variable member.

Although according to the first embodiment, air conditioned blown air is blown from the passenger seat side side FACE blow outlet 22a and the passenger seat side side FACE blow outlet 22b only in the FACE mode or the B/L mode, air conditioned blown air may be blown from the driver seat side side FACE blow outlet 22a and the passenger seat side side FACE blow outlet 22b even in the case of the FOOT mode, the F/D mode or the DEF mode. That is, not only the cooled wind is supplied to passengers of a vehicle when the air conditioning state is a cooling state but also warm wind may be supplied to passengers of a vehicle from side FACE blow outlets when air conditioning state is a warming state.

Although according to the first and the second embodiments the driver seat side and the passenger seat side center grilles 41a and 41b as well as the driver seat side and the passenger seat side side grilles 42a and 42b are fixed to the instrument panel 39, the respective grilles may be attached to storing members in a state where the respective grilles are supported pivotably in left and right direction or respective grilles may be attached to storing members in a state where the respective grilles are supported pivotably in up and down direction. In this case, the main bodies of the grilles may be used as blow condition changing member.

Although as the swing louvers, both of the swing louvers 43 pivotably moving in left and right direction and the swing louvers 46 pivotably moving in up and down direction are installed to the respective FACE blow outlets, only either of the swing louvers 43 pivotably moving in left and right direction and the swing louvers 46 pivotably moving in up and down direction may be installed to the respective FACE blow outlets.

Although the swing ranges (swing range, swing angle) of the swing louvers 43 and 46 of the driver seat side center and side FACE blow outlets 21a and 22a are equalized, they may be different from each other. Further, the swing ranges of the swing louvers 43 and 46 of the passenger seat side center and side FACE blow outlets 21b and 22b are equalized, they may be different from each other.

Further, the swing speeds of the swing louvers 43 and 46 may be accelerated by shortening stoppage time period at a swing end or a midway of the swing range of each of the swing louvers 43 and 46 such that the wider the swing ranges of the swing louvers 43 and 46, the shorter the stoppage time periods. Conversely, the swing speeds of the swing louvers 43 and 46 may be retarded by prolonging the stoppage time periods at a swing end or a midway of the swing range of each of the swing louvers 43 and 46 such that the narrower the swing ranges of the swing louvers 43 and 46, the longer the stoppage time periods of the swing louvers 43 and 46.

Further, directions of starting to swing the swing louvers 43 and 46 on the driver seat side and the passenger seat side may be directions where directions of blowing air conditioned blown air become proximate to each other and directions of starting to swing the swing louvers 43 and 46 on the driver seat side and the passenger seat side may be set to directions where directions of blowing air conditioned blown air become remote from each other. Further, directions of starting to swing the swing louvers 43 and 46 of the driver seat side center FACE blow outlet 21a and the driver seat side FACE blow outlet 22a may be set to directions where directions of blowing air conditioned blown air become proximate to each other and directions of starting to swing the swing louvers 43 and 46 on the center and the side may be set to directions where directions of blowing air conditioned blown air become remote from each other. The same goes with the passenger seat side.

Although regardless of changes in swing ranges of the swing louvers 43 and 46, the swing cycles of the swing louvers 43 and 46 are set to constant periods and the narrower the swing ranges of the swing louvers 43 and 46, the slower the swing speeds of the swing louvers 43 and 46 are set, the narrower the swing ranges of the swing louvers 43 and 46, the longer the swing cycles of the swing louvers 43 and 46 may be set and the slower the swing speeds of the swing louvers 43 and 46 may be set.

Although an explanation has been given of examples where the blow direction variable member or the blow wind amount variable member for changing blow direction or blown air amount of air conditioned blown air is used as blow condition changing member for changing blow condition of air conditioned blown air blown from blow outlets, as the blow condition changing member, blow position variable member for changing blow position (blow height, blow width) of air conditioned blown air may be used.

Further, when as solar radiation amount detecting member, the elevation of the sun at time and day and solar radiation direction in respect of a current position of a vehicle are stored to a microcomputer of a car navigation system, an output signal from the car navigation system may be read by the air conditioner ECU as a solar radiation sensor signal.

Although examples where the present invention is applied to the blow condition changing devices on the front seat side of the vehicle, the present invention may be applied to blow condition changing devices on an intermediate seat side and a rear seat side of the vehicle.

Further, origin points of swinging of the blow condition changing member of the swing louvers 43 and 46 or the like may be disposed on the side of the side windows at vicinities of the blow condition changing member or may be disposed on the side of the passengers of the vehicle.

It is preferable that setting operation can be carried out on a liquid crystal element (display) of an air conditioner operation panel, the setting operation can be carried out by special switching operation or the setting operation can be carried out by a communication input from an external device (for example, remote controller) such that correction or change can be performed in accordance with seat position (position) of passengers of a vehicle or preference of passengers of a vehicle. Particularly, what is necessary for correcting in accordance with the seat position of passengers of a vehicle or preference of passengers of a vehicle resides in whether the blow condition changing member of the swing louvers 43 and 46 or the like are directed to passengers of a vehicle when inner air temperature is very high or to which directions the member are directed or whether swing ranges of the blow condition changing member are set widely or narrowly and so on.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An air conditioning apparatus for a vehicle having an air conditioning zone in the vehicle, comprising:

an air conditioning unit having an air outlet for controlling an air-conditioned air to blow toward the air conditioning zone;

blow condition changing means for changing at least one of blow condition including a blow range, blow position, blow angle, blow zone and blown air amount of said air-conditioned air, said blow condition changing means being mounted between said air outlet and the air conditioning zone;

an actuator for swinging said blow condition changing means;

cooling load detecting means for detecting a cooling load in the vehicle;

swing range setting means for setting a swing range of said blow condition changing means according to said cooling load detected by said cooling load detecting means; and blow condition control means for controlling said actuator to reduce a swing speed of said blow condition changing means in proportion to a reduction of said swing range set by said swing range setting means.

2. An air conditioning apparatus according to claim 1, wherein said swing speed of said blow condition control means is reduced by prolonging a stopping period or a slowed swing period of said blow condition changing means.

3. An air conditioning apparatus according to claim 1, wherein:
said swing range setting means reduces said swing range in proportion to an increase of said cooling load detected by said cooling load detecting means; and
said swing range setting means increases said swing range in proportion to a decrease of said cooling load detected by said cooling load detecting means.

4. An air conditioning apparatus according to claim 3, wherein:
said cooling load to be detected by said cooling load detecting means includes at least one of a blown air amount at an upper portion of said air outlet, a blower capacity, an applied voltage to a blower motor, an internal temperature of the vehicle, a temperature difference between a predetermined temperature and said internal temperature of the vehicle, a solar radiation amount, a solar radiation direction, vehicle speed, an internal humidity of the vehicle, an external temperature, a temperature of an air after passing through an evaporator, a blown air temperature, a seat temperature, a steering wheel temperature, and a skin temperature.

5. An air conditioning apparatus according to claim 1, wherein:
the air conditioning zone includes a first air conditioning zone and a second air conditioning zone;
said air conditioning unit controls a temperature of said first air conditioning zone and said second air conditioning zone individually;
said blow condition changing means includes a first blow condition changing means mounted between said air outlet and said first air conditioning zone, and includes a second blow condition changing means mounted between said outlet and said second air conditioning zone; and
said swing range setting means sets a first swing range of said first blow condition changing means according to a first cooling load of said first air conditioning zone, and sets a second swing range of said second blow condition changing means according to a second cooling load of said second air conditioning zone individually.

6. An air conditioning apparatus according to claim 5, wherein:
said cooling load detecting means includes a solar radiation amount detecting means for detecting whether one of said first and second air conditioning zones is receiving a solar radiation; and
said swing range setting means reduces one of said first swing range and said second swing range corresponding to said one of said first and second air conditioning zones receiving said solar radiation.

7. An air conditioning apparatus according to claim 5, wherein:
said cooling load detecting means includes solar radiation amount detecting means for detecting whether a crew is receiving a solar radiation; and
said swing range setting means reduces one of said first swing range and said second swing range corresponding to said crew receiving said solar radiation.

8. An air conditioning apparatus according to claim 5, wherein said swing range setting means increases one of said first swing range and said second swing range corresponding to one of said first and second blow condition changing means which is closer to a steering wheel of the vehicle.

9. An air conditioning apparatus according to claim 1, wherein:
said cooling load detecting means includes solar radiation direction detecting means for detecting a solar radiation direction; and
said swing range setting means reduces said swing range in proportion to an increase of an angle formed between a front direction of the vehicle and said solar radiation direction detected by said solar radiation direction detecting means.

10. An air conditioning apparatus according to claim 1, wherein:
said air conditioning apparatus has at least two of said blow condition changing means; and
said swing range setting means reduces said swing range in proportion to a decrease of a number of said blow condition changing means which is in operation.

11. An air conditioning apparatus for a vehicle having a right side air conditioning zone and a left side air conditioning zone in the vehicle, comprising:
an air conditioning unit having a right side air outlet for blowing an air-conditioned air toward the right side air conditioning zone and a left side air outlet for blowing said air-conditioned air toward the left side air conditioning zone, said air conditioning unit being for controlling a temperature of said right side air conditioning zone and said left side air conditioning zone individually;
right side blow condition changing means for changing at least one of blow condition including a blow range, blow position, blow direction, blow angle, and blow zone of said air-conditioned air blown from said right side air outlet, at least in a horizontal direction;
left side blow condition changing means for changing at least one of blow condition including a blow range, blow position, blow direction, blow angle, and blow zone of said air-conditioned air blown from said left side air outlet, at least in a horizontal direction;
a right side actuator for swinging said right side blow condition changing means;
a left side actuator for swinging said left side blow condition changing means;
cooling load detecting means for detecting a cooling load in the vehicle;
swing range setting means for setting a right side swing range of said right side blow condition changing means and a left side swing range of said left side blow condition changing means individually according to said cooling load detected by said cooling load detecting means;
swing cycle setting means for setting a right side swing cycle of said right side blow condition changing means and a left side swing cycle of said left side blow condition changing means equal to one another;
blow condition control means for controlling said right side actuator and said left side actuator according to said right and left swing ranges and said right and left side swing cycles, respectively in such a manner that swing directions of said right side blow condition changing means and said left side blow condition changing means are opposite.

12. An air conditioning apparatus according to claim 11, wherein said blow condition control means has a synchronizing means for synchronizing a first timing when said right side blow condition changing means reaches its left swing end with a second timing when said left side blow condition changing means reaches its right swing end.

13. An air conditioning apparatus according to claim 11, wherein:

said air conditioning unit further includes a center outlet mounted between said right side air outlet and said left side air outlet for blowing said air-conditioned air;

said air conditioning apparatus further includes center blow condition changing means for changing at least one of said blow condition of said air-conditioned air blown from said center outlet; and said swing range setting means further sets a center swing range of said center blow condition changing means independently of said right and left side swing ranges when said cooling load detected by said cooling load detecting means at a right side of a crew is different from said cooling load detected by said cooling load detecting means at a left side of said crew.

14. An air conditioning apparatus according to claim 13, wherein said swing range setting means increases one of said right side, left side and center swing ranges corresponding to one of said right side, left side and center blow condition changing means which is closest to a steering wheel of the vehicle.

15. An air conditioning apparatus according to claim 11, wherein:

said cooling load to be detected by said cooling load detecting means includes at least one of a blown air amount at an upper portion of said air outlet, a blower capacity, an applied voltage to a blower motor, an internal temperature of the vehicle, a temperature difference between a predetermined temperature and said internal temperature of the vehicle, a solar radiation amount, a solar radiation direction, vehicle speed, an internal humidity of the vehicle, an external temperature, a temperature of an air after passing through an evaporator, a blown air temperature, a seat temperature, a steering wheel temperature, and a skin temperature.

16. An air conditioning apparatus according to claim 11, wherein:

said cooling load detecting means includes solar radiation amount detecting means for detecting whether one of said right side and left side air conditioning zones is receiving a solar radiation; and said swing range setting means reduces one of said right side and left side swing ranges corresponding to said one of said right side and left side air conditioning zones receiving said solar radiation.

17. An air conditioning apparatus according to claim 11, wherein:

said cooling load detecting means includes a solar radiation amount detecting means for detecting whether a crew is receiving a solar radiation; and said swing range setting means reduces one of said right side swing range and said left side swing range corresponding to said crew receiving said solar radiation.

18. An air conditioning apparatus according to claim 11, wherein:

said air conditioning apparatus has at least two of said blow condition changing means; and said swing range setting means reduces said swing range in proportion to a decrease of a number of said blow condition changing means which is in operation.

19. An air conditioning apparatus for a vehicle having an air conditioning zone in the vehicle, comprising:

an air conditioning unit having an air outlet for controlling an air-conditioned air to blow toward the air conditioning zone;

blow condition changing means for changing at least one of blow condition including a blow range, blow position, blow angle, blow zone and blown air amount of said air-conditioned air, said blow condition changing means being mounted between said air outlet and the air conditioning zone;

an actuator for swinging said blow condition changing means;

cooling load detecting means for detecting a cooling load in the vehicle;

swing range setting means for setting a swing range of said blow condition changing means according to said cooling load detected by said cooling load detecting means;

swing range limiting means for limiting said swing range; and blow condition control means for controlling said actuator in such a manner that a swing cycle of said blow condition changing means is kept constant when said swing range is limited by said swing range limiting means.

20. An air conditioning apparatus according to claim 19, wherein said blow condition control means adjusts a swing speed of said blow condition changing means at a point adjacent to said limited swing range.

21. An air conditioning apparatus according to claim 19, wherein said blow condition control means controls said actuator to expand said swing range to an opposite side to said limited swing range.

22. An air conditioning apparatus according to claim 19, wherein:

said swing range setting means reduces said swing range in proportion to an increase of said cooling load detected by said cooling load detecting means; and said swing range setting means increases said swing range in proportion to a decrease of said cooling load detected by said cooling load detecting means.

23. An air conditioning apparatus for a vehicle having a front side air conditioning zone and a rear side air conditioning zone in the vehicle, comprising:

an air conditioning unit having an air outlet installed in the front side air conditioning zone for controlling an air-conditioned air to blow toward the front side and rear side air conditioning zones;

blow condition changing means for changing at least one of blow condition including a blow range, blow position, blow angle, blow zone and blown air amount of said air-conditioned air, said blow condition changing means being mounted between said air outlet and the front side air conditioning zone;

an actuator for swinging said blow condition changing means;

cooling load detecting means for detecting a cooling load in the vehicle;

swing range setting means for setting a swing range of said blow condition changing means according to said cooling load detected by said cooling load detecting means such that said swing range of said blow condition changing means is increased in proportion to a decrease of said cooling load detected by said cooling load detecting means; and blow condition control means for controlling said actuator to expand said swing range such that a blown air amount to said rear side air conditioning zone is increased.

24. An air conditioning apparatus according to claim 23, wherein:

said cooling load detecting means includes solar radiation direction detecting means for detecting a solar radiation direction; and said swing range setting means reduces said swing range in proportion to an increase of an angle formed between a front direction of the vehicle and said solar radiation direction detected by said solar radiation direction detecting means.

25. An air conditioning apparatus for a vehicle having a right side air conditioning zone and a left side air conditioning zone in the vehicle, comprising:

an air conditioning unit having a right side air outlet for blowing an air-conditioned air toward the right side air conditioning zone and a left side air outlet for blowing said air-conditioned air toward the left side air conditioning zone, said air conditioning unit being for controlling a temperature of said right side air conditioning zone and said left side air conditioning zone individually;

right side blow condition changing means for changing at least one of blow condition including a blow range, blow position, blow direction, blow angle, and blow zone of said air-conditioned air blown from said right side air outlet, at least in a horizontal direction;

left side blow condition changing means for changing at least one of blow condition including a blow range, blow position, blow direction, blow angle, and blow zone of said air-conditioned air blown from said left side air outlet, at least in a horizontal direction;

a right side actuator for swinging said right side blow condition changing means;

a left side actuator for swinging said left side blow condition changing means;

a solar radiation amount detecting means for detecting a solar radiation amount and a solar radiation direction of the vehicle;

swing range setting means for setting a right side swing range of said right side blow condition changing means and a left side swing range of said left side blow condition changing means individually according to said solar radiation amount detected by said solar radiation amount detecting means, and for adjusting said right side swing range and said left side swing range individually according to said solar radiation direction detected by said solar radiation amount detecting means; and blow condition control means for controlling said right side actuator and said left side actuator according to said right side and left side swing ranges adjusted by said swing range setting means.

26. An air conditioning apparatus for a vehicle having an air conditioning zone in the vehicle, comprising:

an air conditioning unit having an air outlet for controlling an air-conditioned air to blow toward the air conditioning zone;

blow condition changing means for changing at least one of blow condition including a blow range, blow position, blow angle, blow zone and blown air amount of said air-conditioned air, said blow condition changing means being mounted between said air outlet and the air conditioning zone;

an actuator for swinging said blow condition changing means;

cooling load detecting means for detecting a cooling load in the vehicle;

swing range setting means for setting a swing range of said blow condition changing means according to said cooling load detected by said cooling load detecting means; and blow condition control means for controlling said actuator to maintain a swing cycle of said blow condition changing means constant.

27. An air conditioning apparatus according to claim 26, wherein:

said swing range setting means reduces said swing range in proportion to an increase of said cooling load detected by said cooling load detecting means; and said swing range setting means increases said swing range in proportion to a decrease of said cooling load detected by said cooling load detecting means.

* * * * *